(12) United States Patent
Gruber et al.

(10) Patent No.: US 10,078,487 B2
(45) Date of Patent: Sep. 18, 2018

(54) CONTEXT-SENSITIVE HANDLING OF INTERRUPTIONS

(71) Applicant: Apple Inc., Cupertino, CA (US)

(72) Inventors: Thomas R. Gruber, Emerald Hills, CA (US); Donald W. Pitschel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 685 days.

(21) Appl. No.: 14/213,812

(22) Filed: Mar. 14, 2014

(65) Prior Publication Data

US 2014/0282003 A1   Sep. 18, 2014

Related U.S. Application Data

(60) Provisional application No. 61/799,996, filed on Mar. 15, 2013.

(51) Int. Cl.
  *G06F 3/16* (2006.01)
  *G06Q 10/10* (2012.01)
  *H04L 12/58* (2006.01)

(52) U.S. Cl.
  CPC .............. *G06F 3/16* (2013.01); *G06F 3/167* (2013.01)

(58) Field of Classification Search
  None
  See application file for complete search history.

(56) References Cited

U.S. PATENT DOCUMENTS

| 3,704,345 A | 11/1972 | Coker et al. |
| 3,828,132 A | 8/1974 | Flanagan et al. |
| 3,979,557 A | 9/1976 | Schulman et al. |
| 4,278,838 A | 7/1981 | Antonov |
| 4,282,405 A | 8/1981 | Taguchi |
| 4,310,721 A | 1/1982 | Manley et al. |
| 4,348,553 A | 9/1982 | Baker et al. |

(Continued)

FOREIGN PATENT DOCUMENTS

| CH | 681573 A5 | 4/1993 |
| DE | 3837590 A1 | 5/1990 |

(Continued)

OTHER PUBLICATIONS

Hermansky, H., "Perceptual Linear Predictive (PLP) Analysis of Speech", Journal of the Acoustical Society of America, vol. 87, No. 4, Apr. 1990, pp. 1738-1752.

(Continued)

*Primary Examiner* — Jeffrey A Gaffin
*Assistant Examiner* — Nhat Huy T Nguyen
(74) *Attorney, Agent, or Firm* — Dentons US LLP

(57) ABSTRACT

A list of notification items is received, the list including a plurality of notification items, wherein each respective one of the plurality of notification items is associated with a respective urgency value. An information item is detected. In some implementations, the information item is a communication (e.g., an email). In some implementations, the information item is a change in context of a user. Upon determining that the information item is relevant to the urgency value of the first notification item, the urgency value of the first notification item is adjusted. Upon determining that the adjusted urgency value satisfies the predetermined threshold, a first audio prompt is provided to a user.

23 Claims, 13 Drawing Sheets

(56) References Cited

U.S. PATENT DOCUMENTS

| | | |
|---|---|---|
| 4,653,021 A | 3/1987 | Takagi |
| 4,688,195 A | 8/1987 | Thompson et al. |
| 4,692,941 A | 9/1987 | Jacks et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| 4,776,016 A | 10/1988 | Hansen |
| 4,783,807 A | 11/1988 | Marley |
| 4,811,243 A | 3/1989 | Racine |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,833,712 A | 5/1989 | Bahl et al. |
| 4,839,853 A | 6/1989 | Deerwester et al. |
| 4,852,168 A | 7/1989 | Sprague |
| 4,862,504 A | 8/1989 | Nomura |
| 4,878,230 A | 10/1989 | Murakami et al. |
| 4,903,305 A | 2/1990 | Gillick et al. |
| 4,905,163 A | 2/1990 | Garber et al. |
| 4,914,586 A | 4/1990 | Swinehart et al. |
| 4,914,590 A | 4/1990 | Loatman et al. |
| 4,944,013 A | 7/1990 | Gouvianakis et al. |
| 4,955,047 A | 9/1990 | Morganstein et al. |
| 4,965,763 A | 10/1990 | Zamora |
| 4,974,191 A | 11/1990 | Amirghodsi et al. |
| 4,977,598 A | 12/1990 | Doddington et al. |
| 4,992,972 A | 2/1991 | Brooks et al. |
| 5,010,574 A | 4/1991 | Wang |
| 5,020,112 A | 5/1991 | Chou |
| 5,021,971 A | 6/1991 | Lindsay |
| 5,022,081 A | 6/1991 | Hirose et al. |
| 5,027,406 A | 6/1991 | Roberts et al. |
| 5,031,217 A | 7/1991 | Nishimura |
| 5,032,989 A | 7/1991 | Tornetta |
| 5,040,218 A | 8/1991 | Vitale et al. |
| 5,047,617 A | 9/1991 | Shepard et al. |
| 5,057,915 A | 10/1991 | Von Kohorn |
| 5,072,452 A | 12/1991 | Brown et al. |
| 5,091,945 A | 2/1992 | Kleijn |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,142,584 A | 8/1992 | Ozawa |
| 5,164,900 A | 11/1992 | Bernath |
| 5,165,007 A | 11/1992 | Bahl et al. |
| 5,179,627 A | 1/1993 | Sweet et al. |
| 5,179,652 A | 1/1993 | Rozmanith et al. |
| 5,194,950 A | 3/1993 | Murakami et al. |
| 5,197,005 A | 3/1993 | Shwartz et al. |
| 5,199,077 A | 3/1993 | Wilcox et al. |
| 5,202,952 A | 4/1993 | Gillick et al. |
| 5,208,862 A | 5/1993 | Ozawa |
| 5,216,747 A | 6/1993 | Hardwick et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,235,680 A | 8/1993 | Bijnagte |
| 5,267,345 A | 11/1993 | Brown et al. |
| 5,268,990 A | 12/1993 | Cohen et al. |
| 5,282,265 A | 1/1994 | Rohra Suda et al. |
| RE34,562 E | 3/1994 | Murakami et al. |
| 5,291,286 A | 3/1994 | Murakami et al. |
| 5,293,448 A | 3/1994 | Honda |
| 5,293,452 A | 3/1994 | Picone et al. |
| 5,297,170 A | 3/1994 | Eyuboglu et al. |
| 5,301,109 A | 4/1994 | Landauer et al. |
| 5,303,406 A | 4/1994 | Hansen et al. |
| 5,309,359 A | 5/1994 | Katz et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,327,498 A | 7/1994 | Hamon |
| 5,333,236 A | 7/1994 | Bahl et al. |
| 5,333,275 A | 7/1994 | Wheatley et al. |
| 5,345,536 A | 9/1994 | Hoshimi et al. |
| 5,349,645 A | 9/1994 | Zhao |
| 5,353,377 A | 10/1994 | Kuroda et al. |
| 5,377,301 A | 12/1994 | Rosenberg et al. |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,279 A | 2/1995 | Strong |
| 5,396,625 A | 3/1995 | Parkes |
| 5,400,434 A | 3/1995 | Pearson |
| 5,404,295 A | 4/1995 | Katz et al. |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,424,947 A | 6/1995 | Nagao et al. |
| 5,434,777 A | 7/1995 | Luciw |
| 5,444,823 A | 8/1995 | Nguyen |
| 5,455,888 A | 10/1995 | Iyengar et al. |
| 5,469,529 A | 11/1995 | Bimbot et al. |
| 5,471,611 A | 11/1995 | McGregor |
| 5,475,587 A | 12/1995 | Anick et al. |
| 5,479,488 A | 12/1995 | Lennig et al. |
| 5,491,772 A | 2/1996 | Hardwick et al. |
| 5,493,677 A | 2/1996 | Balogh et al. |
| 5,495,604 A | 2/1996 | Harding et al. |
| 5,502,790 A | 3/1996 | Yi |
| 5,502,791 A | 3/1996 | Nishimura et al. |
| 5,515,475 A | 5/1996 | Gupta et al. |
| 5,536,902 A | 7/1996 | Serra et al. |
| 5,537,618 A | 7/1996 | Boulton et al. |
| 5,574,823 A | 11/1996 | Hassanein et al. |
| 5,577,241 A | 11/1996 | Spencer |
| 5,578,808 A | 11/1996 | Taylor |
| 5,579,436 A | 11/1996 | Chou et al. |
| 5,581,655 A | 12/1996 | Cohen et al. |
| 5,584,024 A | 12/1996 | Shwartz |
| 5,596,676 A | 1/1997 | Swaminathan et al. |
| 5,596,994 A | 1/1997 | Bro |
| 5,608,624 A | 3/1997 | Luciw |
| 5,613,036 A | 3/1997 | Strong |
| 5,617,507 A | 4/1997 | Lee et al. |
| 5,619,694 A | 4/1997 | Shimazu |
| 5,621,859 A | 4/1997 | Schwartz et al. |
| 5,621,903 A | 4/1997 | Luciw et al. |
| 5,642,464 A | 6/1997 | Yue et al. |
| 5,642,519 A | 6/1997 | Martin |
| 5,644,727 A | 7/1997 | Atkins |
| 5,664,055 A | 9/1997 | Kroon |
| 5,675,819 A | 10/1997 | Schuetze |
| 5,682,539 A | 10/1997 | Conrad et al. |
| 5,687,077 A | 11/1997 | Gough, Jr. |
| 5,696,962 A | 12/1997 | Kupiec |
| 5,701,400 A | 12/1997 | Amado |
| 5,706,442 A | 1/1998 | Anderson et al. |
| 5,710,886 A | 1/1998 | Christensen et al. |
| 5,712,957 A | 1/1998 | Waibel et al. |
| 5,715,468 A | 2/1998 | Budzinski |
| 5,721,827 A | 2/1998 | Logan et al. |
| 5,727,950 A | 3/1998 | Cook et al. |
| 5,729,694 A | 3/1998 | Holzrichter et al. |
| 5,732,216 A | 3/1998 | Logan et al. |
| 5,732,390 A | 3/1998 | Katayanagi et al. |
| 5,734,791 A | 3/1998 | Acero et al. |
| 5,737,734 A | 4/1998 | Schultz |
| 5,748,974 A | 5/1998 | Johnson |
| 5,749,081 A | 5/1998 | Whiteis |
| 5,759,101 A | 6/1998 | Von Kohorn |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,799,276 A | 8/1998 | Komissarchik et al. |

(56) References Cited

U.S. PATENT DOCUMENTS

| | | |
|---|---|---|
| 5,822,743 A | 10/1998 | Gupta et al. |
| 5,825,881 A | 10/1998 | Colvin, Sr. |
| 5,826,261 A | 10/1998 | Spencer |
| 5,828,999 A | 10/1998 | Bellegarda et al. |
| 5,835,893 A | 11/1998 | Ushioda |
| 5,839,106 A | 11/1998 | Bellegarda |
| 5,845,255 A | 12/1998 | Mayaud |
| 5,857,184 A | 1/1999 | Lynch |
| 5,860,063 A | 1/1999 | Gorin et al. |
| 5,862,233 A | 1/1999 | Poletti |
| 5,864,806 A | 1/1999 | Mokbel et al. |
| 5,864,844 A | 1/1999 | James et al. |
| 5,867,799 A | 2/1999 | Lang et al. |
| 5,873,056 A | 2/1999 | Liddy et al. |
| 5,875,437 A | 2/1999 | Atkins |
| 5,884,323 A | 3/1999 | Hawkins et al. |
| 5,895,464 A | 4/1999 | Bhandari et al. |
| 5,895,466 A | 4/1999 | Goldberg et al. |
| 5,899,972 A | 5/1999 | Miyazawa et al. |
| 5,913,193 A | 6/1999 | Huang et al. |
| 5,915,249 A | 6/1999 | Spencer |
| 5,930,769 A | 7/1999 | Rose |
| 5,933,822 A | 8/1999 | Braden-Harder et al. |
| 5,936,926 A | 8/1999 | Yokouchi et al. |
| 5,940,811 A | 8/1999 | Norris |
| 5,941,944 A | 8/1999 | Messerly |
| 5,943,670 A | 8/1999 | Prager |
| 5,948,040 A | 9/1999 | DeLorme et al. |
| 5,956,699 A | 9/1999 | Wong et al. |
| 5,960,394 A | 9/1999 | Gould et al. |
| 5,960,422 A | 9/1999 | Prasad |
| 5,963,924 A | 10/1999 | Williams et al. |
| 5,966,126 A | 10/1999 | Szabo |
| 5,970,474 A | 10/1999 | Leroy et al. |
| 5,974,146 A | 10/1999 | Randle et al. |
| 5,982,891 A | 11/1999 | Ginter et al. |
| 5,987,132 A | 11/1999 | Rowney |
| 5,987,140 A | 11/1999 | Rowney et al. |
| 5,987,404 A | 11/1999 | Della Pietra et al. |
| 5,987,440 A | 11/1999 | O'Neil et al. |
| 5,999,908 A | 12/1999 | Abelow |
| 6,016,471 A | 1/2000 | Kuhn et al. |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,038,533 A | 3/2000 | Buchsbaum et al. |
| 6,052,656 A | 4/2000 | Suda et al. |
| 6,055,514 A | 4/2000 | Wren |
| 6,055,531 A | 4/2000 | Bennett et al. |
| 6,064,960 A | 5/2000 | Bellegarda et al. |
| 6,070,139 A | 5/2000 | Miyazawa et al. |
| 6,070,147 A | 5/2000 | Harms et al. |
| 6,076,051 A | 6/2000 | Messerly et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,088,731 A | 7/2000 | Kiraly et al. |
| 6,094,649 A | 7/2000 | Bowen et al. |
| 6,105,865 A | 8/2000 | Hardesty |
| 6,108,627 A | 8/2000 | Sabourin |
| 6,119,101 A | 9/2000 | Peckover |
| 6,122,616 A | 9/2000 | Henton |
| 6,125,356 A | 9/2000 | Brockman et al. |
| 6,144,938 A | 11/2000 | Surace et al. |
| 6,173,261 B1 | 1/2001 | Arai et al. |
| 6,173,279 B1 | 1/2001 | Levin et al. |
| 6,188,999 B1 | 2/2001 | Moody |
| 6,195,641 B1 | 2/2001 | Loring et al. |
| 6,205,456 B1 | 3/2001 | Nakao |
| 6,208,971 B1 | 3/2001 | Bellegarda et al. |
| 6,233,559 B1 | 5/2001 | Balakrishnan |
| 6,233,578 B1 | 5/2001 | Machihara et al. |
| 6,246,981 B1 | 6/2001 | Papineni et al. |
| 6,260,024 B1 | 7/2001 | Shkedy |
| 6,266,637 B1 | 7/2001 | Donovan et al. |
| 6,275,824 B1 | 8/2001 | O'Flaherty et al. |
| 6,285,786 B1 | 9/2001 | Seni et al. |
| 6,308,149 B1 | 10/2001 | Gaussier et al. |
| 6,311,189 B1 | 10/2001 | deVries et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,334,103 B1 | 12/2001 | Surace et al. |
| 6,356,854 B1 | 3/2002 | Schubert et al. |
| 6,356,905 B1 | 3/2002 | Gershman et al. |
| 6,366,883 B1 | 4/2002 | Campbell et al. |
| 6,366,884 B1 | 4/2002 | Bellegarda et al. |
| 6,421,672 B1 | 7/2002 | McAllister et al. |
| 6,434,524 B1 | 8/2002 | Weber |
| 6,446,076 B1 | 9/2002 | Burkey et al. |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,460,029 B1 | 10/2002 | Fries et al. |
| 6,466,654 B1 | 10/2002 | Cooper et al. |
| 6,477,488 B1 | 11/2002 | Bellegarda |
| 6,487,534 B1 | 11/2002 | Thelen et al. |
| 6,499,013 B1 | 12/2002 | Weber |
| 6,501,937 B1 | 12/2002 | Ho et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,510,417 B1 | 1/2003 | Woods et al. |
| 6,513,063 B1 | 1/2003 | Julia et al. |
| 6,519,565 B1 | 2/2003 | Clements et al. |
| 6,523,061 B1 | 2/2003 | Halverson et al. |
| 6,523,172 B1 | 2/2003 | Martinez-Guerra et al. |
| 6,526,382 B1 | 2/2003 | Yuschik |
| 6,526,395 B1 | 2/2003 | Morris |
| 6,532,444 B1 | 3/2003 | Weber |
| 6,532,446 B1 | 3/2003 | King |
| 6,546,388 B1 | 4/2003 | Edlund et al. |
| 6,553,344 B2 | 4/2003 | Bellegarda et al. |
| 6,556,983 B1 | 4/2003 | Altschuler et al. |
| 6,584,464 B1 | 6/2003 | Warthen |
| 6,598,039 B1 | 7/2003 | Livowsky |
| 6,601,026 B2 | 7/2003 | Appelt et al. |
| 6,601,234 B1 | 7/2003 | Bowman-Amuah |
| 6,604,059 B2 | 8/2003 | Strubbe et al. |
| 6,615,172 B1 | 9/2003 | Bennett et al. |
| 6,615,175 B1 | 9/2003 | Gazdzinski |
| 6,615,220 B1 | 9/2003 | Austin et al. |
| 6,625,583 B1 | 9/2003 | Silverman et al. |
| 6,631,346 B1 | 10/2003 | Karaorman et al. |
| 6,633,846 B1 | 10/2003 | Bennett et al. |
| 6,647,260 B2 | 11/2003 | Dusse et al. |
| 6,650,735 B2 | 11/2003 | Burton et al. |
| 6,654,740 B2 | 11/2003 | Tokuda et al. |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,684,187 B1 | 1/2004 | Conkie |
| 6,691,064 B2 | 2/2004 | Vroman |
| 6,691,111 B2 | 2/2004 | Lazaridis et al. |
| 6,691,151 B1 | 2/2004 | Cheyer et al. |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,711,585 B1 | 3/2004 | Copperman et al. |
| 6,718,324 B2 | 4/2004 | Edlund et al. |
| 6,721,728 B2 | 4/2004 | McGreevy |
| 6,735,632 B1 | 5/2004 | Kiraly et al. |
| 6,742,021 B1 | 5/2004 | Halverson et al. |
| 6,757,362 B1 | 6/2004 | Cooper et al. |
| 6,757,718 B1 | 6/2004 | Halverson et al. |
| 6,766,320 B1 | 7/2004 | Wang et al. |
| 6,772,123 B2 | 8/2004 | Cooklev et al. |
| 6,778,951 B1 | 8/2004 | Contractor |

(56) References Cited

U.S. PATENT DOCUMENTS

| | | | |
|---|---|---|---|
| 6,778,952 B2 | 8/2004 | Bellegarda |
| 6,778,962 B1 | 8/2004 | Kasai et al. |
| 6,778,970 B2 | 8/2004 | Au |
| 6,792,082 B1 | 9/2004 | Levine |
| 6,807,574 B1 | 10/2004 | Partovi et al. |
| 6,810,379 B1 | 10/2004 | Vermeulen et al. |
| 6,813,491 B1 | 11/2004 | McKinney |
| 6,829,603 B1 | 12/2004 | Chai et al. |
| 6,832,194 B1 | 12/2004 | Mozer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,851,115 B1 | 2/2005 | Cheyer et al. |
| 6,859,931 B1 | 2/2005 | Cheyer et al. |
| 6,895,380 B2 | 5/2005 | Sepe, Jr. |
| 6,895,558 B1 | 5/2005 | Loveland |
| 6,901,399 B1 | 5/2005 | Corston et al. |
| 6,912,499 B1 | 6/2005 | Sabourin et al. |
| 6,924,828 B1 | 8/2005 | Hirsch |
| 6,928,614 B1 | 8/2005 | Everhart |
| 6,931,384 B1 | 8/2005 | Horvitz et al. |
| 6,934,684 B2 | 8/2005 | Alpdemir et al. |
| 6,937,975 B1 | 8/2005 | Elworthy |
| 6,937,986 B2 | 8/2005 | Denenberg et al. |
| 6,964,023 B2 | 11/2005 | Maes et al. |
| 6,980,949 B2 | 12/2005 | Ford |
| 6,980,955 B2 | 12/2005 | Okutani et al. |
| 6,985,865 B1 | 1/2006 | Packingham et al. |
| 6,988,071 B1 | 1/2006 | Gazdzinski |
| 6,996,531 B2 | 2/2006 | Korall et al. |
| 6,999,927 B2 | 2/2006 | Mozer et al. |
| 7,020,685 B1 | 3/2006 | Chen et al. |
| 7,024,363 B1 | 4/2006 | Comerford et al. |
| 7,027,974 B1 | 4/2006 | Busch et al. |
| 7,036,128 B1 | 4/2006 | Julia et al. |
| 7,050,977 B1 | 5/2006 | Bennett |
| 7,058,569 B2 | 6/2006 | Coorman et al. |
| 7,062,428 B2 | 6/2006 | Hogenhout et al. |
| 7,069,560 B1 | 6/2006 | Cheyer et al. |
| 7,092,887 B2 | 8/2006 | Mozer et al. |
| 7,092,928 B1 | 8/2006 | Elad et al. |
| 7,093,693 B1 | 8/2006 | Gazdzinski |
| 7,120,865 B1 * | 10/2006 | Horvitz ............ G06Q 10/107 709/207 |
| 7,127,046 B1 | 10/2006 | Smith et al. |
| 7,127,403 B1 | 10/2006 | Saylor et al. |
| 7,136,710 B1 | 11/2006 | Hoffberg et al. |
| 7,137,126 B1 | 11/2006 | Coffman et al. |
| 7,139,714 B2 | 11/2006 | Bennett et al. |
| 7,139,722 B2 | 11/2006 | Perrella et al. |
| 7,152,070 B1 | 12/2006 | Musick et al. |
| 7,177,798 B2 | 2/2007 | Hsu et al. |
| 7,197,460 B1 | 3/2007 | Gupta et al. |
| 7,200,559 B2 | 4/2007 | Wang |
| 7,203,646 B2 | 4/2007 | Bennett |
| 7,216,073 B2 | 5/2007 | Lavi et al. |
| 7,216,080 B2 | 5/2007 | Tsiao et al. |
| 7,225,125 B2 | 5/2007 | Bennett et al. |
| 7,233,790 B2 | 6/2007 | Kjellberg et al. |
| 7,233,904 B2 | 6/2007 | Luisi |
| 7,266,496 B2 | 9/2007 | Wang et al. |
| 7,277,854 B2 | 10/2007 | Bennett et al. |
| 7,290,039 B1 | 10/2007 | Lisitsa et al. |
| 7,299,033 B2 | 11/2007 | Kjellberg et al. |
| 7,310,600 B1 | 12/2007 | Garner et al. |
| 7,324,947 B2 | 1/2008 | Jordan et al. |
| 7,349,953 B2 | 3/2008 | Lisitsa et al. |
| 7,376,556 B2 | 5/2008 | Bennett |
| 7,376,645 B2 | 5/2008 | Bernard |
| 7,379,874 B2 | 5/2008 | Schmid et al. |
| 7,386,449 B2 | 6/2008 | Sun et al. |
| 7,389,224 B1 | 6/2008 | Elworthy |
| 7,392,185 B2 | 6/2008 | Bennett |
| 7,398,209 B2 | 7/2008 | Kennewick et al. |
| 7,403,938 B2 | 7/2008 | Harrison et al. |
| 7,409,337 B1 | 8/2008 | Potter et al. |
| 7,415,100 B2 | 8/2008 | Cooper et al. |
| 7,418,392 B1 | 8/2008 | Mozer et al. |
| 7,426,467 B2 | 9/2008 | Nashida et al. |
| 7,427,024 B1 | 9/2008 | Gazdzinski et al. |
| 7,447,635 B1 | 11/2008 | Konopka et al. |
| 7,454,351 B2 | 11/2008 | Jeschke et al. |
| 7,467,087 B1 | 12/2008 | Gillick et al. |
| 7,475,010 B2 | 1/2009 | Chao |
| 7,483,894 B2 | 1/2009 | Cao |
| 7,487,089 B2 | 2/2009 | Mozer |
| 7,496,498 B2 | 2/2009 | Chu et al. |
| 7,496,512 B2 | 2/2009 | Zhao et al. |
| 7,502,738 B2 | 3/2009 | Kennewick et al. |
| 7,508,373 B2 | 3/2009 | Lin et al. |
| 7,522,927 B2 | 4/2009 | Fitch et al. |
| 7,523,108 B2 | 4/2009 | Cao |
| 7,526,466 B2 | 4/2009 | Au |
| 7,529,671 B2 | 5/2009 | Rockenbeck et al. |
| 7,529,676 B2 | 5/2009 | Koyama |
| 7,539,656 B2 | 5/2009 | Fratkina et al. |
| 7,546,382 B2 | 6/2009 | Healey et al. |
| 7,548,895 B2 | 6/2009 | Pulsipher |
| 7,552,055 B2 | 6/2009 | Lecoeuche |
| 7,555,431 B2 | 6/2009 | Bennett |
| 7,558,730 B2 | 7/2009 | Davis et al. |
| 7,568,151 B2 * | 7/2009 | Bargeron ............ G06F 17/24 715/230 |
| 7,571,106 B2 | 8/2009 | Cao et al. |
| 7,599,918 B2 | 10/2009 | Shen et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,636,657 B2 | 12/2009 | Ju et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,664,638 B2 | 2/2010 | Cooper et al. |
| 7,672,841 B2 | 3/2010 | Bennett |
| 7,676,026 B1 | 3/2010 | Baxter, Jr. |
| 7,684,985 B2 | 3/2010 | Dominach et al. |
| 7,693,715 B2 | 4/2010 | Hwang et al. |
| 7,693,720 B2 | 4/2010 | Kennewick et al. |
| 7,698,131 B2 | 4/2010 | Bennett |
| 7,702,500 B2 | 4/2010 | Blaedow |
| 7,702,508 B2 | 4/2010 | Bennett |
| 7,707,027 B2 | 4/2010 | Balchandran et al. |
| 7,707,032 B2 | 4/2010 | Wang et al. |
| 7,707,267 B2 | 4/2010 | Lisitsa et al. |
| 7,711,565 B1 | 5/2010 | Gazdzinski |
| 7,711,672 B2 | 5/2010 | Au |
| 7,716,056 B2 | 5/2010 | Weng et al. |
| 7,720,674 B2 | 5/2010 | Kaiser et al. |
| 7,720,683 B1 | 5/2010 | Vermeulen et al. |
| 7,721,301 B2 | 5/2010 | Wong et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,729,916 B2 | 6/2010 | Coffman et al. |
| 7,734,461 B2 | 6/2010 | Kwak et al. |
| 7,747,616 B2 | 6/2010 | Yamada et al. |
| 7,752,152 B2 | 7/2010 | Paek et al. |
| 7,756,868 B2 | 7/2010 | Lee |
| 7,774,204 B2 | 8/2010 | Mozer et al. |
| 7,783,486 B2 | 8/2010 | Rosser et al. |
| 7,801,729 B2 | 9/2010 | Mozer |
| 7,809,570 B2 | 10/2010 | Kennewick et al. |
| 7,809,610 B2 | 10/2010 | Cao |
| 7,818,176 B2 | 10/2010 | Freeman et al. |
| 7,822,608 B2 | 10/2010 | Cross, Jr. et al. |
| 7,826,945 B2 | 11/2010 | Zhang et al. |
| 7,831,426 B2 | 11/2010 | Bennett |
| 7,840,400 B2 | 11/2010 | Lavi et al. |
| 7,840,447 B2 | 11/2010 | Kleinrock et al. |
| 7,853,574 B2 | 12/2010 | Kraenzel et al. |
| 7,853,664 B1 | 12/2010 | Wang et al. |
| 7,873,519 B2 | 1/2011 | Bennett |

(56) References Cited

U.S. PATENT DOCUMENTS

| | | |
|---|---|---|
| 7,873,654 B2 | 1/2011 | Bernard |
| 7,881,936 B2 | 2/2011 | Longe et al. |
| 7,889,101 B2 | 2/2011 | Yokota |
| 7,890,652 B2 | 2/2011 | Bull et al. |
| 7,912,702 B2 | 3/2011 | Bennett |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,925,525 B2 | 4/2011 | Chin |
| 7,930,168 B2 | 4/2011 | Weng et al. |
| 7,949,529 B2 | 5/2011 | Weider et al. |
| 7,949,534 B2 | 5/2011 | Davis et al. |
| 7,974,844 B2 | 7/2011 | Sumita |
| 7,974,972 B2 | 7/2011 | Cao |
| 7,983,915 B2 | 7/2011 | Knight et al. |
| 7,983,917 B2 | 7/2011 | Kennewick et al. |
| 7,983,997 B2 | 7/2011 | Allen et al. |
| 7,986,431 B2 | 7/2011 | Emori et al. |
| 7,987,151 B2 | 7/2011 | Schott et al. |
| 7,996,228 B2 | 8/2011 | Miller et al. |
| 8,000,453 B2 | 8/2011 | Cooper et al. |
| 8,005,679 B2 | 8/2011 | Jordan et al. |
| 8,015,006 B2 | 9/2011 | Kennewick et al. |
| 8,024,195 B2 | 9/2011 | Mozer et al. |
| 8,032,383 B1 | 10/2011 | Bhardwaj et al. |
| 8,036,901 B2 | 10/2011 | Mozer |
| 8,041,570 B2 | 10/2011 | Mirkovic et al. |
| 8,041,611 B2 | 10/2011 | Kleinrock et al. |
| 8,055,708 B2 | 11/2011 | Chitsaz et al. |
| 8,065,155 B1 | 11/2011 | Gazdzinski |
| 8,065,156 B1 | 11/2011 | Gazdzinski |
| 8,069,046 B2 | 11/2011 | Kennewick et al. |
| 8,073,681 B2 | 12/2011 | Baldwin et al. |
| 8,078,473 B1 | 12/2011 | Gazdzinski |
| 8,082,153 B2 | 12/2011 | Coffman et al. |
| 8,095,364 B2 | 1/2012 | Longe et al. |
| 8,099,289 B2 | 1/2012 | Mozer et al. |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,131,557 B2 | 3/2012 | Davis et al. |
| 8,140,335 B2 | 3/2012 | Kennewick et al. |
| 8,165,886 B1 | 4/2012 | Gagnon et al. |
| 8,166,019 B1 | 4/2012 | Lee et al. |
| 8,190,359 B2 | 5/2012 | Bourne |
| 8,195,467 B2 | 6/2012 | Mozer et al. |
| 8,204,238 B2 | 6/2012 | Mozer |
| 8,205,788 B1 | 6/2012 | Gazdzinski et al. |
| 8,219,407 B1 | 7/2012 | Roy et al. |
| 8,285,551 B2 | 10/2012 | Gazdzinski |
| 8,285,553 B2 | 10/2012 | Gazdzinski |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,383 B2 | 10/2012 | Lindahl |
| 8,301,456 B2 | 10/2012 | Gazdzinski |
| 8,311,834 B1 | 11/2012 | Gazdzinski |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,447,612 B2 | 5/2013 | Gazdzinski |
| 2001/0047264 A1 | 11/2001 | Roundtree |
| 2001/0055963 A1* | 12/2001 | Cloutier .................. H04W 4/12 455/417 |
| 2002/0010584 A1 | 1/2002 | Schultz et al. |
| 2002/0032564 A1 | 3/2002 | Ehsani et al. |
| 2002/0035474 A1 | 3/2002 | Alpdemir |
| 2002/0046025 A1 | 4/2002 | Hain |
| 2002/0069063 A1 | 6/2002 | Buchner et al. |
| 2002/0077817 A1 | 6/2002 | Atal |
| 2002/0103641 A1 | 8/2002 | Kuo et al. |
| 2002/0111198 A1 | 8/2002 | Heie |
| 2002/0116185 A1 | 8/2002 | Cooper et al. |
| 2002/0116189 A1 | 8/2002 | Yeh et al. |
| 2002/0164000 A1 | 11/2002 | Cohen et al. |
| 2002/0198714 A1 | 12/2002 | Zhou |
| 2003/0088414 A1 | 5/2003 | Huang et al. |
| 2003/0097210 A1 | 5/2003 | Horst et al. |
| 2003/0135740 A1 | 7/2003 | Talmor et al. |
| 2004/0135701 A1 | 7/2004 | Yasuda et al. |
| 2004/0199387 A1 | 10/2004 | Wang et al. |
| 2004/0220798 A1 | 11/2004 | Chi et al. |
| 2004/0236778 A1 | 11/2004 | Junqua et al. |
| 2005/0002507 A1 | 1/2005 | Timmins et al. |
| 2005/0055403 A1 | 3/2005 | Brittan |
| 2005/0071332 A1 | 3/2005 | Ortega et al. |
| 2005/0080625 A1 | 4/2005 | Bennett et al. |
| 2005/0091118 A1 | 4/2005 | Fano |
| 2005/0102614 A1 | 5/2005 | Brockett et al. |
| 2005/0108001 A1 | 5/2005 | Aarskog |
| 2005/0114124 A1 | 5/2005 | Liu et al. |
| 2005/0119897 A1 | 6/2005 | Bennett et al. |
| 2005/0143972 A1 | 6/2005 | Gopalakrishnan et al. |
| 2005/0165607 A1 | 7/2005 | Di Fabbrizio et al. |
| 2005/0182629 A1 | 8/2005 | Coorman et al. |
| 2005/0196733 A1 | 9/2005 | Budra et al. |
| 2005/0273626 A1 | 12/2005 | Pearson et al. |
| 2005/0288936 A1 | 12/2005 | Busayapongchai et al. |
| 2006/0018492 A1 | 1/2006 | Chiu et al. |
| 2006/0041626 A1* | 2/2006 | Chen ..................... H04L 51/34 709/206 |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0117002 A1 | 6/2006 | Swen |
| 2006/0122834 A1 | 6/2006 | Bennett |
| 2006/0143007 A1 | 6/2006 | Koh et al. |
| 2006/0217967 A1 | 9/2006 | Goertzen et al. |
| 2006/0235700 A1 | 10/2006 | Wong et al. |
| 2007/0041361 A1 | 2/2007 | Iso-Sipila |
| 2007/0055529 A1 | 3/2007 | Kanevsky et al. |
| 2007/0058832 A1 | 3/2007 | Hug et al. |
| 2007/0088556 A1 | 4/2007 | Andrew |
| 2007/0100790 A1 | 5/2007 | Cheyer et al. |
| 2007/0106674 A1 | 5/2007 | Agrawal et al. |
| 2007/0118377 A1 | 5/2007 | Badino et al. |
| 2007/0135949 A1 | 6/2007 | Snover et al. |
| 2007/0174188 A1 | 7/2007 | Fish |
| 2007/0185917 A1 | 8/2007 | Prahlad et al. |
| 2007/0282595 A1 | 12/2007 | Tunning et al. |
| 2008/0015864 A1 | 1/2008 | Ross et al. |
| 2008/0021708 A1 | 1/2008 | Bennett et al. |
| 2008/0034032 A1 | 2/2008 | Healey et al. |
| 2008/0052063 A1 | 2/2008 | Bennett et al. |
| 2008/0082332 A1 | 4/2008 | Mallett et al. |
| 2008/0082338 A1 | 4/2008 | O'Neil et al. |
| 2008/0120112 A1 | 5/2008 | Jordan et al. |
| 2008/0129520 A1 | 6/2008 | Lee |
| 2008/0140416 A1 | 6/2008 | Shostak |
| 2008/0140657 A1 | 6/2008 | Azvine et al. |
| 2008/0221903 A1 | 9/2008 | Kanevsky et al. |
| 2008/0228496 A1 | 9/2008 | Yu et al. |
| 2008/0247519 A1 | 10/2008 | Abella et al. |
| 2008/0249770 A1 | 10/2008 | Kim et al. |
| 2008/0256613 A1 | 10/2008 | Grover |
| 2008/0300878 A1 | 12/2008 | Bennett |
| 2008/0319763 A1 | 12/2008 | Di Fabbrizio et al. |
| 2009/0006100 A1 | 1/2009 | Badger et al. |
| 2009/0006343 A1 | 1/2009 | Platt et al. |
| 2009/0018835 A1 | 1/2009 | Cooper et al. |
| 2009/0030800 A1 | 1/2009 | Grois |
| 2009/0055179 A1 | 2/2009 | Cho et al. |
| 2009/0058823 A1 | 3/2009 | Kocienda |
| 2009/0076796 A1 | 3/2009 | Daraselia |
| 2009/0077165 A1 | 3/2009 | Rhodes et al. |
| 2009/0100049 A1 | 4/2009 | Cao |
| 2009/0112677 A1 | 4/2009 | Rhett |
| 2009/0125602 A1* | 5/2009 | Bhatia .................. H04L 51/26 709/207 |
| 2009/0150156 A1 | 6/2009 | Kennewick et al. |
| 2009/0157401 A1 | 6/2009 | Bennett |
| 2009/0164441 A1 | 6/2009 | Cheyer |

(56) References Cited

U.S. PATENT DOCUMENTS

| | | |
|---|---|---|
| 2009/0171664 A1 | 7/2009 | Kennewick et al. |
| 2009/0204409 A1 | 8/2009 | Mozer et al. |
| 2009/0287583 A1 | 11/2009 | Holmes |
| 2009/0290718 A1 | 11/2009 | Kahn et al. |
| 2009/0299745 A1 | 12/2009 | Kennewick et al. |
| 2009/0299849 A1 | 12/2009 | Cao et al. |
| 2009/0307162 A1 | 12/2009 | Bui et al. |
| 2010/0005081 A1 | 1/2010 | Bennett |
| 2010/0023320 A1 | 1/2010 | Di Cristo et al. |
| 2010/0026526 A1* | 2/2010 | Yokota ............ G08G 1/096827 340/996 |
| 2010/0036660 A1 | 2/2010 | Bennett |
| 2010/0042400 A1 | 2/2010 | Block et al. |
| 2010/0088020 A1 | 4/2010 | Sano et al. |
| 2010/0088100 A1 | 4/2010 | Lindahl |
| 2010/0131273 A1 | 5/2010 | Aley-Raz et al. |
| 2010/0138215 A1 | 6/2010 | Williams |
| 2010/0145700 A1 | 6/2010 | Kennewick et al. |
| 2010/0204986 A1 | 8/2010 | Kennewick et al. |
| 2010/0211644 A1* | 8/2010 | Lavoie ................. G06Q 10/107 709/206 |
| 2010/0217604 A1 | 8/2010 | Baldwin et al. |
| 2010/0228540 A1 | 9/2010 | Bennett |
| 2010/0235341 A1 | 9/2010 | Bennett |
| 2010/0257160 A1 | 10/2010 | Cao |
| 2010/0262599 A1 | 10/2010 | Nitz |
| 2010/0277579 A1 | 11/2010 | Cho et al. |
| 2010/0278320 A1 | 11/2010 | Arsenault et al. |
| 2010/0280983 A1 | 11/2010 | Cho et al. |
| 2010/0286985 A1 | 11/2010 | Kennewick et al. |
| 2010/0299142 A1 | 11/2010 | Freeman et al. |
| 2010/0312547 A1 | 12/2010 | Van Os et al. |
| 2010/0318576 A1 | 12/2010 | Kim |
| 2010/0332235 A1 | 12/2010 | David |
| 2010/0332348 A1 | 12/2010 | Cao |
| 2011/0047072 A1 | 2/2011 | Ciurea |
| 2011/0060807 A1 | 3/2011 | Martin et al. |
| 2011/0082688 A1 | 4/2011 | Kim et al. |
| 2011/0112827 A1 | 5/2011 | Kennewick et al. |
| 2011/0112921 A1 | 5/2011 | Kennewick et al. |
| 2011/0119049 A1 | 5/2011 | Ylonen |
| 2011/0125540 A1 | 5/2011 | Jang et al. |
| 2011/0130958 A1 | 6/2011 | Stahl et al. |
| 2011/0131036 A1 | 6/2011 | DiCristo et al. |
| 2011/0131045 A1 | 6/2011 | Cristo et al. |
| 2011/0143811 A1 | 6/2011 | Rodriguez |
| 2011/0144999 A1 | 6/2011 | Jang et al. |
| 2011/0161076 A1 | 6/2011 | Davis et al. |
| 2011/0161309 A1 | 6/2011 | Lung et al. |
| 2011/0175810 A1 | 7/2011 | Markovic et al. |
| 2011/0183650 A1 | 7/2011 | McKee |
| 2011/0184730 A1 | 7/2011 | LeBeau et al. |
| 2011/0218855 A1 | 9/2011 | Cao et al. |
| 2011/0231182 A1 | 9/2011 | Weider et al. |
| 2011/0231188 A1 | 9/2011 | Kennewick et al. |
| 2011/0264643 A1 | 10/2011 | Cao |
| 2011/0279368 A1 | 11/2011 | Klein et al. |
| 2011/0298585 A1 | 12/2011 | Barry |
| 2011/0306426 A1 | 12/2011 | Novak et al. |
| 2012/0002820 A1 | 1/2012 | Leichter |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | Lebeau et al. |
| 2012/0022869 A1 | 1/2012 | Lloyd et al. |
| 2012/0022870 A1 | 1/2012 | Kristjansson et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035908 A1 | 2/2012 | LeBeau et al. |
| 2012/0035924 A1 | 2/2012 | Jitkoff et al. |
| 2012/0035931 A1 | 2/2012 | Lebeau et al. |
| 2012/0035932 A1 | 2/2012 | Jitkoff et al. |
| 2012/0042343 A1 | 2/2012 | Laligand et al. |
| 2012/0137367 A1 | 5/2012 | Dupont et al. |
| 2012/0149342 A1 | 6/2012 | Cohen et al. |
| 2012/0173464 A1 | 7/2012 | Tur et al. |
| 2012/0265528 A1 | 10/2012 | Gruber et al. |
| 2012/0271676 A1 | 10/2012 | Aravamudan et al. |
| 2012/0295645 A1* | 11/2012 | Yariv .................... H04L 67/322 709/207 |
| 2012/0311583 A1 | 12/2012 | Gruber et al. |
| 2012/0330661 A1 | 12/2012 | Lindahl |
| 2013/0006638 A1 | 1/2013 | Lindahl |
| 2013/0041968 A1 | 2/2013 | Cohen et al. |
| 2013/0054706 A1 | 2/2013 | Graham et al. |
| 2013/0110518 A1 | 5/2013 | Gruber et al. |
| 2013/0110520 A1 | 5/2013 | Cheyer et al. |
| 2014/0237042 A1* | 8/2014 | Ahmed ................... H04L 67/02 709/204 |

FOREIGN PATENT DOCUMENTS

| | | |
|---|---|---|
| DE | 19841541 B4 | 12/2007 |
| EP | 0138061 A1 | 4/1985 |
| EP | 0218859 A2 | 4/1987 |
| EP | 0262938 A1 | 4/1988 |
| EP | 0138061 B1 | 6/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0559349 A1 | 9/1993 |
| EP | 0570660 A1 | 11/1993 |
| EP | 0863453 A1 | 9/1998 |
| EP | 0559349 B1 | 1/1999 |
| EP | 1229496 A2 | 8/2002 |
| EP | 1245023 A1 | 10/2002 |
| EP | 2109295 A1 | 10/2009 |
| GB | 2293667 A | 4/1996 |
| JP | 6-19965 A | 1/1994 |
| JP | 2001-125896 A | 5/2001 |
| JP | 2002-24212 A | 1/2002 |
| JP | 2003-517158 A | 5/2003 |
| JP | 2003-527656 A | 9/2003 |
| JP | 2009-36999 A | 2/2009 |
| KR | 10-0757496 B1 | 9/2007 |
| KR | 10-0776800 B1 | 11/2007 |
| KR | 10-0801227 B1 | 2/2008 |
| KR | 10-0810500 B1 | 3/2008 |
| KR | 10-2008-0109322 A | 12/2008 |
| KR | 10-2009-0086805 A | 8/2009 |
| KR | 10-0920267 B1 | 10/2009 |
| KR | 10-2010-0119519 A | 11/2010 |
| KR | 10-1032792 B1 | 5/2011 |
| KR | 10-2011-0113414 A | 10/2011 |
| WO | 1995/002221 A1 | 1/1995 |
| WO | 1997/026612 A1 | 7/1997 |
| WO | 1998/041956 A1 | 9/1998 |
| WO | 1999/001834 A1 | 1/1999 |
| WO | 1999/008238 A1 | 2/1999 |
| WO | 1999/056227 A1 | 11/1999 |
| WO | 2000/060435 A2 | 10/2000 |
| WO | 2000/060435 A3 | 4/2001 |
| WO | 2002/073603 A1 | 9/2002 |
| WO | 2006/129967 A1 | 12/2006 |
| WO | 2008/085742 A2 | 7/2008 |
| WO | 2008/109835 A2 | 9/2008 |
| WO | 2010/075623 A1 | 7/2010 |
| WO | 2011/088053 A2 | 7/2011 |

OTHER PUBLICATIONS

Hermansky, H., "Recognition of Speech in Additive and Convolutional Noise Based on Rasta Spectral Processing", In proceedings of IEEE International Conference on Acoustics, speech and Signal Processing (ICASSP'93), Apr. 27-30, 1993, pp. II-83-II-86.

(56) References Cited

OTHER PUBLICATIONS

Hirschman et al., "Multi-Site Data Collection and Evaluation in Spoken Language Understanding", Proceedings of the workshop on Human Language Technology, 1993, pp. 19-24.
Hobbs et al., "Fastus: A System for Extracting Information from Natural-Language Text", SRI International, Technical Note 519, Nov. 19, 1992, 26 pages.
Hobbs et al., "Fastus: Extracting Information from Natural-Language Texts", SRI International, 1992, pp. 1-22.
Hobbs, Jerry R., "Sublanguage and Knowledge", SRI International, Technical Note 329, Jun. 1984, 30 pages.
Hodjat et al., "Iterative Statistical Language Model Generation for Use with an Agent-Oriented Natural Language Interface", Proceedings of HCI International, vol. 4, Jun. 22-27, 2003, pp. 1422-1426.
Hoehfeld et al., "Learning with Limited Numerical Precision Using the Cascade-Correlation Algorithm", IEEE Transactions on Neural Networks, vol. 3, No. 4, Jul. 1992, 18 pages.
Holmes, J. N., "Speech Synthesis and Recognition—Stochastic Models for Word Recognition", Published by Chapman & Hall, London, ISBN 0 412 534304, 1998, 7 pages.
Hon et al., "CMU Robust Vocabulary-Independent Speech Recognition System", IEEE International Conference on Acoustics, Speech, and Signal Processing (ICASSP-91), Apr. 14-17, 1991, pp. 889-892.
Huang et al., "The SPHINX-II Speech Recognition System: An Overview", Computer, Speech and Language, Jan. 15, 1992, pp. 1-12.
Issar et al., "CMU's Robust Spoken Language Understanding System", Proceedings of Eurospeech, 1993, 4 pages.
Issar, Sunil, "Estimation of Language Models for New Spoken Language Applications", Proceedings of 4th International Conference on Spoken language Processing, Oct. 3-6, 1996, 4 pages.
Jacobs et al., "Scisor: Extracting Information from On-Line News", Communications of the ACM, vol. 33, No. 11, Nov. 1990, pp. 88-97.
Janas, Jurgen M., "The Semantics-Based Natural Language Interface to Relational Databases", Chapter 6, Cooperative Interfaces to Information Systems, 1986, pp. 143-188.
Jelinek, F., "Self-Organized Language Modeling for Speech Recognition,", Readings in Speech Recognition, edited by Alex Waibel and Kai-Fu Lee, Morgan Kaufmann Publishers, Inc., ISBN: 1-55860-124-4, May 15, 1990, 63 pages.
Jennings et al., "A Personal News Service Based on a User Model Neural Network", IEICE Transactions on Information and Systems, vol. E75-D, No. 2, Tokyo, JP, Mar. 1992, pp. 198-209.
Ji et al., "A Method for Chinese Syllables Recognition based upon Sub-syllable Hidden Markov Model", 1994 International Symposium on Speech, Image Processing and Neural Networks, Hong Kong, Apr. 13-16, 1994, pp. 730-733.
Johnson, Julia A., "A Data Management Strategy for Transportable Natural Language Interfaces", Doctoral thesis submitted to the Department of Computer Science, University of British Columbia, Canada, Jun. 1989, 285 pages.
Jones, J., "Speech Recognition for Cyclone", Apple Computer, Inc., E.R.S.Revision 2.9, Sep. 10, 1992, 93 pages.
Julia et al., "http://www.speech.sri.com/demos/atis.html", Proceedings of AAAI, Spring Symposium, 1997, 5 pages.
Julia et al., "Un editeur interactif de tableaux dessines a main levee (An Interactive Editor for Hand-Sketched Tables)", Traitement du Signal, vol. 12, No. 6, 1995, pp. 619-626.
Kahn et al., "CoABS Grid Scalability Experiments", Autonomous Agents and Multi-Agent Systems, vol. 7, 2003, pp. 171-178.
Kamel et al., "A Graph Based Knowledge Retrieval System", IEEE International Conference on Systems, Man and Cybernetics, 1990, pp. 269-275.
Karp, P. D., "A Generic Knowledge-Base Access Protocol", <http://lecture.cs.buu.ac.th/-f50353/Document/gfp.pdf>, May 12, 1994, 66 pages.
Kats et al., "Exploiting Lexical Regularities in Designing Natural Language Systems", In the Proceedings of the 12th International Conference on Computational Linguistics, 1988, pp. 1-22.
Katz et al., "REXTOR: A System for Generating Relations from Natural Language", In Proceedings of the ACL Workshop on Natural Language Processing and Information Retrieval (NLP&IR), Oct. 2000, 11 pages.
Katz, Boris, "A Three-Step Procedure for Language Generation", Massachusetts Institute of Technology, A.I. Memo No. 599, Dec. 1980, pp. 1-40.
Katz, Boris, "Annotating the World Wide Web Using Natural Language", In Proceedings of the 5th RIAO Conference on Computer Assisted Information Searching on the Internet, 1997, 7 pages.
Katz, Boris, "Using English for Indexing and Retrieving", Proceedings of the 1st RIAO Conference on User-Oriented Content-Based Text and Image Handling, 1988, pp. 314-332.
Katz, Slava. M., "Estimation of Probabilities from Sparse Data for the Language Model Component of a Speech Recognizer", IEEE Transactions on Acoustics, Speech, and Signal Processing, vol. ASSP-35, No. 3, Mar. 1987, 3 pages.
Kickstarter, "Ivee Sleek: Wi-Fi Voice-Activated Assistant", available online at <https://www.kickstarter.com/ projects/ivee/ivee-sleek-wi-fi-voice-activated-assistant> retrived from internet on Feb. 10 2014, 13 pages.
Kitano, H., "ΦDM-Dialog: An Experimental Speech-to-Speech Dialog Translation System", Computer, vol. 24, No. 6, Jun. 1991, 13 pages.
Klabbers et al., "Reducing Audible Spectral Discontinuities", IEEE Transactions on Speech and Audio Processing, vol. 9, No. 1, Jan. 2001, pp. 39-51.
Klatt Dennis H., "Linguistic Uses of Segmental Duration in English: Acoustic and Perpetual Evidence", Journal of the Acoustical Society of America, vol. 59, No. 5, May 1976, pp. 1208-1221.
Knownav, "Knowledge Navigator", YouTube Video available at <http://www.youtube.com/watch?v=QRH8eimU_20>, Apr. 29, 2008, 1 page.
Kominek et al., "Impact of Durational Outlier Removal from Unit Selection Catalogs", 5th ISCA Speech Synthesis Workshop, Jun. 14-16, 2004, 6 pages.
Konolige, Kurt, "A Framework for a Portable Natural-Language Interface to Large Data Bases", SRI International, Technical Note 197, Oct. 12, 1979, 54 pages.
Kubala et al., "Speaker Adaptation from a Speaker-Independent Training Corpus", International Conference on Acoustics, Speech, and Signal Processing (ICASSP'90), Apr. 3-6, 1990, 4 pages.
Kubala et al., "The Hub and Spoke Paradigm for CSR Evaluation", Proceedings of the Spoken Language Technology Workshop, Mar. 6-8, 1994, 9 pages.
Laird et al., "SOAR: An Architecture for General Intelligence", Artificial Intelligence, vol. 33, 1987, pp. 1-64.
Langly et al., "A Design for the ICARUS Archítechture", SIGART Bulletin, vol. 2, No. 4, 1991, pp. 104-109.
Larks, "Intelligent Software Agents", Available Online at <http://www.cs.cmu.edu/~softagents/larks.html> retrieved on Mar. 15, 2013, 2006, 2 pages.
Lee et al., "A Real-Time Mandarin Dictation Machine for Chinese Language with Unlimited Texts and Very Large Vocabulary", International Conference on Acoustics, Speech and Signal Processing, vol. 1, Apr. 3-6, 1990, 5 pages.
Lee et al., "Golden Mandarin(II)—An Improved Single-Chip Real-Time Mandarin Dictation Machine for Chinese Language with Very Large Vocabulary", 0-7803-0946-4/93 ©1993 IEEE, 1993, 4 pages.
Lee et al., "Golden Mandarin(II)—An Intelligent Mandarin Dictation Machine for Chinese Character Input with Adaptation/Learning Functions", International Symposium on Speech, Image Processing and Neural Networks, Hong Kong, Apr. 13-16, 1994, 5 pages.
Lee et al., "System Description of Golden Mandarin (I) Voice Input for Unlimited Chinese Characters", International Conference on Computer Processing of Chinese & Oriental Languages, vol. 5, Nos. 3 & 4, Nov. 1991, 16 pages.
Lee, K. F., "Large-Vocabulary Speaker-Independent Continuous Speech Recognition: The SPHINX System", Partial Fulfillment of the requirements for the degree of Doctor of Philosophy, Computer Science Department, Carnegie Mellon University, Apr. 18, 1988, 195 pages.

(56) References Cited

OTHER PUBLICATIONS

Lemon et al., "Multithreaded Context for Robust Conversational Interfaces: Context-Sensitive Speech Recognition and Interpretation of Corrective Fragments", ACM Transactions on Computer-Human Interaction, vol. 11, No. 3, Sep. 2004, pp. 241-267.
Leong et al., "CASIS: A Context-Aware Speech Interface System", Proceedings of the 10th International Conference on Intelligent user Interfaces, San Diego, California, Jan. 9-12, 2005, pp. 231-238.
Ward et al., "Recent Improvements in the CMU Spoken Language Understanding System", ARPA Human Language Technology Workshop, 1994, pp. 213-216.
Ward, Wayne, "The CMU Air Travel Information Service: Understanding Spontaneous Speech", Proceedings of the Workshop on Speech and Natural Language, HLT '90, 1990, pp. 127-129.
Warren, "An Efficient Easily Adaptable System for Interpreting Natural Language Queries", American Journal of Computational Linguistics, vol. 8, No. 3-4, Jul.-Dec. 1982, pp. 110-119.
Weizenbaum, Joseph, "ELIZA—A Computer Program for the Study of Natural Language Communication Between Man and Machine", Communications of the ACM, vol. 9, No. 1, Jan. 1966, pp. 36-45.
Werner et al., "Prosodic Aspects of Speech," Universite de Lausanne, Switzerland, 1994, Fundamentals of Speech Synthesis and Speech Recognition: Basic Concepts, State of the Art, and Future Challenges, 1994, pp. 23-40.
Winiwarter et al., "Adaptive Natural Language Interfaces to FAQ Knowledge Bases", Proceedings of 4th International Conference on Applications of Natural Language to Information Systems, Austria, Jun. 17-19, 1999, 22 pages.
Wolff, Mark, "Poststructuralism and the ARTFUL Database: Some Theoretical Considerations", Information Technology and Libraries, vol. 13, No. 1, Mar. 1994, 10 pages.
Wu et al., "KDA: A Knowledge-based Database Assistant", Data Engineering, Proceeding of the Fifth International Conference on Engineering (IEEE Cat No. 89CH2695-5), Feb. 6-10, 1989, pp. 402-409.
Wu, Min, "Digital Speech Processing and Coding", ENEE408G Capstone—Multimedia Signal Processing, Spring 2003, Lecture-2 Course Presentation, University of Maryland, College Park, 2003, pp. 1-8.
Wu, Min, "Speech Recognition, Synthesis, and H.C.I.", ENEE408G Capstone—Multimedia Signal Processing, Spring 2003, Lecture-3 course presentation, University of Maryland, College Park, 2003, pp. 1-11.
Wyle, M. F., "A Wide Area Network Information Filter", In Proceedings of First International Conference on Artificial Intelligence on Wall Street, Oct. 9-11, 1991, pp. 10-15.
Yang et al., "Smart Sight: A Tourist Assistant System", Proceedings of Third International Symposium on Wearable Computers, 1999, 6 pages.
Yankelovich et al., "Intermedia: The Concept and the Construction of a Seamless Information Environment", IEEE Computer Magazine, Jan. 1988, pp. 81-96.
Yoon et al., "Letter-to-Sound Rules for Korean", Department of Linguistics, The Ohio State University, 2002, 4 pages.
Zeng et al., "Cooperative Intelligent Software Agents", The Robotics Institute, Carnegie-Mellon University, Mar. 1995,13 pages.
Zhao Leon., "Intelligent Agents for Flexible Workflow Systems", Proceedings of the Americas Conference on Information Systems (AMCIS), 1998, pp. 237-239.
Zhao, Y., "An Acoustic-Phonetic-Based Speaker Adaptation Technique for Improving Speaker-Independent Continuous Speech Recognition", IEEE Transactions on Speech and Audio Processing, vol. 2, No. 3, Jul. 1994, pp. 380-394.
Zovato et al., "Towards Emotional Speech Synthesis: A Rule based Approach", Proceedings 5th ISCA Speech Synthesis Workshop—Pittsburgh, 2004, pp. 219-220.
Zue et al., "From Interface to Content: Translingual Access and Delivery of On-Line Information", Eurospeech, 1997, 4 pages.
Zue et al., "Jupiter: A Telephone-Based Conversational Interface for Weather Information", IEEE Transactions on Speech and Audio Processing, Jan. 2000, pp. 100-112.
Zue et al., "Pegasus: A Spoken Dialogue Interface for On-Line Air Travel Planning", Elsevier, Speech Communication, vol. 15, 1994, 10 pages.
Zue et al., "The Voyager Speech Understanding System: Preliminary Development and Evaluation", Proceedings of IEEE 1990 International Conference on Acoustics, Speech, and Signal Processing, 1990, pp. 73-76.
Zue, Victor, "Conversational Interfaces: Advances and Challenges", Spoken Language System Group <http://www.cs.cmu.edu/-dod/papers/zue97.pdf>, Sep. 1997, 10 pages.
Zue, Victor W., "Toward Systems that Understand Spoken Language", ARPA Strategic Computing Institute, Feb. 1994, pp. 51-59.
Savoy, J., "Searching Information in Hypertext Systems Using Multiple Sources of Evidence", International Journal of Man-Machine Studies, vol. 38, No. 6, Jun. 1996, pp. 1017-1030.
Scagliola, C., "Language Models and Search Algorithms for Real-Time Speech Recognition", International Journal of Man-Machine Studies, vol. 22, No. 5, 1985, pp. 523-547.
Schmandt et al., "Augmenting a Window System with Speech Input", IEEE Computer Society, Computer, vol. 23, No. 8, Aug. 1990, pp. 50-56.
Ward et al., "A Class Based Language Model for Speech Recognition", Conference Proceedings International Conference on Acoustics, Speech, and Signal Processing, 1996, ICASSP-96 , pp. 416-418.
Schütze, H., "Dimensions of Meaning", Proceedings of Supercomputing'92 Conference, Nov. 16-20, 1992, 10 pages.
Seneff et al., "A New Restaurant Guide Conversational System: Issues in Rapid Prototyping for Specialized Domains", Proceedings of Fourth International Conference on Spoken Language, 1996. ICSLP 96, 1996, pp. 665-668.
Sharoff et al., "Register-domain Separation as a Methodology for Development of Natural Language Interfaces to Databases", Proceedings of Human-Computer Interaction (INTERACT'99), 1999, 7 pages.
Sheth et al., "Evolving Agents for Personalized Information Filtering", In Proceedings of the Ninth Conference on Artificial Intelligence for Applications, Mar. 1-5, 1993, 9 pages.
Sheth et al., "Relationships at the Heart of Semantic Web: Modeling, Discovering, and Exploiting Complex Semantic Relationships", Enhancing the Power of the Internet: Studies in Fuzziness and Soft Computing, Oct. 13, 2002, pp. 1-38.
Shikano et al., "Speaker Adaptation Through Vector Quantization", IEEE International Conference on Acoustics, Speech, and Signal Processing (ICASSP'86), vol. 11, Apr. 1986, 4 pages.
Shimazu et al., "CAPIT: Natural Language Interface Design Tool with Keyword Analyzer and Case-Based Parser,", NEG Research & Development, vol. 33, No. 4, Oct. 1992, 11 pages.
Shinkle, L., "Team User's Guide", SRI International, Artificial Intelligence Center, Nov. 1984, 78 pages.
Shklar et al., "Info Harness: Use of Automatically Generated Metadata for Search and Retrieval of Heterogeneous Information", 1995 Proceedings of CAiSE'95, Finland, 1995.
Sigurdsson et al., "Mel Frequency Cepstral Coefficients: An Evaluation of Robustness of MP3 Encoded Music", In Proceedings of the 7th International Conference on Music Information Retrieval ISMIR, 2006, 4 pages.
Silverman et al., "Using a Sigmoid Transformation for Improved Modeling of Phoneme Duration", Proceedings of the IEEE International Conference on Acoustics, Speech, and Signal Processing, Mar. 15-19, 1999, 5 pages.
Simonite, Tom, "One Easy Way to Make Siri Smarter", Technology Review, Oct. 18, 2011, 2 pages.
Singh, N., "Unifying Heterogeneous Information Models", Communications of the ACM, 1998, 13 pages.
SRI International, "The Open Agent Architecture.TM. 1.0 Distribution", Open Agent Architecture (OAA), 1999, 2 pages.
SRI2009, "SRI Speech: Products: Software Development Kits: EduSpeak", available a <http://web.archive.org/web/20090828084033/http://www.speechatsri.com/products/eduspeak> shtml., 2009, 2 pages.

(56) References Cited

OTHER PUBLICATIONS

Starr et al., "Knowledge-Intensive Query Processing", Proceedings of the 5th KRDB Workshop, Seattle, May 31, 1998, 6 pages.
Stent et al., "The CommandTalk Spoken Dialogue System", SRI International, 1999, pp. 183-190.
Stern et al., "Multiple Approaches to Robust Speech Recognition", Proceedings of Speech and Natural Language Workshop, 1992, 6 pages.
Stickel, "A Nonclausal Connection-Graph Resolution Theorem-Proving Program", Proceedings of AAAI'82, 1982, pp. 1-13.
Sugumaran, V., "A Distributed Intelligent Agent-Based Spatial Decision Support System", Proceedings of the Americas Conference on Information systems (AMCIS), Dec. 31, 1998, 4 pages.
Sycara et al., "Coordination of Multiple Intelligent Software Agents", International Journal of Cooperative Information Systems (IJCIS), vol. 5, No. 2 & 3, Jun. & Sep. 1996, 33 pages.
Sycara et al., "Distributed Intelligent Agents", IEEE Expert, vol. 11, No. 6, Dec. 1996, 32 pages.
Sycara et al., "Dynamic Service Matchmaking Among Agents in Open Information Environments", SIGMOD Record, 1999, 7 pages.
Sycara et al., "The RETSINA MAS Infrastructure", Autonomous Agents and Multi-Agent Systems, vol. 7, 2003, 20 pages.
Tenenbaum et al., "Data Structure Using Pascal", 1981 Prentice-Hall, Inc, 1981, 34 pages.
TextnDrive, "Text'nDrive App Demo—Listen and Reply to your Messages by Voice while Driving!", YouTube Video available at <http://www.youtube.com/watch?v=WaGfzoHsAMw>, Apr. 27, 2010, 1 page.
Tofel et al., "SpeakTolt: A Personal Assistant for Older iPhones, iPads", Apple News, Tips and Reviews, Feb. 9, 2012, 7 pages.
Tsai et al., "Attributed Grammar—A Tool for Combining Syntactic and Statistical Approaches to Pattern Recognition", IEEE Transactions on Systems, Man, and Cybernetics, vol. SMC-10, No. 12, Dec. 1980, 13 pages.
Tucker, Joshua, "Too Lazy to Grab Your Tv Remote? Use Siri Instead", Engadget, Nov. 30, 2011, 8 pages.
Tur et al., "The CALO Meeting Assistant System", IEEE Transactions on Audio, Speech, and Language Processing, vol. 18, No. 6, Aug. 2010, pp. 1601-1611.
Tur et al., "The CALO Meeting Speech Recognition and Understanding System", Proc. IEEE Spoken Language Technology Workshop, 2008, 4 pages.
Tyson et al., "Domain-Independent Task Specification in the TACITUS Natural Language System", SRI International, Artificial Intelligence Center, May 1990, 16 pages.
Udell, J., "Computer Telephony", BYTE, vol. 19, No. 7, Jul. 1, 1994, 9 pages.
Van Santen, J. P., "Contextual Effects on Vowel Duration", Journal Speech Communication, vol. 11, No. 6, Dec. 1992, 34 pages.
Vepa et al., "New Objective Distance Measures for Spectral Discontinuities in Concatenative Speech Synthesis", In Proceedings of the IEEE 2002 Workshop on Speech Synthesis, 2002, 4 pages.
Verschelde, J., "MATLAB Lecture 8. Special Matrices in MATLAB,", UIC Dept. of Math., Stat. & C.S., MCS 320, Introduction to Symbolic Computation, Nov. 23, 2005, 4 pages.
Vingron, M., "Near-Optimal Sequence Alignment", Deutsches Krebsforschungszentrum (DKFZ), Abteilung Theoretische Bioinformatik, Heidelberg, Germany, Jun. 1996, 20 pages.
Vlingo, "Vlingo Launches Voice Enablement Application on Apple App Store", Press Release, Dec. 3, 2008, 2 pages.
Vlingo Lncar, "Distracted Driving Solution with Vlingo InCar", YouTube by Vlingo Voice on (Oct. 6, 2010) 2:38 minute video uploaded to Retrieved from Internet on Jun. 6, 2012<http://www.youtube.com/watch?v=Vqs8XfXxgz4?, 2 pages.
Voiceassist, "Send Text, Listen to and Send E-Mail By Voice", YouTube Video available at <http://www.youtube.com/watch?v=0tEU61nHHA4>, Jul. 30, 2009, 1 page.
VoiceOnTheGo, "Voice on the Go (BlackBerry)", YouTube available at <http://www.youtube.com/watch?v=pJqpWgQS98w>, Jul. 27, 2009, 1 page.

Wahlster et al., "Smartkom: Multimodal Communication with a Life-Like Character,", EUROSPEECH—Scandinavia, 7th European Conference on Speech Communication and Technology, 2001, 5 pages.
Waldinger et al., "Deductive Question Answering from Multiple Resources", New Directions in Question Answering, published by AAAI, Menlo Park, 2003, 22 pages.
Walker et al., "Natural Language Access to Medical Text", SRI International, Artificial Intelligence Center, Mar. 1981, 23 pages.
Waltz, D., "An English Language Question Answering System for a Large Relational Database", © 1978 ACM, vol. 21, No. 7, 1978, 14 pages.
Owei et al., "Natural Language Query Filtration in the Conceptual Query Language", IEEE, 1997, pp. 539-549.
Pannu et al., "A Learning Personal Agent for Text Filtering and Notification", Proceedings of the International Conference of Knowledge Based Systems, 1996, pp. 1-11.
Papadimitriou et al., "Latent Semantic Indexing: A Probabilistic Analysis", available online at <http://citeseerx.ist.psu.edu/messaqes/downloadsexceeded.html>, Nov. 14, 1997, 21 pages.
Parsons, T. W., "Voice and Speech Processing", Pitch and Formant Estimation © 1987, McGraw-Hill, Inc., ISBN: 0-07-0485541-0, 1987, 15 pages.
Parsons,, T. W., "Voice and Speech Processin", Linguistics and Technical Fundamentals, Articulatory Phonetics and Phonemics,© 1987 McGraw-Hill, Inc., ISBN: 0-07-0485541-0, 5 pages.
International Preliminary Report on Patentability received for PCT Patent Application No. PCT/US1993/012637, dated Apr. 10, 1995, 7 pages.
International Preliminary Report on Patentability received for PCT Patent Application No. PCT/US1993/012666, dated Mar. 1, 1995, 5 pages.
International Search Report received for PCT Patent Application No. PCT/US1993/012666, dated Nov. 9, 1994, 8 pages.
International Preliminary Report on Patentability received for PCT Patent Application No. PCT/US1994/011011, dated Feb. 28, 1996, 4 pages.
International Search Report received for PCT Patent Application No. PCT/US1994/011011, dated Feb. 8, 1995, 7 pages.
Written Opinion received for PCT Patent Application No. PCT/US1994/011011, dated Aug. 21, 1995, 4 pages.
International Preliminary Report on Patentability received for PCT Patent Application No. PCT/US1995/008369, dated Oct. 9, 1996, 4 pages.
International Search Report received for PCT Patent Application No. PCT/US1995/008369, dated Nov. 8, 1995, 6 pages.
International Search Report and Written Opinion received for PCT Patent Application No. PCT/US2011/020861, dated Nov. 29, 2011, 12 pages.
International Preliminary Report on Patentability received for PCT Patent Application No. PCT/US2012/029810, dated Oct. 3, 2013, 9 pages.
International Search Report and Written Opinion received for PCT Patent Application No. PCT/US2012/029810, dated Aug. 17, 2012, 11 pages.
Pereira, Fernando, "Logic for Natural Language Analysis", SRI International, Technical Note 275, Jan. 1983, 194 pages.
Perrault et al., "Natural-Language Interfaces", SRI International, Technical Note 393, Aug. 22, 1986, 48 pages.
Phoenix Solutions, Inc., A, "Declaration of Christopher Schmandt Regarding the MIT Galaxy System", West Interactive Corporation, a Delaware Corporation, Document 40, Jul. 2, 2010, 162 pages.
Picone, J., "Continuous Speech Recognition Using Hidden Markov Models", IEEE ASSP Magazine, vol. 7, No. 3, Jul. 1990, 16 pages.
Pulman et al., "Clare: A Combined Language and Reasoning Engine", Proceedings of JFIT Conference, available online at <URL: http://www.cam.sri.com/tr/crc042/paper.ps.Z>, 1993, 8 pages.
Rabiner et al., "Fundamental of Speech Recognition", © 1993 AT&T, Published by Prentice-Hall, Inc., ISBN: 0-13-285826-6, 1993, 17 pages.
Rabiner et al., "Note on the Properties of a Vector Quantizer for LPC Coefficients", Bell System Technical Journal, vol. 62, No. 8, Oct. 1983, 9 pages.

(56) References Cited

OTHER PUBLICATIONS

Ratcliffe, M., "CiearAccess 2.0 allows SQL searches off-line (Structured Query Language)", ClearAcess Corp., MacWeek, vol. 6, No. 41, Nov. 16, 1992, 2 pages.
Ravishankar, "Efficient Algorithms for Speech Recognition", Doctoral Thesis submitted to School of Computer Science, Computer Science Division, Carnegie Mellon University, Pittsburg, May 15, 1996, 146 pages.
Rayner et al., "Adapting the Core Language Engine to French and Spanish", Cornell University Library, available online at <http:l/arxiv.org/abs/cmp-lg/9605015.>, May 10, 1996, 9 pages.
Rayner et al., "Deriving Database Queries from Logical Forms by Abductive Definition Expansion", Proceedings of the Third Conference on Applied Natural Language Processing, ANLC, 1992, 8 pages.
Rayner et al., "Spoken Language Translation With Mid-90's Technology: A Case Study", EUROSPEECH, ISCA, available online at <http:// db l p. u n i-trier. de/d b/conf/interspeech/eurospeech 1993.html#RaynerBCCDGKKLPPS93>, 1993, 4 pages.
Rayner, M., "Abductive Equivalential Translation and its application to Natural Language Database Interfacing", Dissertation paper, SRI International, Sep. 1993, 163 pages.
Rayner, M., "Linguistic Domain Theories: Natural-Language Database Interfacing from First Principles", SRI International, Cambridge, 1993, 11 pages.
Remde et al., "SuperBook: An Automatic Tool for Information Exploration-Hypertext?", In Proceedings of Hypertext '87, Nov. 13-15, 1987, 14 pages.
Reynolds, C. F., "On-Line Reviews: A New Application of the HICOM Conferencing System", IEE Colloquium on Human Factors in Electronic Mail and Conferencing Systems, Feb. 3, 1989, 4 pages.
Rice et al., "Monthly Program: Nov. 14, 1995", The San Francisco Bay Area Chapter of ACM SIGCHI, Available at <http://www.baychi.org/calendar/19951114>, Nov. 14, 1995, 2 pages.
Rice et al., "Using the Web Instead of a Window System", Proceedings of the SIGCHI Conference on Human Factors in Computing Systems, CHI'96, 1996, pp. 1-14.
Rigoll, G., "Speaker Adaptation for Large Vocabulary Speech Recognition Systems Using Speaker Markov Models", International Conference on Acoustics, Speech, and Signal Processing (ICASSP'89), May 23-26, 1989, 4 pages.
Riley, M D., "Tree-Based Modelling of Segmental Durations", Talking Machines Theories, Models, and Designs, 1992 © Elsevier Science Publishers B.V., North-Holland, ISBN: 08-444-89115.3, 1992, 15 pages.
Rivlin et al., "Maestro: Conductor of Multimedia Analysis Technologies", SRI International, 1999, 7 pages.
Rivoira et al., "Syntax and Semantics in a Word-Sequence Recognition System", IEEE International Conference on Acoustics, Speech, and Signal Processing (ICASSP'79), Apr. 1979, 5 pages.
Roddy et al., "Communication and Collaboration in a Landscape of B2B eMarketplaces", VerticaiNet Solutions, white paper, Jun. 15, 2000, 23 pages.
Rosenfeld, R., "A Maximum Entropy Approach to Adaptive Statistical Language Modelling", Computer Speech and Language, vol. 10, No. 3, Jul. 1996, 25 pages.
Roszkiewicz, A., "Extending your Apple", Back Talk—Lip Service, A+ Magazine, The Independent Guide for Apple Computing, vol. 2, No. 2, Feb. 1984, 5 pages.
Rudnicky et al., "Creating Natural Dialogs in the Carnegie Mellon Communicator System", Proceedings of Eurospeech, vol. 4, 1999, pp. 1531-1534.
Russell et al., "Artificial Intelligence, A Modern Approac", © 1995 Prentice Hall, Inc., 1995, 121 pages.
Sacerdoti et al., "A Ladder User's Guide (Revised)", SRI International Artificial Intelligence Center, Mar. 1980, 39 pages.
Sagalowicz, D., "AD-Ladder User's Guide", SRI International, Sep. 1980, 42 pages.
Sakoe et al., "Dynamic Programming Algorithm Optimization for Spoken Word Recognition", IEEE Transactions on Acoustics, Speech, and Signal Processing, vol. ASSP-26 No. 1, Feb. 1978, 8 pages.
Salton et al., "On the Application of Syntactic Methodologies in Automatic Text Analysis", Information Processing and Management, vol. 26, No. 1, Great Britain, 1990, 22 pages.
Sameshima et al., "Authorization with security attributes and privilege delegation Access control beyond the ACL", Computer Communications, vol. 20, 1997, 9 pages.
San-Segundo et al., "Confidence Measures for Dialogue Management in the CU Communicator System", Proceedings of Acoustics, Speech, and Signal Processing (ICASSP'00), Jun. 5-9, 2000, 4 pages.
Sato, H., "A Data Model, Knowledge Base, and Natural Language Processing for Sharing a Large Statistical Database,", Statistical and Scientific Database Management, Lecture Notes in Computer Science, vol. 339, 1989, 20 pages.
Lieberman et al., "Out of Context: Computer Systems that Adapt to, and Learn from, Context", IBM Systems Journal, vol. 39, No. 3&4, 2000, pp. 617-632.
Lin et al., "A Distributed Architecture for Cooperative Spoken Dialogue Agents with Coherent Dialogue State and History", <http://citeseerx.ist.psu.edu/viewdoc/summary?doi=1 0.1.1.42.272>, 1999, 4 pages.
Lin et al., "A New Framework for Recognition of Mandarin Syllables With Tones Using Sub-syllabic Units", IEEE International Conference on Acoustics, Speech, and Signal Processing (ICASSP-93), Apr. 27-30, 1993, pp. 227-230.
Linde, "An Algorithm for Vector Quantizer Design", IEEE Transactions on Communications, vol. 28, No. 1, Jan. 1980, pp. 84-95.
Liu et al., "Efficient Joint Compensation of Speech for the Effects of Additive Noise and Linear Filtering", IEEE International Conference of Acoustics, Speech, and Signal Processing,ICASSP-92, Mar. 23-26, 1992, pp. 257-260.
Lntraspect Software, "The Intraspect Knowledge Management Solution: Technical Overview", <http://tomgruber.org/writing/intraspect-whitepaper-1998.pdf>, 1998, 18 pages.
Logan et al., "Mel Frequency Cepstral Coefficients for Music Modeling", In International Symposium on Music Information Retrieval, 2000, 2 pages.
Lowegian International, "FIR Filter Properties", dspGuro, Digital Signal Processing Central, available online at <httJ;>://www.dspQuru.com/dso/taas/fir/orooerties, > retrived from internet on Jul. 28, 2010, 6 pages.
Lowerre, B. T., "The-HARPY Speech Recognition System", Doctoral Dissertation, Department of Computer Science, Carnegie Mellon University, Apr. 1976, 20 pages.
Maghbouleh, A., "An Empirical Comparison of Automatic Decision Tree and Linear Regression Models for Vowel Durations", Revised Version of a Paper Presented at the Computational Phonology in Speech Technology workshop, 1996 annual meeting of the Association for Computational Linguistics in Santa Cruz, California, 7 pages.
Markel et al., "Linear Prediction of Speech", Springer-Verlag, Berlin Heidelberg New York, 1976, 12 pages.
Martin et al., "The Open Agent Architecture: A Framework for Building Distributed Software Systems", Applied Artificial Intelligence: An International Journal, vol. 13, No. 1-2, pp. 1-38.
Martin et al., "Building and Using Practical Agent Applications", SRI International, PAAM Tutorial, 1998, pp. 1-26.
Martin et al., "Building Distributed Software Systems with the Open Agent Architecture", Proceedings of the Third International Conference on the Practical Application of Intelligent Agents and Multi-Agent Technology, Mar. 23-25, 1998, pp. 355-376.
Martin et al., "Development Tools for the Open Agent Architecture", Proceedings of the International Conference on the Practical Application of Intelligent Agents and Multi-Agent Technology, Apr. 1996, pp. 1-17.
Martin et al., "Information Brokering in an Agent Architecture", Proceedings of the second International Conference on the Practical Application of Intelligent Agents and Multi-Agent Technology, Apr. 1997, pp. 1-20.

(56) References Cited

OTHER PUBLICATIONS

Martin et al., "Transportability and Generality in a Natural-Language Interface System", Proceedings of the Eight International Joint Conference on Artificial Intelligence, Technical Note 293, Aug. 8-12, 1983, 21 pages.

Matiasek et al., "Tamic-P: A System for NL Access to Social Insurance Database", 4th International Conference on Applications of Natural Language to Information Systems, Jun. 17-19, 1999, 7 pages.

McGuire et al., "SHADE: Technology for Knowledge-Based Collaborative Engineering", Journal of Concurrent Engineering~r Applications and Research (CERA), 1993, 18 pages.

Meng et al., "Wheels: A Conversational System in the Automobile Classified Domain", Proceedings Fourth International Conference on Spoken Language, 1996. ICSLP 96, Oct. 1996, pp. 542-545.

Michos et al., "Towards an Adaptive Natural Language Interface to Command Languages", Natural Language Engineering, vol. 2, No. 3, 1996, pp. 191-209.

Milstead et al., "Metadata: Cataloging by Any Other Name", Online, Information Today, Inc., Jan. 1999, 18 pages.

Milward et al., "D2.2: Dynamic MultimodalInterface Reconfiguration" Talk and Look: Tools for Ambient Linguistic Knowledge, IST-507802 Deliverable D2.2, Aug. 8, 2006, 69 pages.

Minker et al., "Hidden Understanding Models for Machine Translation", Proceedings of ETRW on Interactive Dialogue in Multi-Modal Systems, Jun. 1999, pp. 1-4.

Mitra et al., "A Graph-Oriented Model for Articulation of Ontology Interdependencies", Lecture Notes in Computer Science, vol. 1777, 2000, pp. 86-100.

Modi et al., "CMRadar: A Personal Assistant Agent for Calendar Management", AAAI, Intelligent Systems Demonstrations, 2004, pp. 1020-1021.

Moore et al., "Combining Linguistic and Statistical Knowledge Sources in Natural-Language Processing for ATIS", SRI International, ArtificialIntelligence Center, 1995, 4 pages.

Moore et al., "SRI's Experience with the ATIS Evaluation", Proceedings of the workshop on Speech and Natural Language, Jun. 24-27, 1990, pp. 147-148.

Moore et al., "The Information Warefare Advisor: An Architecture for Interacting with Intelligent Agents Across the Web", Proceedings of Americas Conference on Information Systems (AMCIS), Dec. 31, 1998, pp. 186-188.

Moore, Robert C., "Handling Complex Queries in a Distributed Data Base", SRI International, Technical Note 170, Oct. 8, 1979, 38 pages.

Moore, Robert C., "Practical Natural-Language Processing by Computer", SRI International, Technical Note 251, Oct. 1981, 34 pages.

Moore, Robert C., "The Role of Logic in Knowledge Representation and Commonsense Reasoning", SRI International, Technical Note 264, Jun. 1982, 19 pages.

Moore, Robert C., "Using Natural-Language Knowledge Sources in Speech Recognition", SRI International, Artificial Intelligence Center, Jan. 1999, pp. 1-24.

Moran et al., "Intelligent Agent-based User Interfaces", Proceedings of International Workshop on Human Interface Technology, Oct. 12-13, 1995, pp. 1-4.

Moran et al., "Multimodal User Interfaces in the Open Agent Architecture", International Conference on Intelligent User Interfaces (IU197), 1997, 8 pages.

Moran, Douglas B., "Quantifier Scoping in the SRI Core Language Engine", Proceedings of the 26th Annual Meeting on Association for Computational Linguistics, 1988, pp. 33-40.

Morgan, B., "Business Objects (Business Objects for Windows) Business Objects Inc.", DBMS, vol. 5, No. 10, Sep. 1992, 3 pages.

Motro, Amihai, "Flex: A Tolerant and Cooperative User Interface to Databases", IEEE Transactions on Knowledge and Data Engineering, vol. 2, No. 2, Jun. 1990, pp. 231-246.

Mountford et al., "Talking and Listening to Computers", The Art of Human-Computer Interface Design, Copyright © 1990 Apple Computer, Inc. Addison-Wesley Publishing Company, Inc, 1990, 17 pages.

Mozer, Michael C., "An Intelligent Environment Must be Adaptive", IEEE Intelligent Systems, Mar./Apr. 1999, pp. 11-13.

Muhlhauser, Max, "Context Aware Voice User Interfaces for Workflow Support", 2007, 254 pages.

Murty, "Combining Evidence from Residual Phase and MFCC Features for Speaker Recognition", IEEE Signal Processing Letters, vol. 13, No. 1, Jan. 2006, pp. 52-55.

Murveit et al., "Integrating Natural Language Constraints into HMM-based Speech Recognition", 1990 International Conference on Acoustics, Speech, and Signal Processing, Apr. 3-6, 1990, 5 pages.

Murveit et al., "Speech Recognition in SRI's Resource Management and ATIS Systems", Proceedings of the Workshop on Speech and Natural Language, 1991, pp. 94-100.

Nakagawa et al., "Speaker Recognition by Combining MFCC and Phase Information", IEEE International Conference on Acoustics Speech and Signal Processing ICASSP, Mar. 14-19, 2010, pp. 4502-4505.

Naone, Erica, "TR10: Intelligent Software Assistant", Technology Review, Mar.-Apr. 2009, 2 pages.

Neches et al., "Enabling Technology for Knowledge Sharing", Fall, 1991, pp. 37-56.

Niesler et al., "A Variable-Length Category-Based N-Gram Language Model", IEEE International Conference on Acoustics, Speech, and Signal Processing (ICASSP'96), vol. 1, May 7-10, 1996, pp. 164-167.

Noth et al., "Verbmobil: The Use of Prosody in the Linguistic Components of a Speech Understanding System", IEEE Transactions on Speech and Audio Processing, vol. 8, No. 5, Sep. 2000, pp. 519-532.

Odubiyi et al., "SAIRE—A Scalable Agent-Based Information Retrieval Engine", Proceedings of the First International Conference on Autonomous Agents, 1997, 12 pages.

Grosz et al., "Research on Natural-Language Processing at SRI", SRI International Technical Note 257, Nov. 1981, 21 pages.

Grosz et al., "TEAM: An Experiment in the Design of Transportable Natural-Language Interfaces", Artificial Intelligence, vol. 32, 1987, pp. 173-243.

Grosz, Barbara J., "Team: A Transportable Natural-Language Interface System", Proceedings of the First Conference on Applied Natural Language Processing, 1983, pp. 39-45.

Gruber et al., "An Ontology for Engineering Mathematics", Fourth International Conference on Principles of Knowledge Representation and Reasoning, Available at <http://www-ksl.stanford.edu/knowledge-sharing/papers/engmath.html>, 1994, pp. 1-22.

Gruber et al., "Generative Design Rationale: Beyond the Record and Replay Paradigm", Knowledge Systems Laboratory, Technical Report KSL 92-59, Dec. 1991, Updated Feb. 1993, 24 pages.

Gruber et al., "Machine-Generated Explanations of Engineering Models: A Compositional Modeling Approach", In Proc. International Joint Conference on Artificial Intelligence, 1993, 7 pages.

Gruber et al., "NIKE: A National Infrastructure for Knowledge Exchange", A Whitepaper Advocating and ATP Initiative on Technologies for Lifelong Learning, Oct. 1994, pp. 1-10.

Gruber et al., "Toward a Knowledge Medium for Collaborative Product Development", Proceedings of the Second International Conference on Artificial Intelligence in Design, Jun. 22-25, 1992, pp. 1-19.

Gruber et al., "A Translation Approach to Portable Ontology Specifications", Knowledge Systems Laboratory, Technical Report KSL 92-71, Sep. 1992, Revised Apr. 1993, 27 pages.

Gruber, Thomas R., "Automated Knowledge Acquisition for Strategic Knowledge", Machine Learning, vol. 4, 1989, pp. 293-336.

Gruber, Thomas R., "Interactive Acquisition of Justifications: Learning "Why" by Being Told What", Knowledge Systems Laboratory, Technical Report KSL 91-17, Original Oct. 1990, Revised Feb. 1991, pp. 1-23.

Gruber, Thomas R., "Toward Principles for the Design of Ontologies Used for Knowledge Sharing", In International Journal Human-

(56) References Cited

OTHER PUBLICATIONS

Computer Studies, vol. 43, p. 907-928, substantial revision of paper presented at the International Workshop on Formal Ontology, Available as Technical Report KSL 93-04, Knowledge Systems Laboratory, revised Aug. 23, 1993, 23 pages.

Gruber, Tom, "(Avoiding) the Travesty of the Commons", Presentation at NPUC, New Paradigms for User Computing, IBM Almaden Research Center, Jul. 24, 2006, 52 pages.

Gruber, Tom, "2021: Mass Collaboration and the Really New Economy", TNTY Futures, vol. 1, No. 6, Available Online at <http://tomgruber.org/writing/tnty2001.htm>, Aug. 2001, 5 pages.

Gruber, Tom, "Big Think Small Screen: How Semantic Computing in the Cloud will Revolutionize the Consumer Experience on the Phone", Keynote presentation at Web 3.0 conference, 2009, 41 pages.

Gruber, Tom, "Collaborating around Shared Content on the WWW", W3C Workshop on WWW and Collaboration, Available at <http://www.w3.org/Collaboration/Workshop/Proceedings/P9.html>, Sep. 11, 1995, 1 page.

Gruber, Tom, "Collective Knowledge Systems: Where the Social Web meets the Semantic Web", Web Semantics: Science, Services and Agents on the World Wide Web, 2007, pp. 1-19.

Gruber, Tom, "Despite our Best Efforts, Ontologies are not the Problem", AAAI Spring Symposium, Available at <http://tomgruber.org/writing/aaai-ss08.htm>, 2008, pp. 1-40.

Gruber, Tom, "Enterprise Collaboration Management with Intraspect", Intraspect Technical White Paper, Jul. 2001, pp. 1-24.

Gruber, Tom, "Every Ontology is a Treaty—A Social Agreement—Among People with Some Common Motive in Sharing", Official Quarterly Bulletin of AIS Special Interest Group on Semantic Web and Information Systems, vol. 1, No. 3, 2004, pp. 1-5.

Gruber, Tom, "Helping Organizations Collaborate, Communicate, and Learn", Presentation to NASA Ames Research, intraspect, available at <http://tomgruber.org/writing/organizational-intelligence-talk.htm>, Mar.-Oct. 2003, 30 pages.

Gruber, Tom, "Intelligence at the Interface: Semantic Technology and the Consumer Internet Experience", Presentation at Semantic Technologies Conference, Available at <http://tomgruber.org/writing/semtech08.htm>, 2008, pp. 1-40.

Gruber, Tom, "It Is What It Does: The Pragmatics of Ontology for Knowledge Sharing", Proceedings of the International CIDOC CRM Symposium, Available at <http://tomgruber.org/writing/cidoc-ontology.htm>, Mar. 26, 2003, 21 pages.

Gruber, Tom, "Ontologies, Web 2.0 and Beyond", Ontology Summit, available at <http://tomgruber.org/writing/ontolog-social-web-keynote.htm>, Apr. 24, 2007, 17 pages.

Gruber, Tom, "Ontology of Folksonomy: A Mash-up of Apples and Oranges", Int'l Journal on Semantic Web & Information Systems, vol. 3, No. 2, 2007, 7 pages.

Gruber, Tom, "Siri, a Virtual Personal Assistant—Bringing Intelligence to the Interface", Semantic Technologies conference, Jun. 16, 2009, 21 pages.

Gruber, Tom, "TagOntology", Presentation to Tag Camp, Oct. 29, 2005, 20 pages.

Gruber, Tom, "Where the Social Web meets the Semantic Web", Presentation at the 5th International Semantic Web Conference, Nov. 7, 2006, 38 pages.

Guida et al., "NLI: A Robust Interface for Natural Language Person-Machine Communication", Int. J. Man-Machine Studies, vol. 17, 1982, pp. 417-433.

Guzzoni et al., "A Unified Platform for Building Intelligent Web Interaction Assistants", Proceedings of the 2006 IEEE/WIC/ACM International Conference on Web Intelligence and Intelligent Agent Technology, Computer Society, 2006, 4 pages.

Guzzoni et al., "Active, A Platform for Building Intelligent Operating Rooms", Surgetica 2007 Computer-Aided Medical Interventions: tools and Applications, Paris, 2007, Sauramps Medical, http://lsro.epfl.ch/page-68384-en.html,, 2007, 8 pages.

Guzzoni et al., "Active, A Platform for Building Intelligent Software,", Computational Intelligence, available online at <http://www.informatik.uni-trier.del-ley/pers/hd/g/Guzzoni:Didier>, 2006, 5 pages.

Guzzoni et al., "Active, A Tool for Building Intelligent User Interfaces", ASC 2007, Palma de Mallorca, <http://lsro.epfl.ch/page-34241.html>, 2007, 6 pages.

Guzzoni et al., "Many Robots Make Short Work", AAAI Robot Contest, SRI International, 1996, pp. 1-9.

Guzzoni et al., "Modeling Human-Agent Interaction with Active Ontologies", AAAI Spring Symposium, Interaction Challenges for Intelligent Assistants, Stanford University, Palo Alto, California, 2007, 8 pages.

Guzzoni, D., "Active: A unified platform for building intelligent assistant applications", Oct. 25, 2007, 262 pages.

Haas et al., "An Approach to Acquiring and Applying Knowledge", SRI international Technical Note 227, Nov. 1980, 22 pages.

Hadidi et al., "Students' Acceptance of Web-Based Course Offerings: An Empirical Assessment", Proceedings of the Americas Conference on Information Systems (AMCIS), 1998, 4 pages.

Hardwar, Devemder, "Driving App Waze Builds its own Siri for Hands-Free Voice Control", retrieved from internet on Feb. 9, 2012 <http ://ventu rebeat. com/20 12/0 2/09/ driving-a pp-waze-bu i lds-its-own-siri-for-hands-freevoice-control/>, 4 pages.

Harris, F. J., "On the Use of Windows for Harmonic Analysis with the Discrete Fourier Transform", In Proceedings of the IEEE, vol. 66, No. 1, Jan. 1978, 34 pages.

Hawkins et al., "Hierarchical Temporal Memory: Concepts, Theory, and Terminology", Numenta, Inc., Mar. 27, 2007, pp. 1-20.

He et al., "Personal Security Agent: KQML-Based PKI", The Robotics Institute, Carnegie-Mellon University, paper, 1997, pp. 1-14.

Helm et al., "Building Visual Language Parsers", In Proceedings of CHI'91 Proceedings of the SIGCHI Conference on Human Factors in Computing Systems, 1991, pp. 105-112.

Hendrix et al., "Developing a Natural Language Interface to Complex Data", ACM Transactions on Database Systems, vol. 3, No. 2, Jun. 1978, pp. 105-147.

Hendrix et al., "Transportable Natural-Language Interfaces to Databases", SRI International, Technical Note 228, Apr. 30, 1981, 18 pages.

Hendrix et al., "Human Engineering for Applied Natural Language Processing", SRI International, Technical Note 139, Feb. 1977, 27 pages.

Hendrix, Gary G., "Klaus: A System for Managing Information and Computational Resources", SRI International, Technical Note 230, Oct. 1980, 34 pages.

Hendrix, Gary G., "Lifer: A Natural Language Interface Facility", SRI Stanford Research Institute, Technical Note 135, Dec. 1976, 9 pages.

Hendrix, Gary G., "Natural-Language Interface", American Journal of Computational Linguistics, vol. 8, No. 2, Apr.-Jun. 1982, pp. 56-61.

Hendrix, Gary G., "The Lifer Manual: A Guide to Building Practical Natural Language Interfaces", SRI International, Technical Note 138, Feb. 1977, 76 pages.

Cheyer, Adam, "About Adam Cheyer", available online at <http://www.adam.cheyer.com/about.html>, retrieved from Internet on Sep. 17, 2012, 2 pages.

Codd, E. F., "Databases: Improving Usability and Responsiveness—How About Recently", 1978, pp. 3-28.

Cohen et al., "An Open Agent Architecture", SRI International, 1994, pp. 1-8.

Coles et al., "Chemistry Question-Answering", Technical Note 9, Jun. 1969, 15 pages.

Coles et al., "Techniques for Information Retrieval Using an Inferential Question-Answering System with Natural-Language Input", Technical Note74, Nov. 1972, 198 Pages.

Coles Stephen L., "The Application of Theorem Proving to Information Retrieval", Technical Note 51, Jan. 1971, 21 pages.

Conklin, "Hypertext: An Introduction and Survey", Computer Magazine, Sep. 1987, 25 pages.

(56) References Cited

OTHER PUBLICATIONS

Connolly et al., "Fast Algorithms for Complex Matrix Multiplication Using Surrogates", IEEE Transactions on Acoustics, Speech, and Signal Processing, vol. 37, No. 6, Jun. 1989, 13 pages.
Constantinides et al., "A Schema Based Approach to Dialog Control", Proceedings of the International Conference on Spoken Language Processing, 1998, 4 pages.
Cox et al., "Speech and Language Processing for Next-Millennium Communications Services", Proceedings of the IEEE, vol. 88, No. 8, Aug. 2000, pp. 1314-1337.
Craig et al., "Deacon: Direct English Access and Control", AFIPS Conference Proceedings, vol. 29, Nov. 7-10, 1966, pp. 365-380.
Cutkosky et al., "PACT: An Experiment in Integrating Concurrent Engineering Systems", Jan. 1993, pp. 1-13.
Dar et al., "DTL's DataSpot: Database Exploration Using Plain Language", Proceedings of the 24th VLDB Conference, 1998, pp. 645-649.
Davis et al., "A Personal Handheld Multi-Modal Shopping Assistant", IEEE, 2006, 9 pages.
Decker et al., "Designing Behaviors for Information Agents", Jul. 6, 1996, pp. 1-15.
Decker et al., "Matchmaking and Brokering", May 16, 1996, pp. 1-19.
Deerwester et al., "Indexing by Latent Semantic Analysis", Journal of the American Society for Information Science, vol. 41, No. 6, Sep. 1990, 19 pages.
Deller, Jr., et al., "Discrete-Time Processing of Speech Signals", May 13, 1993, pp. 114-137.
Digital Equipment Corporation, "Open VMS Software Overview", Dec. 1995, 159 pages.
Domingue et al., "Web Service Modeling Ontology (WSMO)—An Ontology for Semantic Web Services", Position paper at the W3C Workshop on Frameworks for Semantics in Web Services, Jun. 9-10, 2005, 6 pages.
Donovan, Robert E., "A New Distance Measure for Costing Spectral Discontinuities in Concatenative Speech Synthesisers", 2001, 4 pages.
Dowding et al., "Gemini: A Natural Language System for Spoken-Language Understanding", Proceedings of the Thirty-First Annual Meeting of the Association for Computational Linguistics, 1993, 8 pages.
Dowding et al., "Interleaving Syntax and Semantics in an Efficient Bottom-Up Parser", Proceedings of the 32nd Annual Meeting of the Association for Computational Linguistics, 1994, 7 pages.
Elio et al., "On Abstract Task Models and Conversation Policies", 1999, pp. 1-10.
Epstein et al., "Natural Language Access to a Melanoma Data Base", Technical Note 171, Sep. 1978, 7 pages.
Ericsson et al., "Software Illustrating a Unified Approach to Multimodality and Multilinguality in the in-home Domain", Talk and Look: Tools for Ambient Linguistic Knowledge, Dec. 22, 2006, 127 pages.
Evi, "Meet Evi: The One Mobile App that Provides Solutions for Your Everyday Problems", avialable online at <http://www.evi.com/>, retrieved on Feb. 8, 2012, 3 pages.
Grosz et al., "Dialogic: A Core Natural-Language Processing System", SRI International, Nov. 9, 1982, 17 pages.
Exhibit, 1, "Natural Language Interface Using Constrained Intermediate Dictionary of Results", List of Publications Manually reviewed for the Search of U.S. Pat. No. 7,177,798, Mar. 22, 2013, 1 page.
Feigenbaum et al., "Computer-assisted Semantic Annotation of Scientific Life Works", Oct. 15, 2007, 22 pages.
Ferguson et al., "TRIPS: An Integrated Intelligent Problem-Solving Assistant", Proceedings of the Fifteenth National Conference on Artificial Intelligence (AAAI-98) and Tenth Conference on Innovative Applications of Artificial Intelligence (IAAI-98), 1998, 7 pages.
Fikes et al., "A Network-based knowledge Representation and its Natural Deduction System", SRI International, Jul. 1977, 43 pages.
Frisse, M. E., "Searching for Information in a Hypertext Medical Handbook", Communications of the ACM, vol. 31, No. 7, Jul. 1988, 8 pages.
Gamback et al., "The Swedish Core Language Engine", NOTEX Conference, 1992, 17 pages.
Gannes, Liz, "Alfred App Gives Personalized Restaurant Recommendations", AllThingsD, Jul. 18, 2011, pp. 1-3.
Gautier et al., "Generating Explanations of Device Behavior Using Compositional Modeling and Causal Ordering", CiteSeerx, 1993, pp. 89-97.
Gervasio et al., "Active Preference Learning for Personalized Calendar Scheduling Assistancae", CiteSeerx, In Proc. of IUI'05, Jan. 9-12, 2005, pp. 90-97.
Glass et al., "Multilingual Language Generation Across Multiple Domains", International Conference on Spoken Language Processing, Japan, Sep. 18- 22, 1994, 5 pages.
Glass et al., "Multilingual Spoken-Language Understanding in the Mit Voyager System", <http://groups.csail.mit.edu/sls/publications/1995/speechcomm95-voyager.pdf>, Aug. 1995, 29 pages.
Glass, Alyssa, "Explaining Preference Learning", CiteSeerx, 2006, pp. 1-5.
Goddeau et al., "A Form-Based Dialogue Manager for Spoken Language Applications", http://phasedance.com/pdf!icslp96.pdf, Oct. 1996, 4 pages.
Goddeau et al., "Galaxy: A Human-Language Interface to On-Line Travel Information", International Conference on Spoken Language Processing 1994, Yokohama, 1994, pp. 707-710.
Goldberg et al., "Using Collaborative Filtering to Weave an Information Tapestry", Communications of the ACM, vol. 35, No. 12, Dec. 1992, 10 pages.
Gorin et al., "On Adaptive Acquisition of Language", International Conference on Acoustics, Speech, and Signal Processing (ICASSP'90), vol. 1, Apr. 3-6, 1990, 5 pages.
Gotoh et al., "Document Space Models Using Latent Semantic Analysis", In Proceedings of Eurospeech, 1997, 4 pages.
Gray, R. M., "Vector Quantization", IEEE ASSP Magazine, Apr. 1984, 26 pages.
Green, C., "The Application of Theorem Proving to Question-Answering Systems", SRI Stanford Research Institute, Artificial Intelligence Group, Jun. 1969, 169 pages.
Gregg et al., "DSS Access on the WWW: An Intelligent Agent Prototype", Proceedings of the Americas Conference on Information Systems—Association for Information Systems, 1998, 3 pages.
Grishman et al., "Computational Linguistics: An Introduction", © Cambridge University Press, 1986, 172 pages.
Bahl et al., "Multonic Markov Word Models for Large Vocabulary Continuous Speech Recognition", IEEE Transactions on Speech and Audio Processing, vol. 1, No. 3, Jul. 1993, 11 pages.
Bahl et al., "Speech Recognition with Continuous-Parameter Hidden Markov Models", In Proceeding of International on Acoustics, Speech, and Signal Processing (ICASSP'88), vol. 1, Apr. 11-14, 1988, 8 pages.
Banbrook, M., "Nonlinear Analysis of Speech from a Synthesis Perspective", A Thesis Submitted for the Degree of Doctor of Philosophy, The University of Edinburgh, Oct. 15, 1996, 35 pages.
Bear et al., "A System for Labeling Self-Repairs in Speech", SRI International, Technical Note 522, Feb. 22, 1993, pp. 1-8.
Bear et al., "Detection and Correction of Repairs in Human-Computer Dialog", SRI International, Technical Note 518, May 5, 1992, pp. 1-10.
Bear et al., "Integrating Multiple Knowledge Sources for Detection and Correction of Repairs in Human-Computer Dialog", Proceedings of the 30th annual meeting on Association for Computational Linguistics (ACL), 1992, 8 pages.
Bear et al., "Using Information Extraction to Improve Document Retrieval", SRI International, Jan. 9, 1998, pp. 1-11.
Belaid et al., "A Syntactic Approach for Handwritten Mathematical Formula Recognition", IEEE Transactions on Pattern Analysis and Machine Intelligence, vol. PAMI-6, No. 1, Jan. 1984, 7 pages.
Bellegarda et al., "A Latent Semantic Analysis Framework for Large-Span Language Modeling", 5th European Conference on Speech, Communication and Technology, (Eurospeech'97), Sep. 22-25, 1997, 4 pages.

(56) References Cited

OTHER PUBLICATIONS

Bellegarda et al., "A Multispan Language Modeling Framework for Large Vocabulary Speech Recognition", IEEE Transactions on Speech and Audio Processing vol. 6, No. 5, Sep. 1998, 12 pages.
Bellegarda et al., "A Novel Word Clustering Algorithm Based on Latent Semantic Analysis", In Proceedings of the IEEE International Conference on Acoustics, Speech, and Signal Processing (ICASSP'96}, vol. 1, 1996, 4 pages.
Bellegarda et al., "Experiments Using Data Augmentation for Speaker Adaptation", International Conference on Acoustics, Speech, and Signal Processing (ICASSP'95), May 9-12, 1995, 4 pages.
Bellegarda et al., "On-Line Handwriting Recognition Using Statistical Mixtures", Advances in Handwriting and Drawings: A Multidisciplinary Approach, Europia, 6th International IGS Conference on Handwriting and Drawing, Paris—France, Jul. 1993, 11 pages.
Bellegarda et al., "Performance of the IBM Large Vocabulary Continuous Speech Recognition System on the ARPA Wall Street Journal Task", Signal Processing VII: Theories and Applications, © 1994 European Association for Signal Processing, 1994, 4 pages.
Bellegarda et al., "The Metamorphic Algorithm: A Speaker Mapping Approach to Data Augmentation", IEEE Transactions on Speech and Audio Processing, vol. 2, No. 3, Jul. 1994, 8 pages.
Bellegarda, J. R., "Exploiting Both Local and Global Constraints for Multi-Span Statistical Language Modeling", Proceeding of the 1998 IEEE International Conference on Acoustics, Speech, and Signal Processing (1CASSP'98), vol. 2, May 12-15 1998, 5 pages.
Bellegarda, J. R., "Exploiting Latent Semantic Information in Statistical Language Modeling", Proceedings of the IEEE, vol. 88, No. 8, Aug. 2000, 18 pages.
Bellegarda, J. R., "Interaction-Driven Speech Input—A Data-Driven Approach to the Capture of Both Local and Global Language Constraints", available online at <http:// old.sig.chi.ora/bulletin/ 1998.2/bellegarda.html>, 1992, 7 pages.
Bellegarda, J. R., "Large Vocabulary Speech Recognition with Multispan Statistical Language Models", IEEE Transactions on Speech and Audio Processing, vol. 8, No. 1, Jan. 2000, 9 pages.
Belvin et al., "Development of the HRL Route Navigation Dialogue System", In Proceedings of the First International Conference on Human Language Technology Research, Paper, 2001, 5 pages.
Berry et al., "PTIME: Personalized Assistance for Calendaring", ACM Transactions on Intelligent Systems and Technology, vol. 2, No. 4, Article 40, Jul. 2011, pp. 1-22.
Berry et al., "Task Management under Change and Uncertainty Constraint Solving Experience with the CALO Project", Proceedings of CP'05 Workshop on Constraint Solving under Change, 2005, 5 pages.
Black et al., "Automatically Clustering Similar Units for Unit Selection in Speech Synthesis", In Proceedings of Eurospeech 1997, vol. 2, 1997, 4 pages.
Blair et al., "An Evaluation of Retrieval Effectiveness for a Full-Text Document-Retrieval System", Communications of the ACM, vol. 28, No. 3, Mar. 1985, 11 pages.
Bobrow et al., "Knowledge Representation for Syntactic/Semantic Processing", AAA-80 Proceedings, 1980, pp. 316-323.
Bouchou et al., "Using Transducers in Natural Language Database Query", Proceedings of 4th International Conference on Applications of Natural Language to Information Systems, Austria, Jun. 17-19, 1999, 17 pages.
Bratt et al., "The SRI Telephone-based ATIS System", Proceedings of ARPA Workshop on Spoken Language Technology, 1995, 3 pages.
Briner, L. L., "Identifying Keywords in Text Data Processing", In Zelkowitz, Marvin V., ED, Directions and Challenges, 15th Annual Technical Symposium, Gaithersbury, Maryland, Jun. 17, 1976, 7 pages.
Bulyko et al., "Joint Prosody Prediction and Unit Selection for Concatenative Speech Synthesis", Electrical Engineering Department, University of Washington, Seattle, 2001, 4 pages.
Burke et al., "Question Answering from Frequently Asked Question Files", AI Magazine, Spring, vol. 18, No. 2, 1997, pp. 57-66.
Burns et al., "Development of a Web-Based Intelligent Agent for the Fashion Selection and Purchasing Process via Electronic Commerce", Proceedings of the Americas Conference on Information system (AMCIS), Dec. 31, 1998, pp. 140-142.
Bussey et al., "Service Architecture, Prototype Description, and Network Implications of a Personalized Information Grazing Service", INFOCOM'90, Ninth Annual Joint Conference of the IEEE Computer and Communication Societies, available online at <http:// slrohall.com/oublications/>, Jun. 3-7, 1990, 8 pages.
Bussler et al., "Web Service Execution Environment (WSMX)", available online at <http://www.w3.org/Submission/WSMX/>, retrieved from Internet on Sep. 17, 2012, 29 pages.
Butcher, Mike, "EVI Arrives in Town to go Toe-to-Toe with Siri", TechCrunch, Jan. 23, 2012, 2 pages.
Buzo et al., "Speech Coding Based Upon Vector Quantization", IEEE Transactions on Acoustics, Speech, and Signal Processing, vol. Assp-28, No. 5, Oct. 1980, 13 pages.
Caminero-Gil et al., "Data-Driven Discourse Modeling for Semantic Interpretation", In Proceedings of the IEEE International Conference on Acoustics, Speech, and Signal Processing, May 7-10, 1996, 6 pages.
Carter et al., "The Speech-Language Interface in the Spoken Language Translator", SRI International, Nov. 23, 1994, pp. 1-9.
Carter, David M., "Lexical Acquisition in the Core Language Engine", Proceedings of the Fourth Conference of the European Chapter of the Association for Computational Linguistics, 1989, pp. 137-144.
Cawley, "The Application of Neural Networks to Phonetic Modelling", PhD Thesis, University of Essex, Mar. 1996, 13 pages.
Chai et al., "Comparative Evaluation of a Natural Language Dialog Based System and a Menu Driven System for Information Access: a Case Study", Proceedings of the International Conference on Multimedia Information Retrieval (RIAO), Apr. 2000, 11 pages.
Chang et al., "A Segment-based Speech Recognition System for Isolated Mandarin Syllables", Proceedings TEN CON '93, IEEE Region 10 conference on Computer, Communication, Control and Power Engineering, vol. 3, Oct. 19-21, 1993, pp. 317-320.
Chen, Yi, "Multimedia Siri Finds and Plays Whatever You Ask for", PSFK Report, Feb. 9, 2012, 9 pages.
Cheyer et al., "Demonstration Video of Multimodal Maps Using an Agent Architecture", available online at <http://www.youtube.com/ watch?v=x3TptMGT9EQ&feature=youtu.be>, published on 1996, 6 pages.
Cheyer et al., "Demonstration Video of Multimodal Maps Using an Open-Agent Architecture", available online at <http://www.youtube. com/watch?v=JUxaKnyZyM&feature=youtu.be>, published on 1996, 6 pages.
Cheyer et al., "Multimodal Maps: An Agent-based Approach", International Conference on Cooperative Multimodal Communication, Jun. 9, 1995, pp. 1-15.
Cheyer et al., "Spoken Language and Multimodal Applications for Electronic Realties", Virtual Reality, vol. 3, 1999, pp. 1-15.
Cheyer et al., "The Open Agent Architecture,", Autonomous Agents and Multi-Agent systems, vol. 4, Mar. 1, 2001, 6 pages.
Cheyer et al., "The Open Agent Architecture: Building Communities of Distributed Software Agents", Artificial Intelligence Center SRI International, Power Point presentation, available online at <http://www.ai.sri.com/~oaa>, Feb. 21, 1998, 25 pages.
Cheyer, A., "Demonstration Video of Vanguard Mobile Portal", available online at <http://www.youtube.com/watch?v=ZTMsvg_ 0oLQ&feature=youtu.be>, published on 2004, 10 pages.
Cheyer, Adam, "A Perspective on AI & Agent Technologies for SCM", VerticaiNet presentation, 2001, 22 pages.
"Integrated Audio-Graphics User Interface", IBM Technical Disclosure Bulletin, vol. 33, No. 11, Apr. 1991, pp. 368-371.
"Interactive Voice", available online at <http://www.helloivee.com/ company/> retrieved from internet on Feb. 10, 2014, 2 pages.
"Meet Ivee Your Wi-Fi Voice Activated Assistant", available online at <http://www.helloivee.com/> retrieved from internet on Feb. 10, 2014, 8 pages.
"Mel Scale", Wikipedia the Free Encyclopedia, last modified on Oct. 13, 2009 and retrieved on Jul. 28, 2010, available online <http://en.wikipedia.org/wiki/Mel_scale>, 2 pages.

(56) References Cited

OTHER PUBLICATIONS

"Minimum Phase", Wikipedia the free Encyclopedia, Last Modified on Jan. 12, 2010 and retrieved on Jul. 28, 2010, available online at <http://en.wikipedia.org/wiki/Minimum_phase>, 8 pages.
"Speech Editor", IBM Technical Disclosure Bulletin, vol. 29, No. 10, Mar. 1987, pp. 4512-4514.
"Speech Recognition with Hidden Markov Models of Speech Waveforms", IBM Technical Disclosure Bulletin, vol. 34, No. 1, Jun. 1991, pp. 7-16.
Ex-Parte Quayle Action received for U.S. Appl. No. 12/244,713, mailed on Sep. 10, 2012, 5 pages.
Non Final Office Action received for U.S. Appl. No. 12/244,713, dated Dec. 23, 2011, 11 pages.
Bahl et al., "Large Vocabulary Natural Language Continuous Speech Recognition", In Proceedings of 1989 International Conference on Acoustics, Speech, and Signal Processing, vol. 1, May 23-26, 1989, 6 pages.
Notice of Allowance received for U.S. Appl. No. 12/244,713, dated Aug. 7, 2012, 7 pages.
Notice of Allowance received for U.S. Appl. No. 12/244,713, dated May 10, 2012, 5 pages.
Final Office Action received for U.S. Appl. No. 13/053,144, dated Nov. 19, 2013, 24 pages.
Non Final Office Action received for U.S. Appl. No. 13/053,144, dated Mar. 22, 2013, 18 pages.
Notice of Allowance received for U.S. Appl. No. 13/480,422, dated Jul. 19, 2012, 9 pages.
Supplemental Notice of Allowance received for U.S. Appl. No. 13/480,422, dated Sep. 27, 2012, 2 pages.
Notice of Allowance received for U.S. Appl. No. 13/604,556, dated Apr. 1, 2013, 9 pages.
Notice of Allowance received for U.S. Appl. No. 13/604,556, dated Jul. 31, 2013, 9 pages.
Acero et al., "Environmental Robustness in Automatic Speech Recognition", International Conference on Acoustics, Speech, and Signal Processing (ICASSP'90), Apr. 3-6, 1990, 4 pages.
Acero et al., "Robust Speech Recognition by Normalization of the Acoustic Space", International Conference on Acoustics, Speech, and Signal Processing, 1991, 4 pages.
Agnes et al., "Spoken Language Translator: First-Year Report", SICS Research Report, Jan. 1994, 161 pages.
Ahlborn et al., "Modeling Spectral Speech Transitions Using Temporal Decomposition Techniques", IEEE International Conference of Acoustics, Speech, and Signal Processing (ICASSP'87), vol. 12, Apr. 1987, 4 pages.
Aikawa et al., "Speech Recognition Using Time-Warping Neural Networks", Proceedings of the 1991 IEEE Workshop on Neural Networks for Signal Processing, Sep. 30 to Oct. 1, 1991, 10 pages.
Alfred App, available online at <http://www.alfredapp.com/>, retrieved on Feb. 8, 2012, 5 pages.
Allen, James, "Natural Language Understanding", 2nd Edition, 1995, 671 pages.
Alshawi et al., "CLARE: A Contextual Reasoning and Cooperative Response Framework for the Core Language Engine—Final Report", SRI International, available online at <http://www.cam.sri.com/tr/crc028/paper.ps.Z>, Dec. 1992, pp. 1-272.
Alshawi et al., "Declarative Derivation of Database Queries from Meaning Representations", Proceedings of the BANKAI Workshop, Oct. 1991, pp. 1-12.
Alshawi et al., "Logical Forms in the Core Language Engine", Proceedings of the 27th Annual Meeting of the Association for Computational Linguistics, 1989, pp. 25-32.
Alshawi et al., "Overview of the Core Language Engine", Proceedings of Future Generation Computing Systems, Sep. 1988, pp. 1-13.
Alshawi, Hiyan, "Translation and Monotonic Interpretation/Generation", SRI International, available online at <http://www.cam.sri.com/tr/crc024/paper.ps.Z>, Jul. 1992, pp. 1-18.
Ambite et al., "Design and Implementation of the CALO Query Manager", American Association for Artificial Intelligence, 2006, 8 pages.
Ambite et al., "Integration of Heterogeneous Knowledge Sources in the CALO Query Manager", The 4th International Conference on Ontologies, DataBases, and Applications of Semantics (ODBASE), 2005, 18 pages.
Anastasakos et al., "Duration Modeling in Large Vocabulary Speech Recognition", International Conference on Acoustics, Speech, and Signal Processing (ICASSP'95), May 9-12, 1995, 4 pages.
Anderson et al., "Syntax-Directed Recognition of Hand-Printed Two-Dimensional Mathematics", In Proceedings of Symposium on Interactive Systems for Experimental Applied Mathematics: Proceedings of the Association for Computing Machinery Inc. Symposium, 1967, 12 pages.
Anonymous, "Speaker Recognition", Wikipedia, The Free Enclyclopedia, Nov. 2, 2010, 3 pages.
Ansari et al., "Pitch Modification of Speech using a Low-Sensitivity Inverse Filter Approach", IEEE Signal Processing Letters, vol. 5, No. 3, Mar. 1998, 3 pages.
Anthony et al., "Supervised Adaption for Signature Verification System", IBM Technical Disclosure, Jun. 1, 1978, 3 pages.
Appelt et al., "Fastus: A Finite-state Processor for Information Extraction from Real-world Text", Proceedings of IJCAI, 1993, 8 pages.
Appelt et al., "SRI International Fastus System MUC-6 Test Results and Analysis", SRI International, 1995, 12 pages.
Appelt et al., "SRI: Description of the JV-FASTUS System Used for MUC-5", SRI International, 1993, pp. 1-19.
Apple Computer, "Guide Maker User's Guide", © Apple Computer, Inc., Apr. 27, 1994, 8 pages.
Apple Computer, "Introduction to Apple Guide", © Apple Computer, Inc., Apr. 28, 1994, 20 pages.
Apple Computer, "Knowledge Navigator", available online at <http://www.youtube.com/watch?v=QRH8eimU_20>, Uploaded on Apr. 29, 2008, 7 pages.
Archbold et al., "A Team User's Guide", SRI International, Technical Note 254, Dec. 21, 1981, 70 pages.
Asanovic et al., "Experimental Determination of Precision Requirements for Back-Propagation Training of Artificial Neural Networks", In Proceedings of the 2nd International Conference of Microelectronics for Neural Networks, 1991, www.ICSI.Berkelev.EDU, 1991, 7 pages.
Atal et al., "Efficient Coding of LPC Parameters by Temporal Decomposition", IEEE International Conference on Acoustics, Speech, and Signal Processing (ICASSP'83), Apr. 1983, 4 pages.
Bahl et al., "A Maximum Likelihood Approach to Continuous Speech Recognition", IEEE Transaction on Pattern Analysis and Machine Intelligence, vol. PAMI-5, No. 2, Mar. 1983, 13 pages.
Bahl et al., "A Tree-Based Statistical Language Model for Natural Language Speech Recognition", IEEE Transactions on Acoustics, Speech and Signal Processing, vol. 37, No. Jul. 1989, 8 pages.
Bahl et al., "Acoustic Markov Models Used in the Tangora Speech Recognition System", In Proceeding of International Conference on Acoustics, Speech, and Signal Processing (ICASSP'88), vol. 1, Apr. 11-14, 1988, 4 pages.
Bulyko et al., "Error-Correction Detection and Response Generation in a Spoken Dialogue System", Speech Communication, vol. 45, 2005, pp. 271-288.
International Search Report and Written Opinion received for PCT Patent Application No. PCT/US2014/028950, dated Nov. 25, 2014, 10 pages.
International Preliminary Report on Patentability received for PCT Patent Application No. PCT/US2014/028950, dated Sep. 24, 2015, 8 pages.
Office Action received for Chinese Patent Application No. 201480011309.9, dated Mar. 8, 2018, 14 pages (5 pages of English Translation and 9 pages of Official Copy).
Office Action received for Korean Patent Application No. 10-2015-7023584, dated Mar. 7, 2018, 6 pages (3 pages of English translation and 3 pages of Official copy).
Notice of Allowance received for Korean Patent Application No. 10-2015-7023584, dated Jun. 25, 2018, 3 pages (1 page of English Translation and 2 pages of official copy).

* cited by examiner

CONTEXT-SENSITIVE HANDLING OF INTERRUPTIONS

CROSS-REFERENCE TO RELATED APPLICATIONS

This application claims the benefit of U.S. Provisional Application No. 61/799,996, filed on Mar. 15, 2013, entitled CONTEXT-SENSITIVE HANDLING OF INTERRUPTIONS, which is hereby incorporated by reference in its entity for all purposes.

TECHNICAL FIELD

The disclosed embodiments relate generally to digital assistants, and more specifically, to digital assistants that intelligently handle notifications based on the current context.

BACKGROUND

Just like human personal assistants, digital assistants or virtual assistants can perform requested tasks and provide requested advice, information, or services. An assistant's ability to fulfill a user's request is dependent on the assistant's correct comprehension of the request or instructions. Recent advances in natural language processing have enabled users to interact with digital assistants using natural language, in spoken or textual forms, rather than employing a conventional user interface (e.g., menus or programmed commands). Such digital assistants can interpret the user's input to infer the user's intent, translate the inferred intent into actionable tasks and parameters, execute operations or deploy services to perform the tasks, and produce outputs that are intelligible to the user. Ideally, the outputs produced by a digital assistant should fulfill the user's intent expressed during the natural language interaction between the user and the digital assistant.

However, many digital assistants are merely reactive, in that they provide outputs to the user only in response to a user's requests for information. For example, a digital assistant will provide driving directions when a user asks for them, will set an alarm, search the web, or the like. But by only reacting to overt requests for information, the helpfulness of digital assistants is inherently limited. Human personal assistants, on the other hand, are proactive. They can determine what information a person may need and provide it before it is requested. And they can determine whether and how to interrupt a user to provide such information in the most appropriate manner.

Accordingly, there is a need for methods of operating a digital assistant that intelligently and intuitively determine information to provide to a user, without first receiving a specific request for it, and intelligently determine what information warrants interrupting a user, and how to present that information in an appropriate manner.

SUMMARY

The embodiments described below offer an improved method for providing audio prompts associated with notification items. In particular, in some embodiments, a digital assistant dynamically and intelligently assigns urgency values to the notifications in a notification list, and provides audio prompts only if the urgency values satisfy a predetermined threshold. Thus, whereas traditional notification techniques either provide all notifications to a user, or none (e.g., if the device has been placed in a silent mode), the present methods allow a digital assistant to intelligently determine whether to interrupt a user based on the urgency of the message and the user's context. Moreover, in some implementations, the digital assistant detects changing conditions and monitors new incoming notifications to adjust urgency values of existing notification items. Thus, the digital assistant provides real-time triage of the user's notifications, so that truly important notifications—including notifications that have only recently become important because of changing conditions or newly received information—are not missed simply because the user didn't want to be interrupted with notifications of sports scores updates during a business lunch.

The embodiments disclosed herein provide methods, systems, computer readable storage medium and user interfaces for a digital assistant to intelligently and dynamically determine whether to provide a speech output. The method includes providing a list of notification items, the list including a plurality of notification items, wherein each respective one of the plurality of notification items is associated with a respective urgency value. The method further includes detecting an information item, and determining whether the information item is relevant to an urgency value of a first notification item of the plurality of notification items. The method further includes, upon determining that the information item is relevant to the urgency value of the first notification item, adjusting the urgency value of the first notification item. The method further includes determining whether the adjusted urgency value of the first notification item satisfies a predetermined threshold, and upon determining that the adjusted urgency value satisfies the predetermined threshold, providing a first audio prompt to a user.

In some embodiments, the method further includes establishing the predetermined threshold in accordance with a location of the device. In some embodiments, the method further includes establishing the predetermined threshold in accordance with a time of day. In some embodiments, the method further includes establishing the predetermined threshold in accordance with a calendar item associated with a current time. In some embodiments, the method further includes establishing the predetermined threshold in accordance with a user setting of the device.

In some embodiments, the information item is one of the group consisting of: an email; a voicemail; and a text message. In some embodiments, the information item is an application notification. In some embodiments, the information item is a change in a context of the device.

In some embodiments, the method further includes detecting two information items, including at least a communication and a change in a context of the device.

In some implementations, the respective urgency values are based on one or more of: a time associated with the respective notification item; a location associated with the respective notification item; and content of the respective notification item.

In some embodiments, the method further includes determining a topic of importance to a user of the device, and assigning at least one of the respective urgency values to a respective notification item based on a determination that the respective notification item corresponds to the topic of importance. In some implementations, the topic of importance is determined by the device automatically without human intervention.

In some implementations, determining whether the information item is relevant to the urgency value of the first notification item includes determining that the information item corresponds to a change to a location associated with the first notification item. In some implementations, determining whether the information item is relevant to the urgency value of the first notification item includes determining that the information item corresponds to a change in a time associated with the first notification item.

In some embodiments, the method further includes, upon determining that the adjusted urgency value does not satisfy the predetermined threshold, delaying providing the audio prompt to the user.

In some embodiments, detecting the information item includes receiving an incoming communication, and determining whether the information item is relevant to the urgency value of the first notification item is performed in response to receiving the incoming communication.

In some embodiments, the method further includes determining whether the user has acknowledged the first audio prompt; and upon determining that the user has not acknowledged the first audio prompt, providing a second audio prompt to the user, the second audio prompt being different from the first audio prompt. In some embodiments, the second audio prompt is louder than the first audio prompt. In some embodiments, the second audio prompt is longer than the first audio prompt. In some embodiments, the first audio prompt is a first ringtone and the second audio prompt is a second ringtone different from the first.

In some embodiments, the method further includes determining whether the user has acknowledged the second audio prompt; and upon determining that the user has not acknowledged the second audio prompt, providing a third audio prompt to the user, the third audio prompt being different from the first audio prompt and the second audio prompt. In some embodiments, the third audio prompt is a speech output. In some embodiments, the first audio prompt is a ringtone, the second audio prompt is a first speech output of a first volume, and the third audio prompt is a second speech output of a second volume louder than the first volume. In some embodiments, the first audio prompt is a ringtone, the second audio prompt is a first speech output of a first length, and the third audio prompt is a second speech output of a second length longer than the first length.

In some embodiments, the method further includes incorporating information from the information item into the first notification item.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform the operations of any of the methods referred described above. In accordance with some embodiments, an electronic device includes: a display, a touch-sensitive surface, and optionally one or more sensors to detect intensity of contacts with the touch-sensitive surface; and means for performing the operations of any of the methods described above. In accordance with some embodiments, an information processing apparatus, for use in an electronic device with a display and a touch-sensitive surface, optionally one or more sensors to detect intensity of contacts with the touch-sensitive surface, includes means for performing the operations of any of the methods described above.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numerals refer to corresponding parts throughout the drawings.

DESCRIPTION OF EMBODIMENTS

Figure 1:
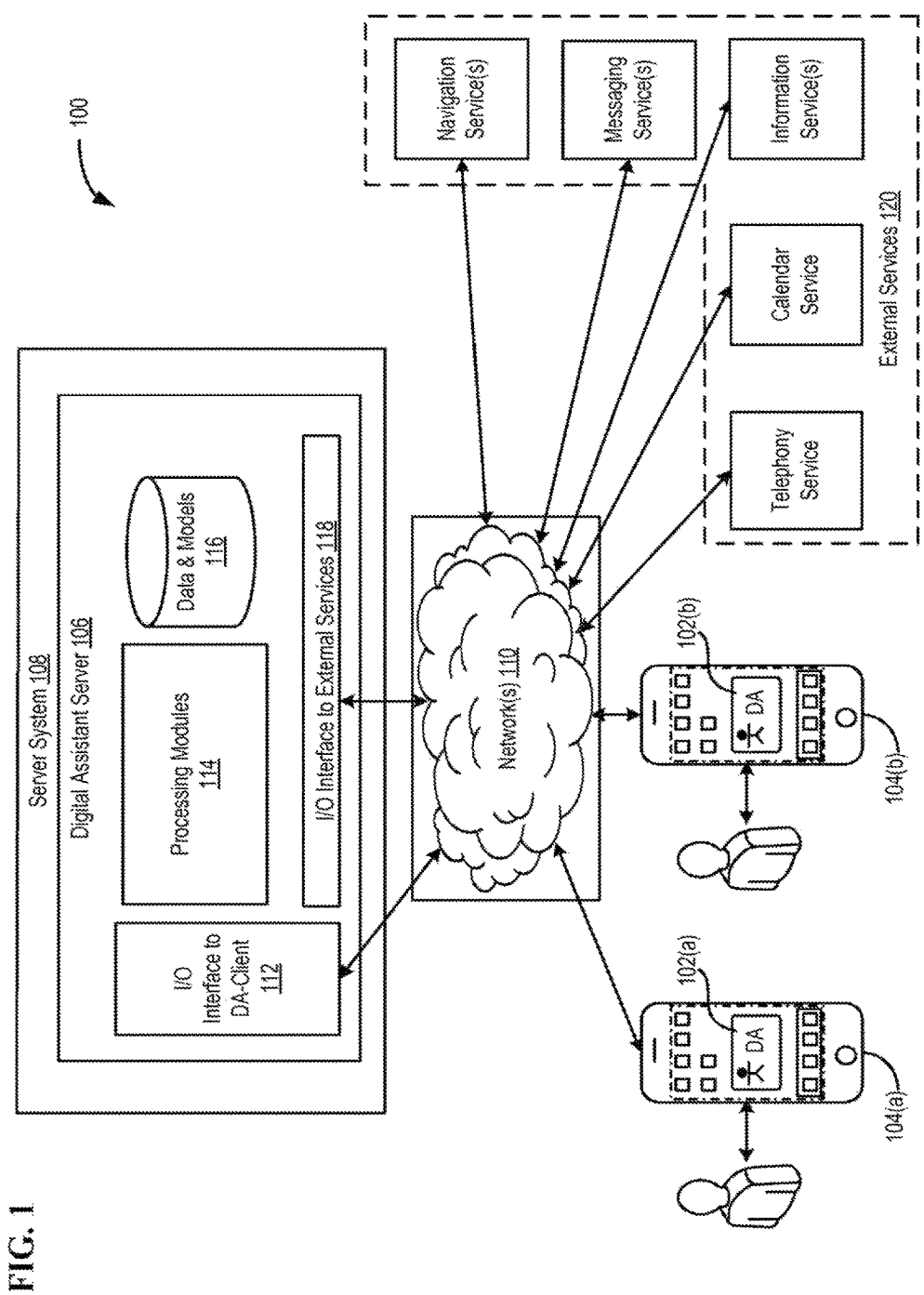
FIG. 1 is a block diagram illustrating an environment in which a digital assistant operates in accordance with some embodiments.

FIG. 1 is a block diagram of an operating environment 100 of a digital assistant according to some embodiments. The terms "digital assistant," "virtual assistant," "intelligent automated assistant," or "automatic digital assistant," refer to any information processing system that interprets natural language input in spoken and/or textual form to infer user intent, and performs actions based on the inferred user intent. For example, to act on a inferred user intent, the system can perform one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g. speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request is either provision of the requested informational answer, performance of the requested task, or a combination of the two. For example, a user may ask the digital assistant a question, such as "Where am I right now?" Based on the user's current location, the digital assistant may answer, "You are in Central Park near the west gate." The user may also request the performance of a task, for example, "Please invite my friends to my girlfriend's birthday party next week." In response, the digital assistant may acknowledge the request by saying "Yes, right away," and then send a suitable calendar invite on behalf of the user to each of the user' friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

An example of a digital assistant is described in Applicant's U.S. Utility application Ser. No. 12/987,982 for "Intelligent Automated Assistant," filed Jan. 10, 2011, the entire disclosure of which is incorporated herein by reference.

As shown in FIG. 1, in some embodiments, a digital assistant is implemented according to a client-server model. The digital assistant includes a client-side portion 102a, 102b (hereafter "DA client 102") executed on a user device 104a, 104b, and a server-side portion 106 (hereafter "DA server 106") executed on a server system 108. The DA client 102 communicates with the DA server 106 through one or more networks 110. The DA client 102 provides client-side functionalities such as user-facing input and output processing and communications with the DA-server 106. The DA server 106 provides server-side functionalities for any number of DA-clients 102 each residing on a respective user device 104.

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on inferred user intent. In some embodiments, the DA-server 106 communicates with external services 120 through the network(s) 110 for task completion or information acquisition. The I/O interface to external services 118 facilitates such communications.

Examples of the user device 104 include, but are not limited to, a handheld computer, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices. More details on the user device 104 are provided in reference to an exemplary user device 104 shown in FIG. 2.

Examples of the communication network(s) 110 include local area networks ("LAN") and wide area networks ("WAN"), e.g., the Internet. The communication network(s) 110 may be implemented using any known network protocol, including various wired or wireless protocols, such as e.g., Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

The server system 108 is implemented on one or more standalone data processing apparatus or a distributed network of computers. In some embodiments, the server system 108 also employs various virtual devices and/or services of third party service providers (e.g., third-party cloud service providers) to provide the underlying computing resources and/or infrastructure resources of the server system 108.

Although the digital assistant shown in FIG. 1 includes both a client-side portion (e.g., the DA-client 102) and a server-side portion (e.g., the DA-server 106), in some embodiments, the functions of a digital assistant is implemented as a standalone application installed on a user device. In addition, the divisions of functionalities between the client and server portions of the digital assistant can vary in different embodiments. For example, in some embodiments, the DA client is a thin-client that provides only user-facing input and output processing functions, and delegates all other functionalities of the digital assistant to a backend server.

Figure 2:
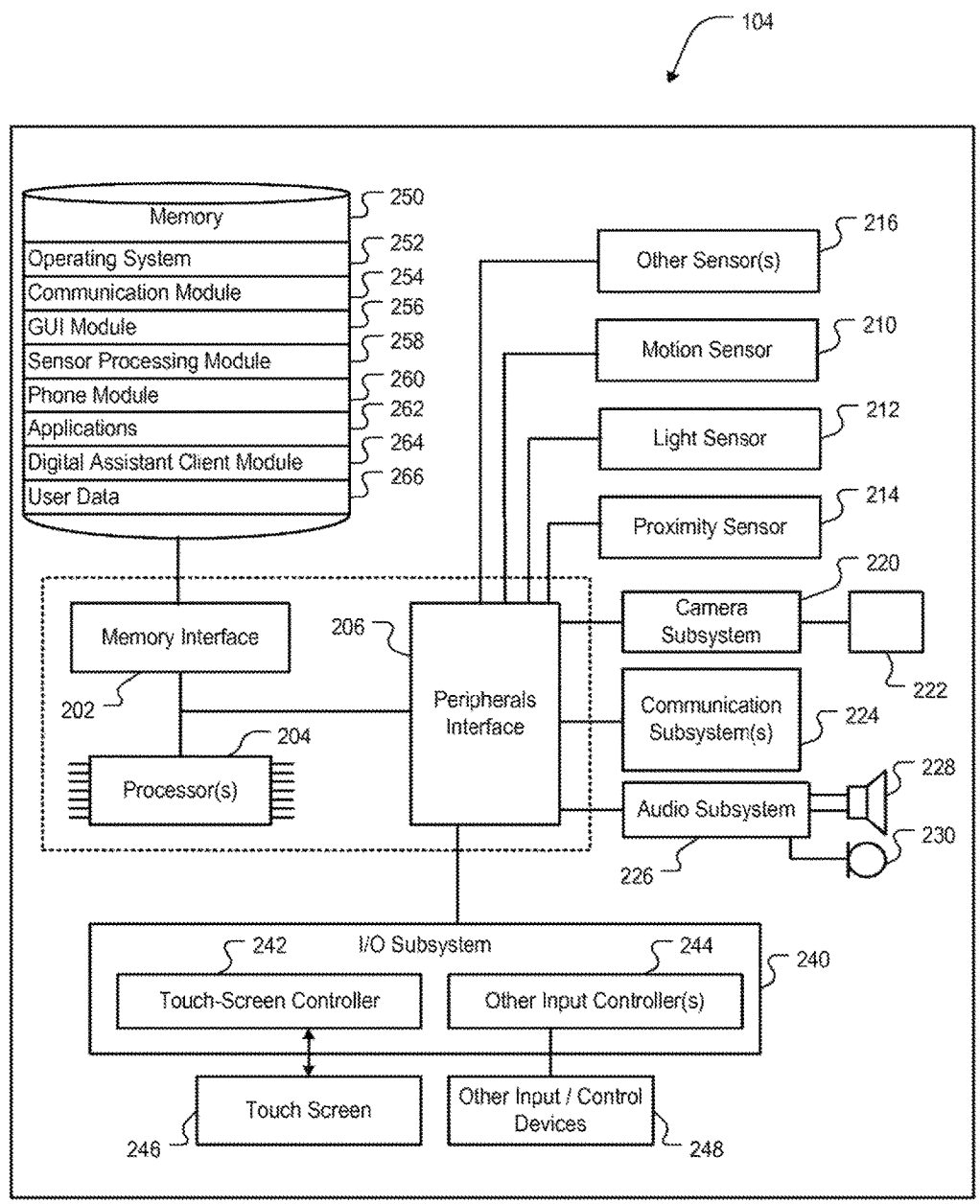
FIG. 2 is a block diagram illustrating a digital assistant client system in accordance with some embodiments.

FIG. 2 is a block diagram of a user-device 104 in accordance with some embodiments. The user device 104 includes a memory interface 202, one or more processors 204, and a peripherals interface 206. The various components in the user device 104 are coupled by one or more communication buses or signal lines. The user device 104 includes various sensors, subsystems, and peripheral devices that are coupled to the peripherals interface 206. The sensors, subsystems, and peripheral devices gather information and/or facilitate various functionalities of the user device 104.

For example, a motion sensor 210, a light sensor 212, and a proximity sensor 214 are coupled to the peripherals interface 206 to facilitate orientation, light, and proximity sensing functions. One or more other sensors 216, such as a positioning system (e.g., GPS receiver), a temperature sensor, a biometric sensor, a gyro, a compass, an accelerometer, and the like, are also connected to the peripherals interface 206, to facilitate related functionalities.

In some embodiments, a camera subsystem 220 and an optical sensor 222 are utilized to facilitate camera functions, such as taking photographs and recording video clips. Communication functions are facilitated through one or more wired and/or wireless communication subsystems 224, which can include various communication pods, radio frequency receivers and transmitters, and/or optical (e.g., infrared) receivers and transmitters. An audio subsystem 226 is coupled to speakers 228 and a microphone 230 to facilitate voice-enabled functions, such as voice recognition, voice replication, digital recording, and telephony functions.

In some embodiments, an I/O subsystem 240 is also coupled to the peripheral interface 206. The I/O subsystem 240 includes a touch screen controller 242 and/or other input controller(s) 244. The touch-screen controller 242 is coupled to a touch screen 246. The touch screen 246 and the touch screen controller 242 can, for example, detect contact and movement or break thereof using any of a plurality of touch sensitivity technologies, such as capacitive, resistive, infrared, surface acoustic wave technologies, proximity sensor arrays, and the like. The other input controller(s) 244 can be coupled to other input/control devices 248, such as one or more buttons, rocker switches, thumb-wheel, infrared port, USB port, and/or a pointer device such as a stylus.

In some embodiments, the memory interface 202 is coupled to memory 250. The memory 250 can include high-speed random access memory and/or non-volatile memory, such as one or more magnetic disk storage devices, one or more optical storage devices, and/or flash memory (e.g., NAND, NOR).

In some embodiments, the memory 250 stores an operating system 252, a communication module 254, a user interface module 256, a sensor processing module 258, a phone module 260, and applications 262. The operating system 252 includes instructions for handling basic system services and for performing hardware dependent tasks. The communication module 254 facilitates communicating with one or more additional devices, one or more computers and/or one or more servers. The user interface module 256 facilitates graphic user interface processing and output processing using other output channels (e.g., speakers). The sensor processing module 258 facilitates sensor-related processing and functions. The phone module 260 facilitates phone-related processes and functions. The application module 262 facilitates various functionalities of user applications, such as electronic-messaging, web browsing, media processing, Navigation, imaging and/or other processes and functions.

As described in this specification, the memory 250 also stores client-side digital assistant instructions (e.g., in a digital assistant client module 264) and various user data 266 (e.g., user-specific vocabulary data, preference data, and/or other data such as the user's electronic address book, to-do lists, shopping lists, etc.) to provide the client-side functionalities of the digital assistant.

In various embodiments, the digital assistant client module 264 is capable of accepting voice input (e.g., speech input), text input, touch input, and/or gestural input through various user interfaces (e.g., the I/O subsystem 244) of the user device 104. The digital assistant client module 264 is also capable of providing output in audio (e.g., speech output), visual, and/or tactile forms. For example, output can be provided as voice, sound, alerts, text messages, menus, graphics, videos, animations, vibrations, and/or combinations of two or more of the above. During operation, the digital assistant client module 264 communicates with the digital assistant server using the communication subsystems 224.

In some embodiments, the digital assistant client module 264 utilizes the various sensors, subsystems and peripheral devices to gather additional information from the surrounding environment of the user device 104 to establish a context associated with a user, the current user interaction, and/or the current user input. In some embodiments, the digital assistant client module 264 provides the context information or a subset thereof with the user input to the digital assistant server to help infer the user's intent. In some embodiments, the digital assistant also uses the context information to determine how to prepare and delivery outputs to the user.

In some embodiments, the context information that accompanies the user input includes sensor information, e.g., lighting, ambient noise, ambient temperature, images or videos of the surrounding environment, etc. In some embodiments, the context information also includes the physical state of the device, e.g., device orientation, device location, device temperature, power level, speed, acceleration, motion patterns, cellular signals strength, etc. In some embodiments, information related to the software state of the user device 104, e.g., running processes, installed programs, past and present network activities, background services, error logs, resources usage, etc., of the user device 104 are provided to the digital assistant server as context information associated with a user input.

In some embodiments, the DA client module 264 selectively provides information (e.g., user data 266) stored on the user device 104 in response to requests from the digital assistant server. In some embodiments, the digital assistant client module 264 also elicits additional input from the user via a natural language dialogue or other user interfaces upon request by the digital assistant server 106. The digital assistant client module 264 passes the additional input to the digital assistant server 106 to help the digital assistant server 106 in intent deduction and/or fulfillment of the user's intent expressed in the user request.

In various embodiments, the memory 250 includes additional instructions or fewer instructions. Furthermore, various functions of the user device 104 may be implemented in hardware and/or in firmware, including in one or more signal processing and/or application specific integrated circuits.

Figure 3A:
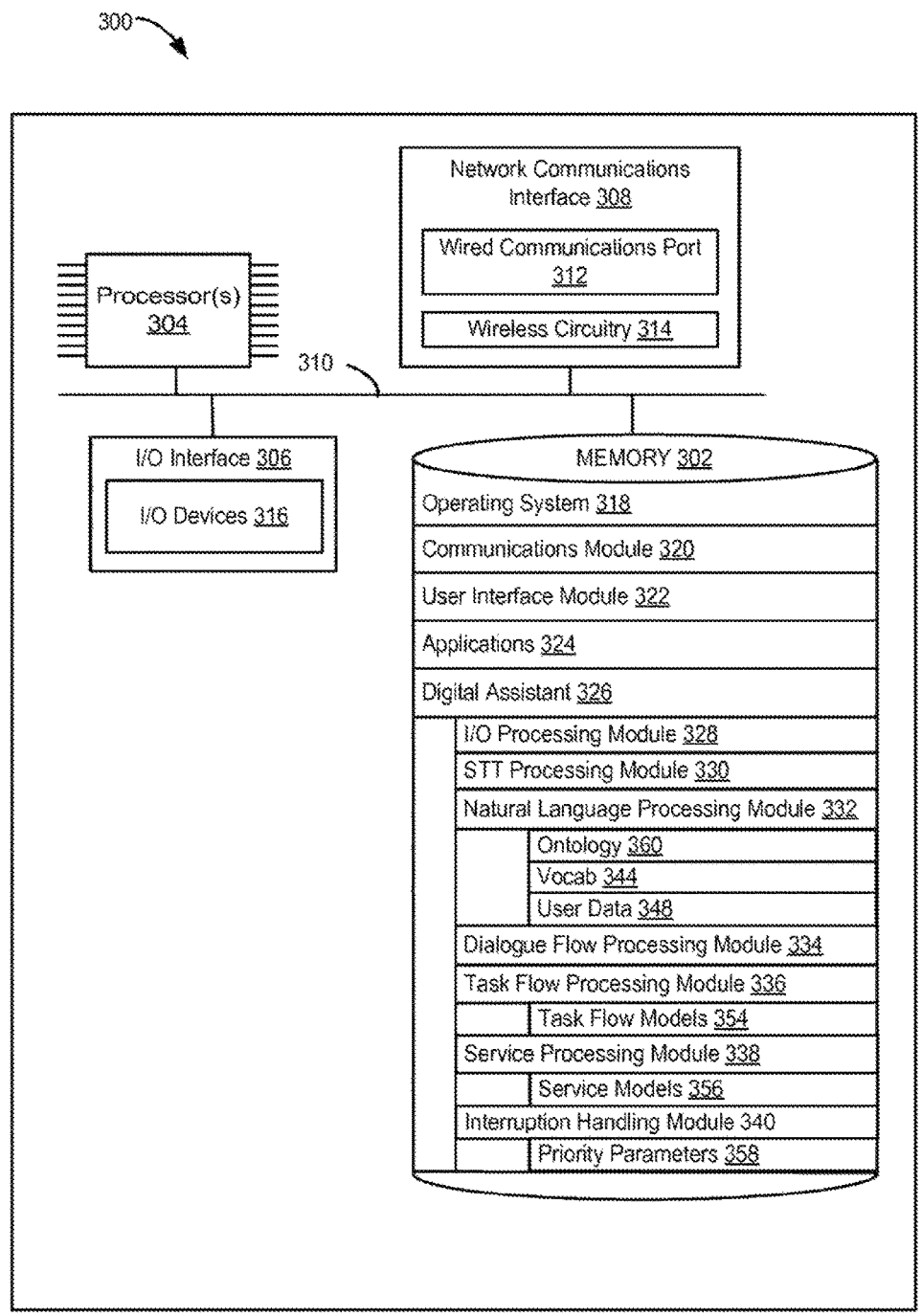
FIG. 3A is a block diagram illustrating a digital assistant system or a server portion thereof in accordance with some embodiments.

FIG. 3A is a block diagram of an example digital assistant system 300 in accordance with some embodiments. In some embodiments, the digital assistant system 300 is implemented on a standalone computer system. In some embodiments, the digital assistant system 300 is distributed across multiple computers. In some embodiments, some of the modules and functions of the digital assistant are divided into a server portion and a client portion, where the client portion resides on a user device (e.g., the user device 104) and communicates with the server portion (e.g., the server system 108) through one or more networks, e.g., as shown in FIG. 1. In some embodiments, the digital assistant system 300 is an embodiment of the server system 108 (and/or the digital assistant server 106) shown in FIG. 1. It should be noted that the digital assistant system 300 is only one example of a digital assistant system, and that the digital assistant system 300 may have more or fewer components than shown, may combine two or more components, or may have a different configuration or arrangement of the components. The various components shown in FIG. 3A may be implemented in hardware, software instructions for execution by one or more processors, firmware, including one or more signal processing and/or application specific integrated circuits, or a combination of thereof.

The digital assistant system 300 includes memory 302, one or more processors 304, an input/output (I/O) interface 306, and a network communications interface 308. These components communicate with one another over one or more communication buses or signal lines 310.

In some embodiments, the memory 302 includes a non-transitory computer readable medium, such as high-speed random access memory and/or a non-volatile computer readable storage medium (e.g., one or more magnetic disk storage devices, flash memory devices, or other non-volatile solid-state memory devices).

In some embodiments, the I/O interface 306 couples input/output devices 316 of the digital assistant system 300, such as displays, a keyboards, touch screens, and microphones, to the user interface module 322. The I/O interface 306, in conjunction with the user interface module 322, receive user inputs (e.g., voice input, keyboard inputs, touch inputs, etc.) and process them accordingly. In some embodiments, e.g., when the digital assistant is implemented on a standalone user device, the digital assistant system 300 includes any of the components and I/O and communication interfaces described with respect to the user device 104 in FIG. 2. In some embodiments, the digital assistant system 300 represents the server portion of a digital assistant implementation, and interacts with the user through a client-side portion residing on a user device (e.g., the user device 104 shown in FIG. 2).

In some embodiments, the network communications interface 308 includes wired communication port(s) 312 and/or wireless transmission and reception circuitry 314. The wired communication port(s) receive and send communication signals via one or more wired interfaces, e.g., Ethernet, Universal Serial Bus (USB), FIREWIRE, etc. The wireless circuitry 314 receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 308 enables communication between the digital assistant system 300 with networks, such as the Internet, an intranet and/or a wireless network, such as a cellular telephone network, a wireless local area network (LAN) and/or a metropolitan area network (MAN), and other devices.

In some embodiments, memory 302, or the computer readable storage media of memory 302, stores programs, modules, instructions, and data structures including all or a subset of: an operating system 318, a communications module 320, a user interface module 322, one or more applications 324, and a digital assistant module 326. The one or more processors 304 execute these programs, modules, and instructions, and reads/writes from/to the data structures.

The operating system 318 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 320 facilitates communications between the digital assistant system 300 with other devices over the network communications interface 308. For example, the communications module 320 may communicate with the communication interface 254 of the device 104 shown in FIG. 2 The communications module 320 also includes various components for handling data received by the wireless circuitry 314 and/or wired communications port 312.

The user interface module 322 receives commands and/or inputs from a user via the I/O interface 306 (e.g., from a keyboard, touch screen, pointing device, controller, and/or microphone), and generates user interface objects on a display. The user interface module 322 also prepares and delivers outputs (e.g., speech, sound, animation, text, icons, vibrations, haptic feedback, and light, etc.) to the user via the I/O interface 306 (e.g., through displays, audio channels, speakers, and touch-pads, etc.).

The applications 324 include programs and/or modules that are configured to be executed by the one or more processors 304. For example, if the digital assistant system is implemented on a standalone user device, the applications 324 may include user applications, such as games, a calendar application, a navigation application, or an email application. If the digital assistant system 300 is implemented on a server farm, the applications 324 may include resource management applications, diagnostic applications, or scheduling applications, for example.

The memory 302 also stores the digital assistant module (or the server portion of a digital assistant) 326. In some embodiments, the digital assistant module 326 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and an interruption handling module 340. Each of these modules has access to one or more of the following data and models of the digital assistant 326, or a subset or superset thereof: ontology 360, vocabulary index 344, user data 348, task flow models 354, service models 356, and priority parameters database 358.

In some embodiments, using the processing modules, data, and models implemented in the digital assistant module 326, the digital assistant performs at least some of the following: identifying a user's intent expressed in a natural language input received from the user; actively eliciting and obtaining information needed to fully infer the user's intent (e.g., by disambiguating words, names, intentions, etc.); determining the task flow for fulfilling the inferred intent; and executing the task flow to fulfill the inferred intent. In this specifications, more details regarding the interruption handling module and its use of the priority parameters are provided later.

Figure 3B:
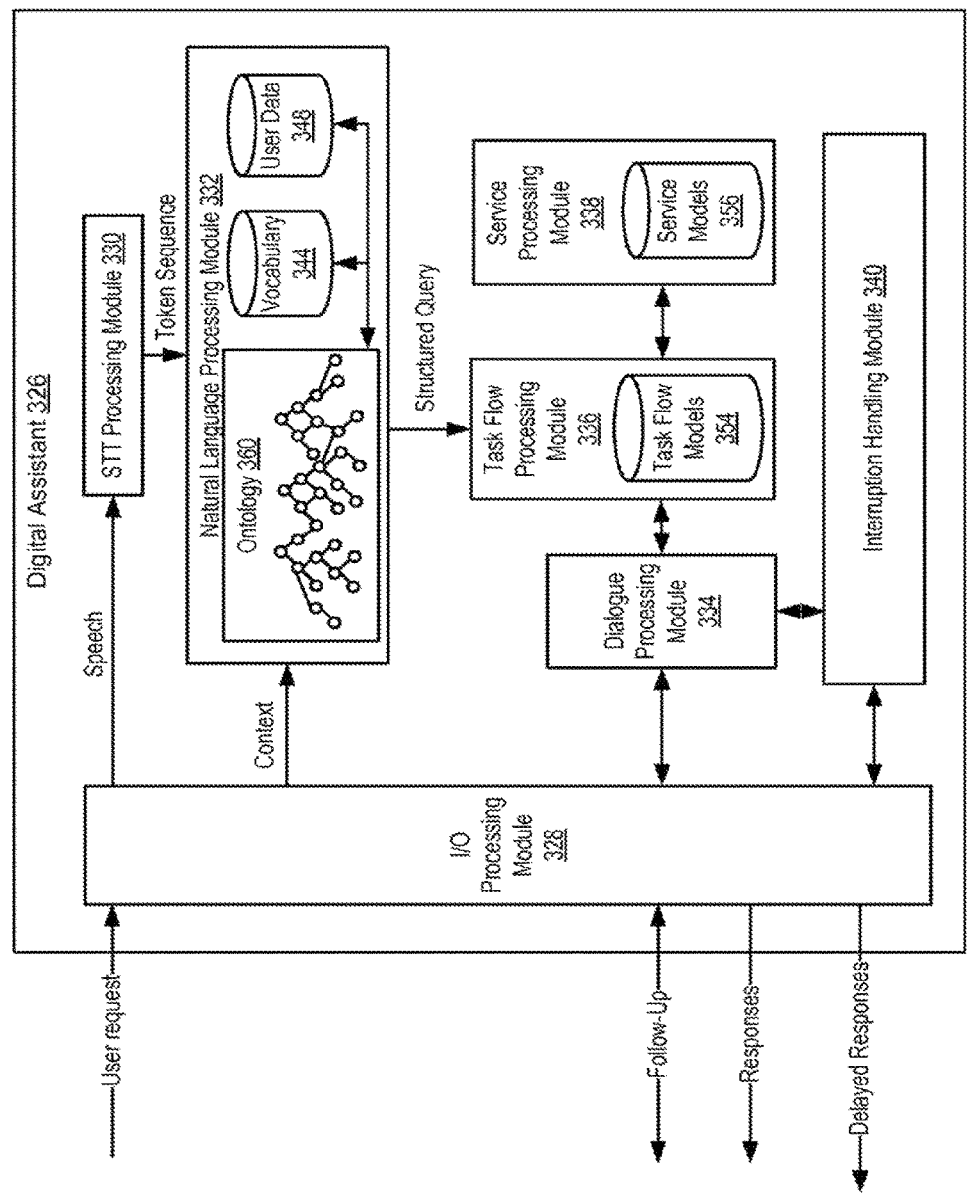
FIG. 3B is a block diagram illustrating functions of the digital assistant shown in FIG. 3A in accordance with some embodiments.

In some embodiments, as shown in FIG. 3B, the I/O processing module 328 interacts with the user through the I/O devices 316 in FIG. 3A or with a user device (e.g., a user device 104 in FIG. 1) through the network communications interface 308 in FIG. 3A to obtain user input (e.g., a speech input) and to provide responses (e.g., as speech outputs) to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the device (e.g., the user device 104 in FIG. 1) at the time the user request is received, and/or information related to the surrounding environment of the user at the time that the user request was received. In some embodiments, the I/O processing module 328 also sends follow-up questions to, and receives answers from, the user regarding the user request. When a user request is received by the I/O processing module 328 and the user request contains a speech input, the I/O processing module 328 forwards the speech input to the speech-to-text (STT) processing module 330 for speech-to-text conversions.

The speech-to-text processing module 330 receives speech input (e.g., a user utterance captured in a voice recording) through the I/O processing module 328. In some embodiments, the speech-to-text processing module 330 uses various acoustic and language models to recognize the speech input as a sequence of phonemes, and ultimately, a sequence of words or tokens written in one or more languages. The speech-to-text processing module 330 can be implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-totext processing, e.g., a sequence of words or tokens, it passes the result to the natural language processing module 332 for intent deduction.

The natural language processing module 332 ("natural language processor") of the digital assistant takes the sequence of words or tokens ("token sequence") generated by the speech-to-text processing module 330, and attempts to associate the token sequence with one or more "actionable intents" recognized by the digital assistant. An "actionable intent" represents a task that can be performed by the digital assistant, and has an associated task flow implemented in the task flow models 354. The associated task flow is a series of programmed actions and steps that the digital assistant takes in order to perform the task. The scope of a digital assistant's capabilities is dependent on the number and variety of task flows that have been implemented and stored in the task flow models 354, or in other words, on the number and variety of "actionable intents" that the digital assistant recognizes. The effectiveness of the digital assistant, however, is also dependent on the assistant's ability to infer the correct "actionable intent(s)" from the user request expressed in natural language.

In some embodiments, in addition to the sequence of words or tokens obtained from the speech-to-text processing module 330, the natural language processor 332 also receives context information associated with the user request, e.g., from the I/O processing module 328. The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like. As described in this specification, context information is dynamic, and can change with time, location, content of the dialogue, and other factors.

In some embodiments, the natural language processing is based on e.g., ontology 360. The ontology 360 is a hierarchical structure containing many nodes, each node representing either an "actionable intent" or a "property" relevant to one or more of the "actionable intents" or other "properties". As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in the ontology 360 defines how a parameter represented by the property node pertains to the task represented by the actionable intent node.

Figure 3C:
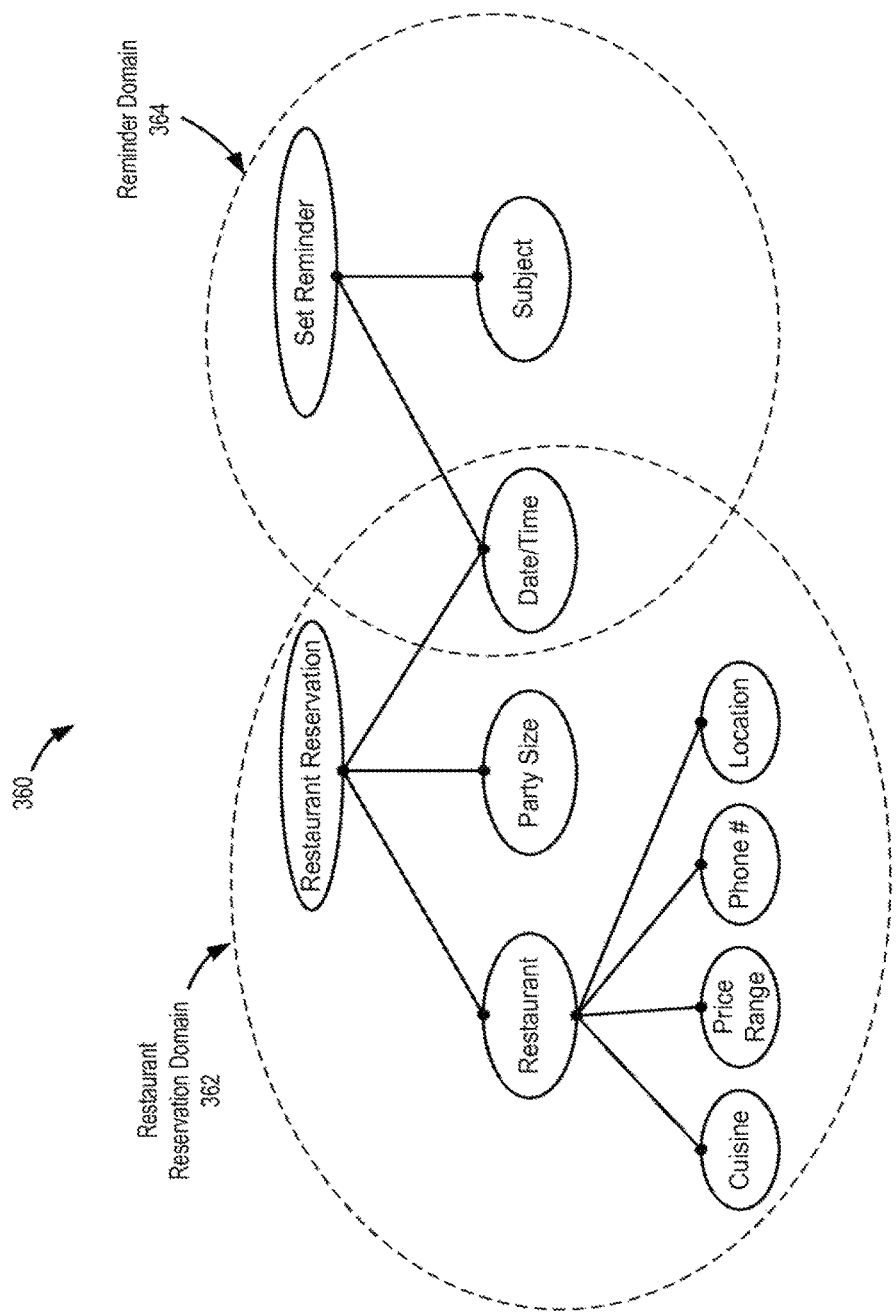
FIG. 3C is a diagram of a portion of an ontology in accordance with some embodiments.

In some embodiments, the ontology 360 is made up of actionable intent nodes and property nodes. Within the ontology 360, each actionable intent node is linked to one or more property nodes either directly or through one or more intermediate property nodes. Similarly, each property node is linked to one or more actionable intent nodes either directly or through one or more intermediate property nodes. For example, as shown in FIG. 3C, the ontology 360 may include a "restaurant reservation" node (i.e., an actionable intent node). Property nodes "restaurant," "date/time" (for the reservation), and "party size" are each directly linked to the actionable intent node (i.e., the "restaurant reservation" node). In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 3C, the ontology 360 may also include a "set reminder" node (i.e., another actionable intent node). Property nodes "date/time" (for the setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in the ontology 360.

An actionable intent node, along with its linked concept nodes, may be described as a "domain." In the present discussion, each domain is associated with a respective actionable intent, and refers to the group of nodes (and the relationships therebetween) associated with the particular actionable intent. For example, the ontology 360 shown in FIG. 3C includes an example of a restaurant reservation domain 362 and an example of a reminder domain 364 within the ontology 360. The restaurant reservation domain includes the actionable intent node "restaurant reservation," property nodes "restaurant," "date/time," and "party size," and sub-property nodes "cuisine," "price range," "phone number," and "location." The reminder domain 364 includes the actionable intent node "set reminder," and property nodes "subject" and "date/time." In some embodiments, the ontology 360 is made up of many domains. Each domain may share one or more property nodes with one or more other domains. For example, the "date/time" property node may be associated with many different domains (e.g., a scheduling domain, a travel reservation domain, a movie ticket domain, etc.), in addition to the restaurant reservation domain 362 and the reminder domain 364.

While FIG. 3C illustrates two example domains within the ontology 360, other domains (or actionable intents) include, for example, "initiate a phone call," "find directions," "schedule a meeting," "send a message," and "provide an answer to a question," "read a list", "providing navigation instructions," "provide instructions for a task" and so on. A "send a message" domain is associated with a "send a message" actionable intent node, and may further include property nodes such as "recipient(s)", "message type", and "message body." The property node "recipient" may be further defined, for example, by the sub-property nodes such as "recipient name" and "message address."

In some embodiments, the ontology 360 includes all the domains (and hence actionable intents) that the digital assistant is capable of understanding and acting upon. In some embodiments, the ontology 360 may be modified, such as by adding or removing entire domains or nodes, or by modifying relationships between the nodes within the ontology 360.

In some embodiments, nodes associated with multiple related actionable intents may be clustered under a "super domain" in the ontology 360. For example, a "travel" super-domain may include a cluster of property nodes and actionable intent nodes related to travels. The actionable intent nodes related to travels may include "airline reservation," "hotel reservation," "car rental," "get directions," "find points of interest," and so on. The actionable intent nodes under the same super domain (e.g., the "travels" super domain) may have many property nodes in common. For example, the actionable intent nodes for "airline reservation," "hotel reservation," "car rental," "get directions," "find points of interest" may share one or more of the property nodes "start location," "destination," "departure date/time," "arrival date/time," and "party size."

In some embodiments, each node in the ontology 360 is associated with a set of words and/or phrases that are relevant to the property or actionable intent represented by the node. The respective set of words and/or phrases associated with each node is the so-called "vocabulary" associated with the node. The respective set of words and/or phrases associated with each node can be stored in the vocabulary index 344 in association with the property or actionable intent represented by the node. For example, returning to FIG. 3B, the vocabulary associated with the node for the property of "restaurant" may include words such as "food," "drinks," "cuisine," "hungry," "eat," "pizza," "fast food," "meal," and so on. For another example, the vocabulary associated with the node for the actionable intent of "initiate a phone call" may include words and phrases such as "call," "phone," "dial," "ring," "call this number," "make a call to," and so on. The vocabulary index 344 optionally includes words and phrases in different languages.

The natural language processor 332 receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. Based on the quantity and/or relative importance of the activated nodes, the natural language processor 332 will select one of the actionable intents as the task that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the digital assistant has previously correctly interpreted a similar request from a user.

In some embodiments, the digital assistant also stores names of specific entities in the vocabulary index 344, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the digital assistant searches and identifies specific entity names from other data sources, such as the user's address book, a movies database, a musicians database, and/or a restaurant database. In some embodiments, when the natural language processor 332 identifies that a word in the token sequence is a name of a specific entity (such as a name in the user's address book), that word is given additional significance in selecting the actionable intent within the ontology for the user request.

For example, when the words "Mr. Santo" are recognized from the user request, and the last name "Santo" is found in the vocabulary index 344 as one of the contacts in the user's contact list, then it is likely that the user request corresponds to a "send a message" or "initiate a phone call" domain. For another example, when the words "ABC Café" are found in the user request, and the term "ABC Café" is found in the vocabulary index 344 as the name of a particular restaurant in the user's city, then it is likely that the user request corresponds to a "restaurant reservation" domain.

User data 348 includes user-specific information, such as user-specific vocabulary, user preferences, user address, user's default and secondary languages, user's contact list, and other short-term or long-term information for each user. In some embodiments, the natural language processor 332 uses the user-specific information to supplement the information contained in the user input to further define the user intent. For example, for a user request "invite my friends to my birthday party," the natural language processor 332 is able to access user data 348 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some embodiments, once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request. For example, the user may say "Make me a dinner reservation at a sushi place at 7." In this case, the natural language processor 332 may be able to correctly identify the actionable intent to be "restaurant reservation" based on the user input. According to the ontology, a structured query for a "restaurant reservation" domain may include parameters such as {Cuisine}, {Time}, {Date}, {Party Size}, and the like. In some embodiments, based on the information contained in the user's utterance, the natural language processor 332 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some embodiments, the natural language processor 332 populates some parameters of the structured query with received context information. For example, in some embodiments, if the user requested a sushi restaurant "near me," the natural language processor 332 populates a {location} parameter in the structured query with GPS coordinates from the user device 104.

In some embodiments, the natural language processor 332 passes the structured query (including any completed parameters) to the task flow processing module 336 ("task flow processor"). The task flow processor 336 is configured to receive the structured query from the natural language processor 332, complete the structured query, if necessary, and perform the actions required to "complete" the user's ultimate request. In some embodiments, the various procedures necessary to complete these tasks are provided in task flow models 354. In some embodiments, the task flow models include procedures for obtaining additional information from the user, and task flows for performing actions associated with the actionable intent.

As described above, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor 334") to engage in a dialogue with the user. In some embodiments, the dialogue processor 334 determines how (and/or when) to ask the user for the additional information, and receives and processes the user responses. The questions are provided to and answers are received from the users through the I/O processing module 328. In some embodiments, the dialogue processor 334 presents dialogue output to the user via audio and/or visual output, and receives input from the user via spoken or physical (e.g., clicking) responses. Continuing with the example above, when the task flow processor 336 invokes the dialogue flow processor 334 to determine the "party size" and "date" information for the structured query associated with the domain "restaurant reservation," the dialogue flow processor 335 generates questions such as "For how many people?" and "On which day?" to pass to the user. Once answers are received from the user, the dialogue flow processor 334 can then populate the structured query with the missing information, or pass the information to the task flow processor 336 to complete the missing information from the structured query.

In some cases, the task flow processor 336 may receive a structured query that has one or more ambiguous properties. For example, a structured query for the "send a message" domain may indicate that the intended recipient is "Bob," and the user may have multiple contacts named "Bob." The task flow processor 336 will request that the dialogue processor 334 disambiguate this property of the structured query. In turn, the dialogue processor 334 may ask the user "Which Bob?", and display (or read) a list of contacts named "Bob" from which the user may choose.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. For example, the task flow model for the actionable intent of "restaurant reservation" may include steps and instructions for contacting a restaurant and actually requesting a reservation for a particular party size at a particular time. For example, using a structured query such as: {restaurant reservation, restaurant=ABC Café, date=Mar. 12, 2012, time=7 pm, party size=5}, the task flow processor 336 may perform the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to make a phone call, set a calendar entry, invoke a map search, invoke or interact with other user applications installed on the user device, and invoke or interact with third party services (e.g. a restaurant reservation portal, a social networking website, a banking portal, etc.). In some embodiments, the protocols and application programming interfaces (API) required by each service can be specified by a respective service model among the services models 356. The service processor 338 accesses the appropriate service model for a service and generates requests for the service in accordance with the protocols and APIs required by the service according to the service model.

For example, if a restaurant has enabled an online reservation service, the restaurant can submit a service model specifying the necessary parameters for making a reservation and the APIs for communicating the values of the necessary parameter to the online reservation service. When requested by the task flow processor 336, the service processor 338 can establish a network connection with the online reservation service using the web address stored in the service model, and send the necessary parameters of the reservation (e.g., time, date, party size) to the online reservation interface in a format according to the API of the online reservation service.

In some embodiments, the natural language processor 332, dialogue processor 334, and task flow processor 336 are used collectively and iteratively to infer and define the user's intent, obtain information to further clarify and refine the user intent, and finally generate a response (i.e., an output to the user, or the completion of a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

More details on the digital assistant can be found in the U.S. Utility application Ser. No. 12/987,982, entitled "Intelligent Automated Assistant", filed Jan. 18, 2010, U.S. Utility application Ser. No. 61/493,201, entitled "Generating and Processing Data Items That Represent Tasks to Perform", filed Jun. 3, 2011, the entire disclosures of which are incorporated herein by reference.

In most scenarios, when the digital assistant receives a user input from a user, the digital assistant attempts to provide an appropriate response to the user input with as little delay as possible. For example, suppose the user requests certain information (e.g., current traffic information) by providing a speech input (e.g., "How does the traffic look right now?"). Right after the digital assistant receives and processes the speech input, the digital assistant optionally provides a speech output (e.g., "Looking up traffic information . . . ") acknowledging receipt of the user request. After the digital assistant obtains the requested information in response to the user request, the digital assistant proceeds to provide the requested information to the user without further delay. For example, in response to the user's traffic information request, the digital assistant may provide a series of one or more discrete speech outputs separated by brief pauses (e.g., "There are 2 accidents on the road. <Pause> One accident is on 101 north bound near Whipple Avenue. <Pause> And a second accident is on 85 north near 280."), immediately after the speech outputs are generated.

For the purpose of this specification, the initial acknowledgement of the user request and the series of one or more discrete speech outputs provided in response to the user request are all considered sub-responses of a complete response to the user request. In other words, the digital assistant initiates an information provision process for the user request upon receipt of the user request, and during the information provision process, the digital assistant prepares and provides each sub-response of the complete response to the user request without requiring further prompts from the user.

Sometimes, additional information or clarification (e.g., route information) is required before the requested information can be obtained. In such scenarios, the digital assistant outputs a question (e.g., "Where are you going?") to the user asking for the additional information or clarification. In some embodiments, the question provided by the digital assistant is considered a complete response to the user request because the digital assistant will not take further actions or provide any additional response to the user request until a new input is received from the user. In some embodiments, once the user provides the additional information or clarification, the digital assistant initiates a new information provision process for a "new" user request established based on the original user request and the additional user input.

In some embodiments, the digital assistant initiates a new information provision process upon receipt of each new user input, and each existing information provision process terminates either (1) when all of the sub-responses of a complete response to the user request have been provided to the user or (2) when the digital assistant provides a request for additional information or clarification to the user regarding a previous user request that started the existing information provision process.

In general, after a user request for information or performance of a task is received by the digital assistant, it is desirable that the digital assistant provides a response (e.g., either an output containing the requested information, an acknowledgement of a requested task, or an output to request a clarification) as promptly as possible. Real-time responsiveness of the digital assistant is one of the key factors in evaluating performance of the digital assistant. In such cases, a response is prepared as quickly as possible, and a default delivery time for the response is a time immediately after the response is prepared.

Sometimes, however, after an initial sub-response provided immediately after receipt of the user input, the digital assistant provides the remaining one or more sub-responses one at a time over an extended period of time. In some embodiments, the information provision process for a user request is stretched out over an extended period of time that is longer than the sum of the time required to provide each sub-response individually. For example, in some embodiments, short pauses (i.e., brief periods of silence) are inserted between an adjacent pair of sub-responses (e.g., a pair of consecutive speech outputs) when they are delivered to the user through an audio-output channel.

In some embodiments, a sub-response is held in abeyance after it is prepared and is delivered only when a predetermined condition has been met. In some embodiments, the predetermined condition is met when a predetermined trigger time has been reached according to a system clock and/or when a predetermined trigger event has occurred. For example, if the user says to the digital assistant "set me a timer for 5 minutes," the digital assistant initiates an information provision process upon receipt of the user request. During the information provision process, the digital assistant provides a first sub-response (e.g., "OK, timer started.") right away, and does not provide a second and final sub-response (e.g., "OK, five minutes are up") until 5 minutes later. In such cases, the default delivery time for the first sub-response is a time immediately after the first sub-response is prepared, and the default delivery time for the second, final sub-response is a time immediately after the occurrence of the trigger event (e.g., the elapse of 5 minutes from the start of the timer). The information provision process is terminated when the digital assistant finishes providing the final sub-response to the user. In various embodiments, the second sub-response is prepared any time (e.g., right after the first sub-response is prepared, or until shortly before the default delivery time for the second sub-response) before the default delivery time for the second sub-response.

As will be described in more details later in this specification, a context-sensitive interruption handler (e.g., the interruption handling module 340 in FIG. 3A) is implemented on top of the default rules for providing responses to the user requests and/or for providing the alert items for reminders and notifications. In some embodiments, the interruption handler gathers information regarding the present context in real-time, and determines in real-time whether the default rules for provision of responses, reminders and/or notifications need to be altered (e.g., because the device is currently receiving speech input for a user, or because additional information has been detected that alters the urgency of a reminder, notification, or other speech output). For example, in some contexts, it would be more suitable to delay (e.g., staying, at least temporary) provision of a non-urgent speech output because a user is speaking into the device, or because the user's context suggests that interruptions should be avoided (e.g., because the user is in a meeting or is asleep) while other times it may be more suitable to provide an urgent speech output immediately (e.g., "barge-in," or interrupt the user). In addition, in some contexts, it is acceptable and in fact, more suitable to forgo providing the speech output altogether.

The context-sensitive interruption handler also selects audio prompts from among several possible audio prompts with which to alert the user to some information (e.g., a notification item). In some embodiments, the particular audio prompt or type of audio prompt that is selected is based on the urgency of the notification and/or the user's context. For example, in some embodiments, a notification item with a low urgency is provided as soon as it is received if the user's context suggests that a barge-in would not be inconvenient. On the other hand, in some embodiments, a notification item with a higher urgency can be delayed if the user's context suggests that a barge-in, even for somewhat important information, would be unwelcome.

Figure 4A:
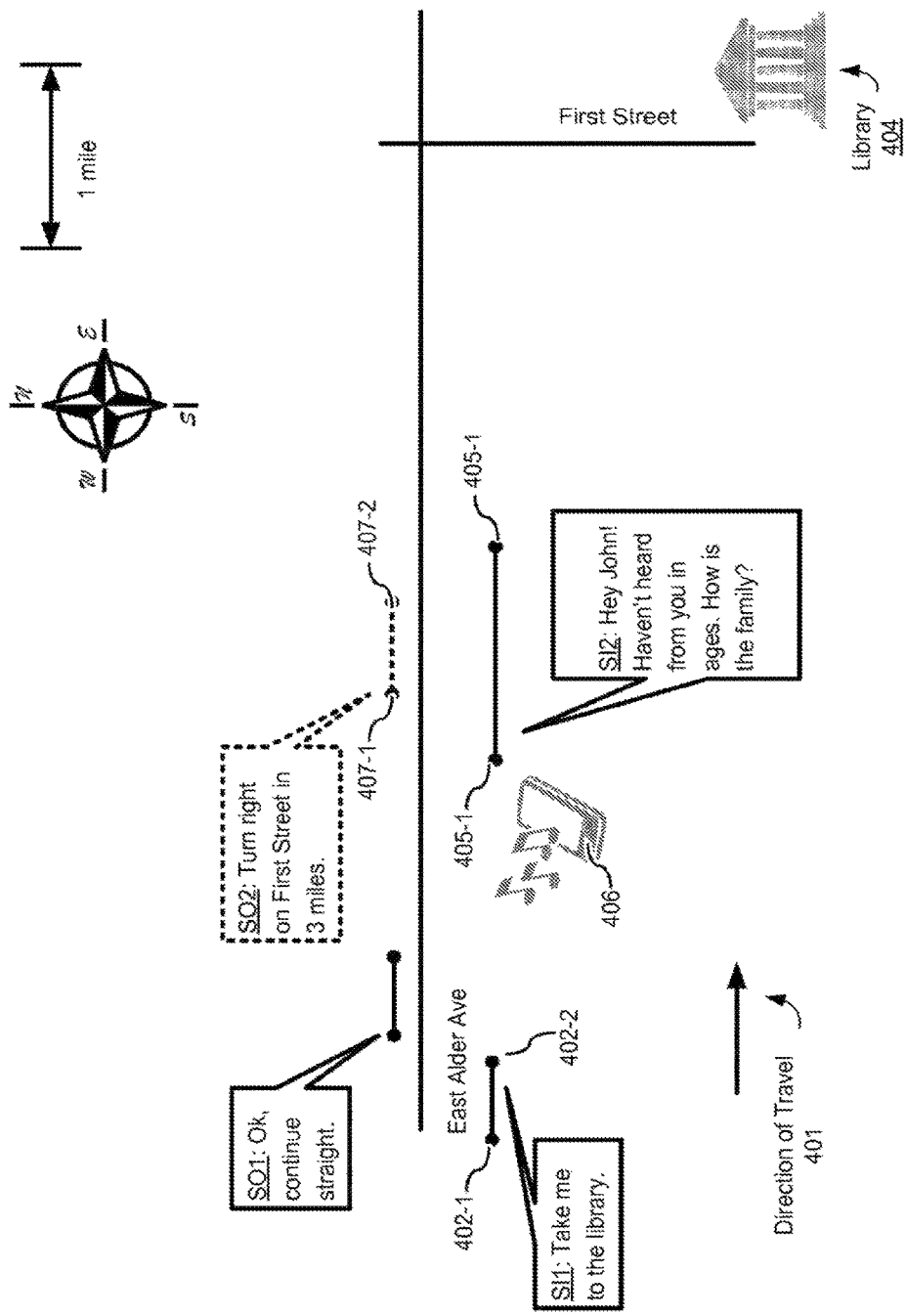
FIGS. 4A-4C illustrate exemplary scenarios in which a digital assistant determines whether or not to provide a speech output in accordance with some embodiments.
Figure 4B:
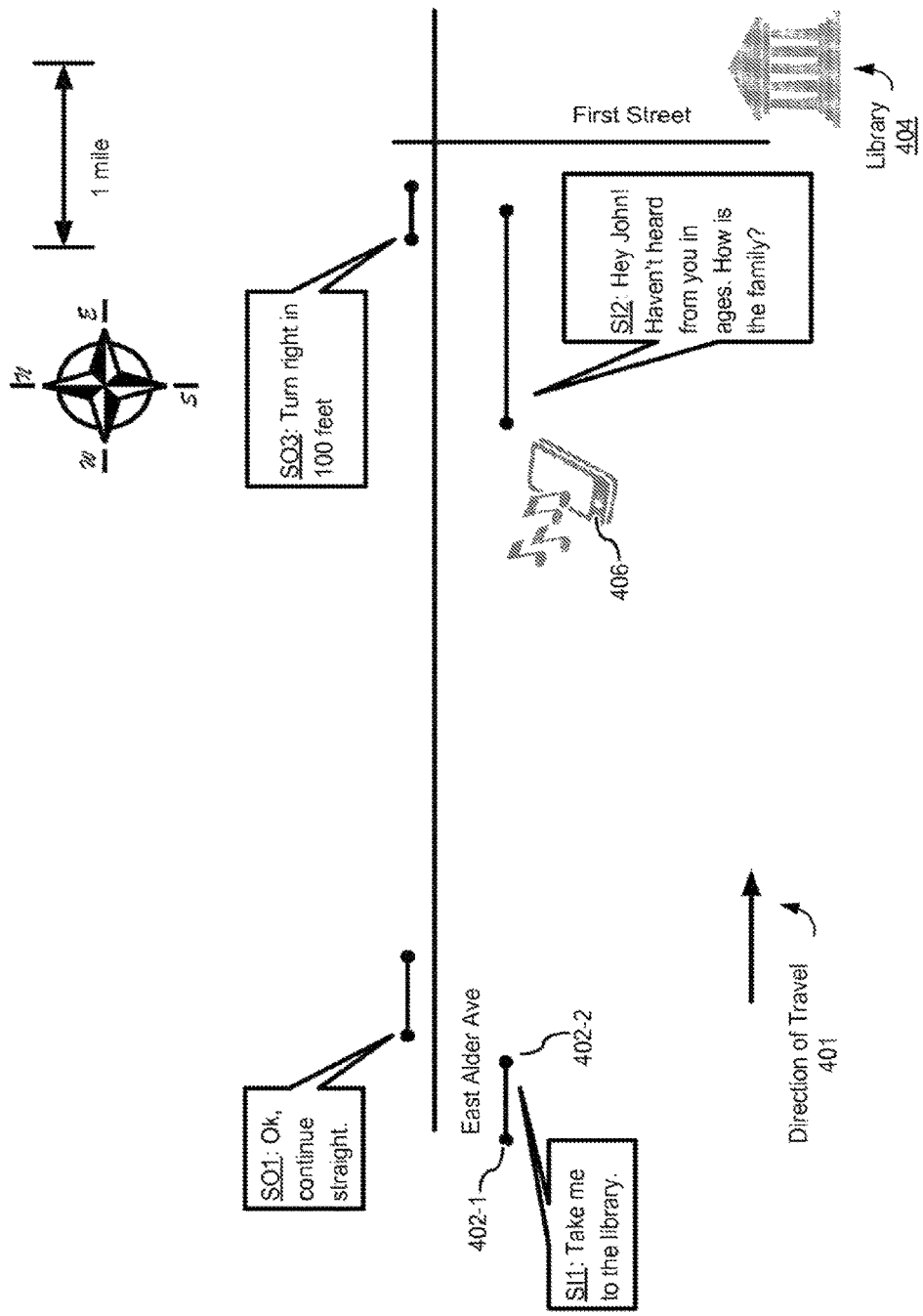
Figure 4C:
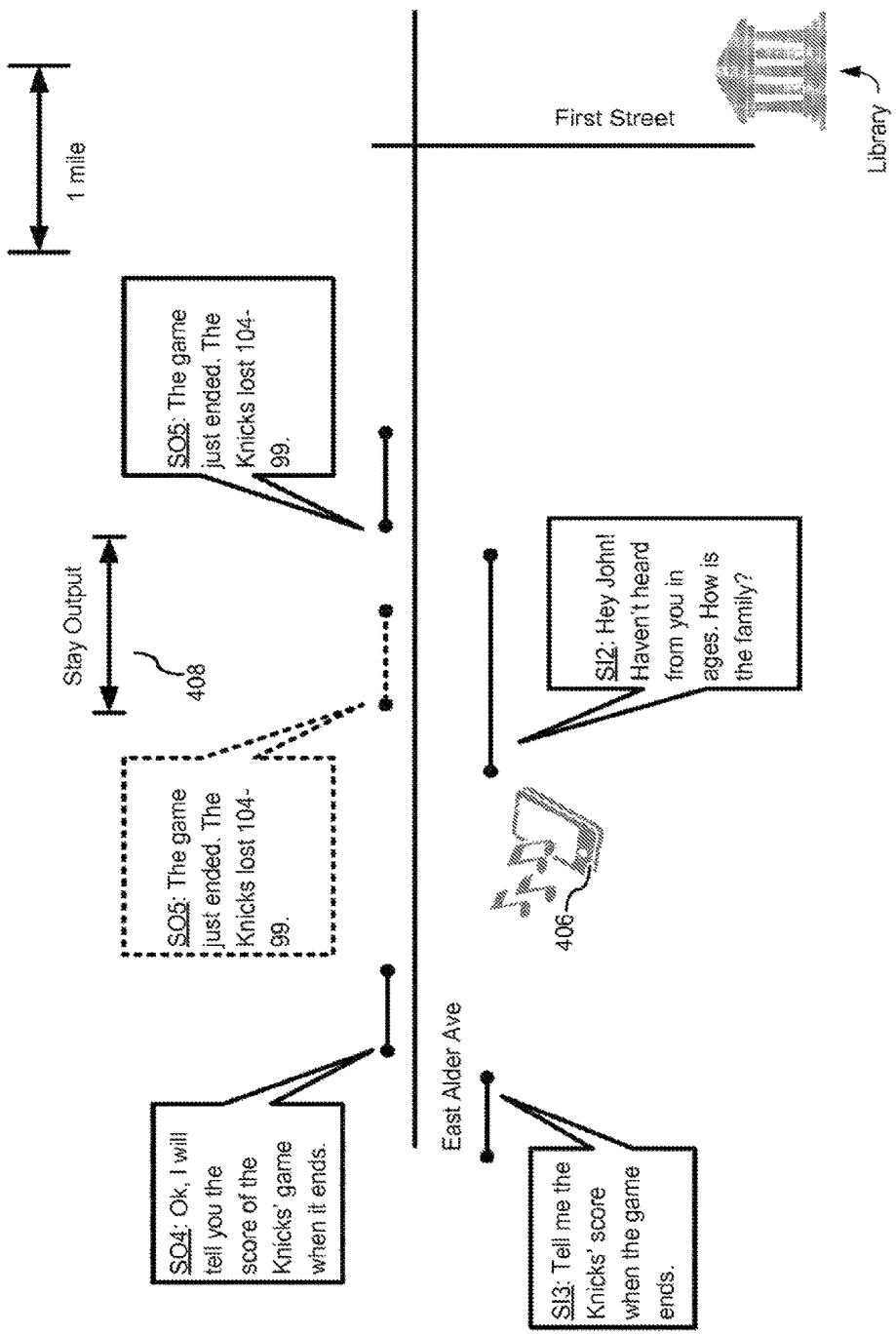
Figure 5A:
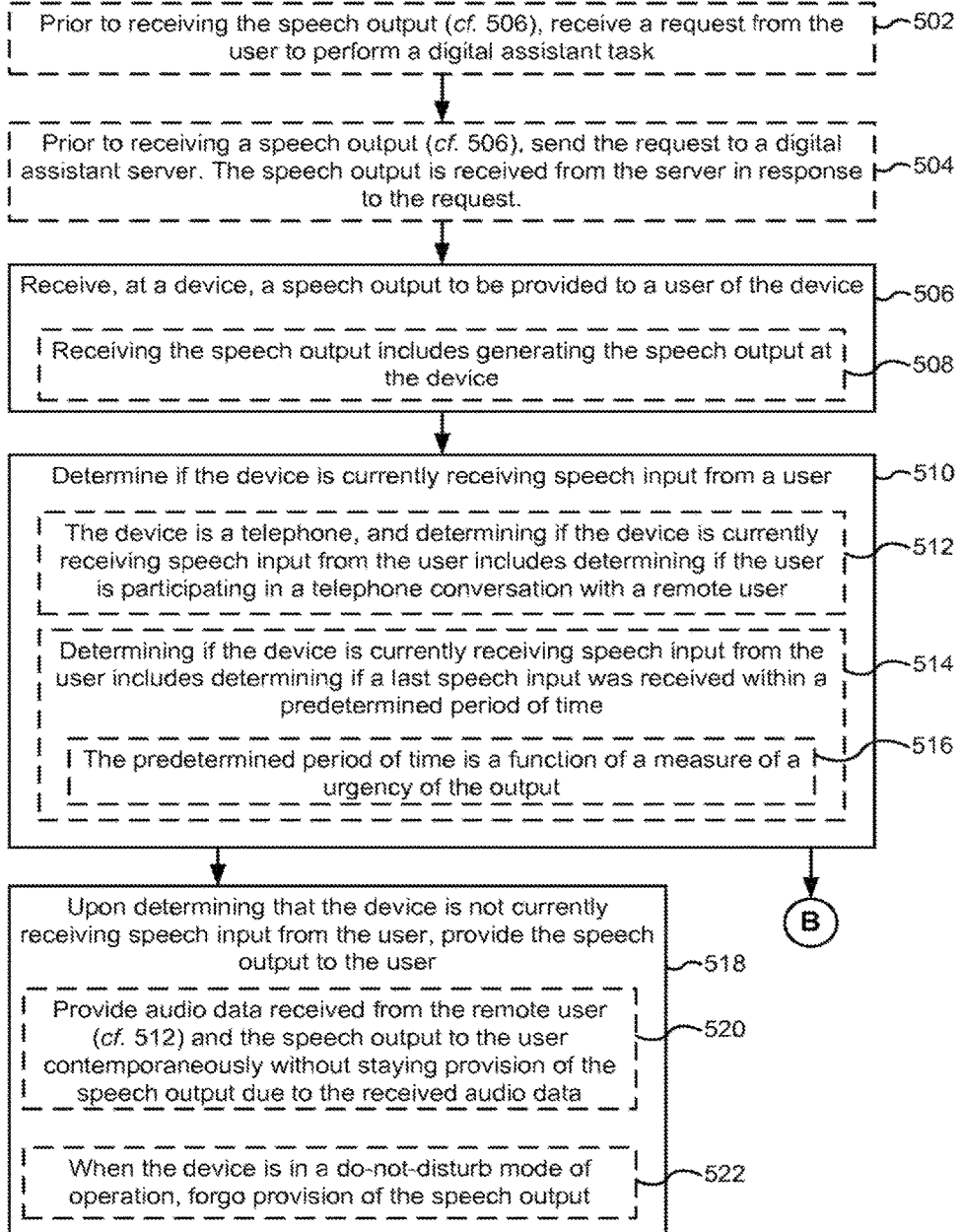
FIGS. 5A-5D are flow diagrams of an exemplary method implemented by a digital assistant for determining whether or not to provide a speech output to a user based on a determination of whether or not the device is currently receiving speech input from the user, as well as the urgency of the speech output, in accordance with some embodiments.
Figure 5B:
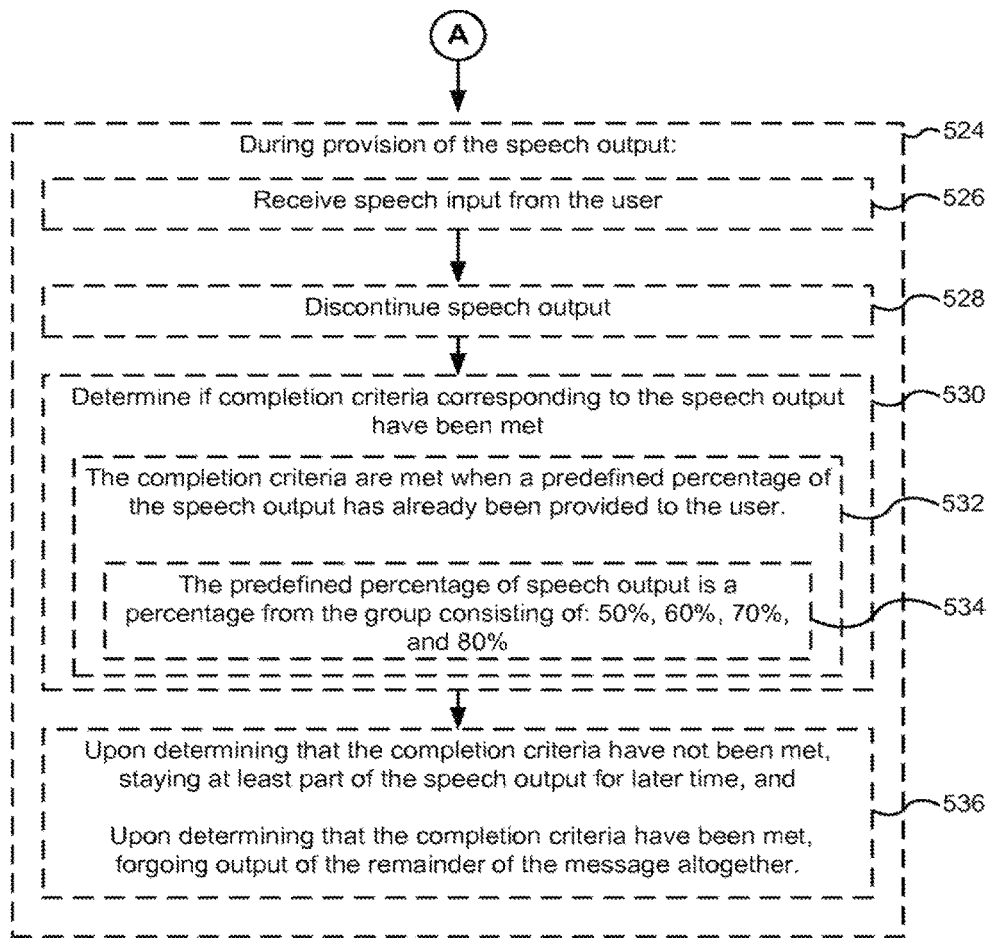
Figure 5C:
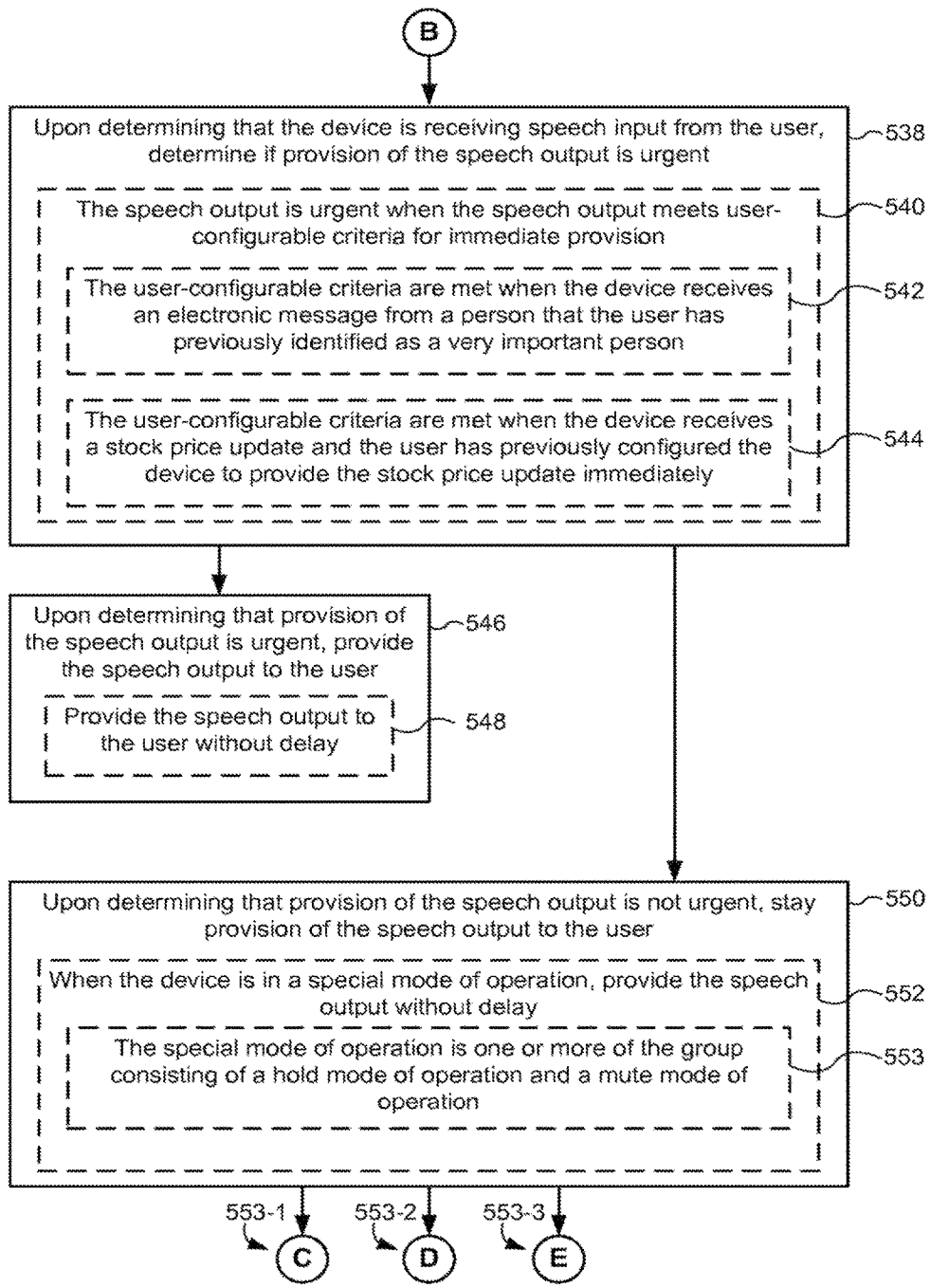
Figure 5D:
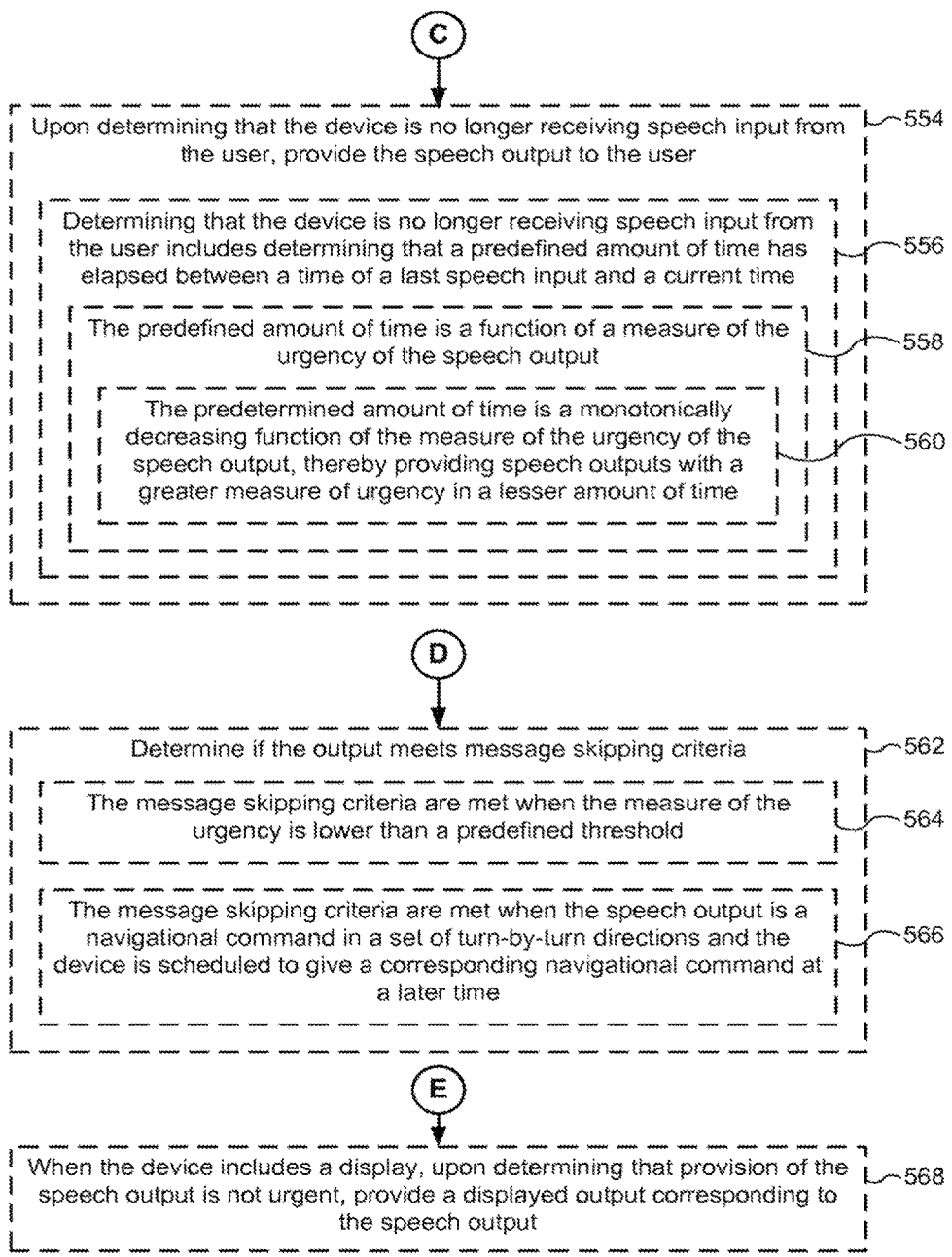

FIGS. 4A-4C illustrate exemplary scenarios in which a digital assistant provides a speech output, or does not provide a speech output, in accordance with some embodiments. In FIGS. 4A-4C, solid boxes corresponding to speech outputs (e.g., SO1 in FIG. 4A) indicate speech outputs that are actually provided by the device. Dashed boxes, on the other hand (e.g., SO2 in FIG. 4A), indicate speech outputs that are not actually provided by the device at the corresponding time and location, but otherwise would be provided by the device if not for . . . the detection of speech input by the user, as explained in greater detail with reference to the individual figures.

FIG. 4A illustrates an exemplary scenario in which a speech output is permanently forgone by the device. At the outset, the user is heading East (401) on East Alder Ave. At a first location designated by 402-1, the user requests that the device provide turn-by-turn directions to a library by stating, "Take me to the library" as a speech input SI1. The location at which the user finishes the speaking is designated by 402-2, which is distinct from 402-1 by virtue of the fact that the user is speaking while moving. Thus, the bars corresponding to respective speech inputs and outputs (e.g., the bar between 402-1 and 402-2 corresponding to SI1) indicate a distance or, equivalently, a length of time that the respective input/output requires to recite (e.g., speak).

The device receives the speech input and performs the necessary operations to, for example, determine the location of the nearest library, as described in greater detail with reference to method 500 and FIGS. 5A-5D. In this example, the device determines that library 404 is the nearest library and responds promptly with a speech output SO1 ("Ok, Continue Straight")

At a location designated by 405-1, a phone feature included on the same device as the digital assistant receives an incoming call, as indicated by ring-tone icon 406. The user answers the phone by providing speech input SI2, stating, "Hey John! Haven't heard from you in ages. How is the family?" At the completion of speech input SI2, the user is at a location designated by 405-2. However, in the interim between 405-1 and 405-2, the device receives (e.g., from a server or a different module on the same device) a speech output SO2 indicating, "Turn right on First Street in 3 miles." In this example, speech output SO2 has a low measure of urgency, because the device is scheduled to warn the user of the upcoming turn one or more additional times before the user reaches First Street (e.g., additional warning such as, "Turn Right in 1 mile," and/or, "Turn right now onto First Street"). Because the device was receiving speech input SI2 when speech output SO2 was to be outputted (407-1 until 407-2), the device stays output of speech output SO2. Furthermore, because of the very low priority associated with speech output SO2 (e.g., due to the redundancy associated with the turn-by-turn direction in this example), the stay actually forgoes output of speech output SO2 altogether (e.g., never outputs a command to turn left in three miles, relying instead on the 1 mile and immediate warnings).

FIG. 4B illustrates an exemplary scenario in which a speech output is immediately provided to a user, in accordance with some embodiments. Like reference numerals shared between FIGS. 4A and 4B refer to analogous aspects of the respective scenarios. Thus, for brevity, those analogous aspects are not repeated here.

FIG. 4B differs from FIG. 4A in that the phone receives an incoming call, as indicated by the ring-tone icon 406, at a much closer proximity to First Street than in FIG. 4A. While the user is answering the phone via speech input SI2, the device receives a speech output SO3 corresponding to a turn-by-turn direction command indicating that the user should turn right very soon (e.g., in this example, 100 feet). Because of the urgency of the message, the device "barges-in" (e.g., interrupts the user while the user is speaking) to output, "Turn right in 100 feet."

FIG. 4C illustrates an exemplary scenario in which a speech output is temporarily stayed, and then later provided to a user, in accordance with some embodiments. Like reference numerals shared between FIGS. 4A and 4C refer to analogous aspects of the respective scenarios. Thus, for brevity, those analogous aspects are not repeated here.

During a speech input SI3, the user requests that the device inform the user of the Knicks' score whenever the game should end, stating, "Tell me the Knicks' score when the game ends." The device responds promptly acknowledging the request, stating, "Ok, I will tell you the score of the Knicks' game when it ends." As explained previously, the phone receives an incoming call, which the user answers in speech input SI2 by stating, "Hey John! Haven't heard from you in ages. How is the family?" During SI2, the Knicks' game ends the device receives a speech output SO5 indicating the score, as requested, to be provided to the user. In this example, speech output SO5 is not considered urgent because the Knicks' score will not change in the time that the user is speaking (e.g., during the time that the device is receiving speech input). For this reason, the device stays speech output SO5, as indicated by arrow 408, until the user has finished speaking, and then outputs speech output SO5. However, in some embodiments, the device response to the user request in a non-audible fashion, such as by displaying the Knicks' score on a display of the device. In some embodiments, because a displayed response will not interrupt the user's speech, such a response is provided without delay. In some embodiments, such a displayed response is provided in conjunction with, or alternatively, in lieu of, a stayed speech output (e.g., when the displayed response is in lieu of a speech output, the speech output is forgone altogether).

Devices on which digital assistants are provided (or through which users interact with digital assistants) are frequently used to provide notifications of various kinds to a user. For example, a device (e.g., user device 104) can receive emails, telephone calls, voicemails, text messages, and other electronic communications, and provide notifications to the user that such communications have been received. For example, the device may provide an audible output (e.g., ringtone, beep, etc.) and/or a visual output to alert the user that a communication has been received. In addition, the device can provide notifications from many other sources, such as application notifications (e.g., messages from applications installed on the device, including social networking applications, utilities, games, etc.), task list notifications (e.g., reminders related to items that a user placed on a task or reminder list), calendar notifications (e.g., alerts or reminders related to calendar items and/or appointments), and the like. In some cases, these notifications are provided to the user when they are received and/or when an associated reminder or alert time is reached. If a user does not wish to be bothered, they can simply turn off all notifications, such as by putting the device in a "silent" mode. Or, users can create rules that allow the device to provide some types of notifications but not others. For example, a user could manually set a rule that notifications should only be provided for communications from a certain person or people.

In some embodiments, a digital assistant (e.g., the digital assistant system 300) manages a list of notification items for a user, and intelligently determines whether and how to interrupt a user to provide notifications. Thus, the digital assistant can prevent a user from being unnecessarily bothered by notifications with low urgency, while also ensuring that high-urgency notifications are provided to the user even if it is at a somewhat inconvenient time. As a specific example, if a user is in an important work meeting, the digital assistant determines that a notification is of low urgency (e.g., a notification from a banking application indicating that a session has timed out), and delays or foregoes providing an audio prompt to the user for that notification item. If the user is simply watching TV, though, the digital assistant provides the audio prompt because the user's context suggests that interruptions or barge-ins will not be a nuisance. However, if an important communication is received (e.g., a text message or voicemail regarding a family emergency), the digital assistant determines that, even though the user is in an important meeting, the urgency of the communication warrants an interruption.

Moreover, as discussed below with reference to FIG. 6, the digital assistant can escalate its notifications based on the user's context and the urgency of the particular notification. For example, when a notification item is deemed urgent enough to warrant an interruption, the device provides a first audio prompt to alert the user. If the user does not acknowledge the prompt, the device outputs a second audio prompt. If the user does not acknowledge the second audio prompt, the device outputs a third audio prompt. In some embodiments, the audio prompts are of different types, and increase in distinctiveness and/or intensity as they are provided. For example, the first audio prompt may be a single beep or ringtone, the second may be a repetitive beep or ringtone (or a louder beep or ringtone, or simply a different ringtone), and the third may be a speech output (e.g., the assistant speaking "1 am sorry to interrupt you, but this is very important."). Additional details and embodiments related to a digital assistant managing a list of notifications are provided below with respect to FIG. 6.

Notification lists are not static, though, because new notifications are constantly arriving, and new information that affects the urgency value of already existing notification items is frequently detected or detectable. A human assistant would take this information into account when determining how and whether to interrupt a user to provide a notification. Thus, in some embodiments, the digital assistant disclosed herein adjusts the urgency values of notifications based on changing conditions related to the user and/or the notification. Accordingly, the digital assistant does more than just react to a static set of rules established by a user (e.g., a rule to only alert for mails marked as "high importance"), and actually adjusts urgency values based on unanticipated and/or spontaneous occurrences. As a specific example, if a user is in a work meeting when the digital assistant detects an email requesting that the user take some action (e.g., "please send me the latest sales figures"), the digital assistant determines that this message is not urgent enough to warrant an interruption during this busy time period. However, if the digital assistant detects a follow up email that changes a deadline or otherwise increases the urgency of the previous message (e.g., "I need those figures within the next 5 minutes or we will lose the sale."), the digital assistant adjusts the urgency value of the notification associated with the original message (and/or combines the two messages into one notification item with a heightened urgency value). If the new urgency value is high enough to warrant an interruption, the digital assistant will alert the user about the emails. Thus, the user is alerted to important messages that otherwise would not have passed a simple rule based "do-not-disturb" filter (and certainly would not have been provided if the device were in a silent mode). As described in greater detail below, many different circumstances cause the digital assistant to adjust the urgency of a notification item, such as received communications (e.g., follow up emails and telephone calls), changes in traffic conditions, changes in weather conditions, changes in the context of the device, and the like.

FIGS. 5A-5D are flow diagrams of an exemplary method 500 implemented by a digital assistant for determining whether or not to provide a speech output to a user based on a determination or whether or not the device is currently receiving speech input from a user, as well as the urgency of the speech output. In some embodiments, the determination of whether or not to provide the speech output is performed dynamically by an interruption handler (e.g., the interruption handler 340 in FIG. 3A) of the digital assistant in real-time based on the present-context.

In some embodiments, prior to receiving the speech output (cf. 506), the device receives (502) a request from the user to perform a digital assistant task. For example, the user requests that the digital assistant find a cheap nearby restaurant by stating as a speech input, for example, "Find me something for dinner, not too expensive." Alternatively, the user requests that the digital assistant make a reservation at a particular restaurant, for example, by stating as a speech input, "Make me a reservation at Boulevard for four," Alternatively, the user asks for turn-by-turn directions to a local landmark ("Directions to the Golden Gate Bridge"), or ask for a baseball score ("How did the Sox do?"), or a stock price ("How did Apple's stock do today?").

In some embodiments, prior to receiving a speech output (cf. 506), the device sends (504) the request to a digital assistant server. The speech output is received from the server in response to the request. In some embodiments, prior to sending the request to the server, the device performs a speech-to-text operation (e.g., with STT Processing Module 330). In some embodiments, speech-to-text is performed at the server. In some embodiments, the device performs the natural language processing (e.g., with Natural Language Processing Module 322) including performing the ontology, vocabulary analysis and context matching using user data (for example, to disambiguate which "Sox" team the user is interested in, based on preferences such as favorites, browser history and/or digital assistant request history). The server then performs any remaining operations necessary to service the request (e.g., identifies one or more actionable items, one or more missing properties from the actionable properties, searches one or more database and/or the Internet for missing information, etc.) In some embodiments, the server prepares a response (e.g., a text string) and returns the response to the user. In some embodiments, the server prepares a speech response (e.g., audio data) and transmits the speech response to the digital assistant.

In any event, the device receives (506) a speech output to be provided to a user of the device. In some embodiments, the speech output is received from the server in response to the request (e.g., the speech output is an appropriate response to the request made by the user, be it a request for a dinner reservation or turn-by-turn directions). In some embodiments, receiving the speech output includes (508) generating the speech output at the device (e.g., for example, the server returns a text string in response to the request and the device generates the speech output from the text string using a text-to-speech engine). It should be understood that, in some embodiments, receiving a speech output means receiving from a server (which optionally includes additional processing operations such as text-to-speech operations). Alternatively, or in addition, receiving a speech output means receiving at a first device component (e.g., a module such as interruption handling module 340 or a processor 304 executing instructions held in a module such as interruption handling module 340) from a second device component (e.g., a module such as natural language processing module 332 or a processor 304 executing instructions held in a module such as natural language processing module 332).

The device determines (510) if the device is currently receiving speech input from a user. For example, in some embodiments, the device is (512) a telephone, and determining if the device is currently receiving speech input from the user includes determining if the user is participating in a telephone conversation with a remote user. In such embodiments, the device determines that it is currently receiving speech input from the user if the user is currently speaking in the conversation. In some embodiments, when a party on the other end of the telephone conversation is speaking, or if there is silence while the user and the other party go about doing other things, the device determines that it is not currently receiving speech input (e.g., in some embodiments, an active telephone conversation is sufficient for a determination that the device is receiving speech input, while in alternative embodiments, the device determines that speech input is being received when the user is actually the one speaking in the conversation).

In some embodiments, determining if the device is currently receiving speech input from the user includes (514) determining if a last speech input was received within a predetermined period of time. For example, because there are natural pauses in the ebb-and-flow of conversation (e.g., pauses to catch one's breath, pauses to consider what to say next), in some embodiments, the devices waits a predetermined amount of time before concluding that the user is not speaking, rather than detecting speech input in an instantaneous or nearly instantaneous fashion. In some embodiments, the predetermined period of time is (516) a function of a measure of a urgency of the output. For example, when the device has an urgent message ("Turn right NOW!") in an output queue, the device will wait a shorter amount of time before determining that the user is not speaking, thus barging-in the moment the user pauses to catch his or her breath or consider what to say next). In some embodiments, determining if the device is currently receiving speech input includes a squelch determination (e.g., based on a particular strength or directionality threshold at a device microphone) to disambiguate, for example, background noise and/or speech made by the user but not intended as speech input (e.g., during a telephone conversation, when the user pauses the conversation to talk to another party in-person).

Upon determining that the device is not currently receiving speech input from the user, the device provides (518) the speech output to the user. In some embodiments, the device provides (520) audio data received from the remote user (cf. 512, when the user is participating in a telephone) and the speech output to the user contemporaneously without staying provision of the speech output due to the received audio data. For example, in such embodiments, when the remote user (i.e., the other party) is talking during a telephone conversation, the device will nevertheless provide speech output from the digital assistant. In some embodiments, providing audio data (e.g., speech) received from the remote user and the speech output to the user contemporaneously means muting the audio data from the remote user temporarily while the speech output is provided. For example, in such embodiments, when the remote user says, "Four score and seven years ago our fathers brought forth on this continent a new nation, conceived in liberty, and dedicated to the proposition that all men are created equal" and the speech output in an output queue is, "Turn left," the audio actually provided to the user will be, "Four score and seven years ago our fathers brought forth on this continent a . . . 'Turn Left' . . . , conceived in liberty, and dedicated to the proposition that all men are created equal." The user will thus be aware that the remote user is reciting Lincoln's Gettysburg address, and will also understand the instructions to turn left. In some embodiments, the audio data received from the remote user and the speech output are provided using different vocal accents and/or volumes to disambiguate the remote user from the digital assistant.

In some circumstances, the user will have configured the device to override provision of the speech output. For example, when the device is in a do-not-disturb mode of operation, provision of the speech output is forgone (522). In some embodiments, the device is in a do-not-disturb mode of operation when the user has configured the device to be in a do-not-disturb mode of operation. In some embodiments, the device is in a do-not-disturb mode of operation when the user has configured a device to operation in a mode distinct from do-not-disturb, but nevertheless includes do-not-disturb as a feature (e.g., the device is in an airplane mode, or a quiet mode, or the user has configured the device to be in a quiet mode during particular hours of the day, etc.).

In some embodiments, during provision (524) of the speech output, the device receives (526) speech input from the user. For example, the device is in the midst of providing a speech output when the user interrupts by talking as part of a telephone conversation or speaking another request for a digital assistant operation. As an example of the latter scenario, when a user has previously requested that the device locate a nearby Chinese restaurant, the user may interrupt the response to indicate that he or she also needs to send an SMS message to a coworker. In such embodiments, the device will discontinue (528) speech output. In such embodiments, the device will determine (530) if completion criteria corresponding to the speech output have been met. In some embodiments, the completion criteria are met (532) when a predefined percentage of the speech output has already been provided to the user. For example, in some embodiments, the predefined percentage of speech output is (534) a percentage from the group consisting of: 50%, 60%, 70%, and 80%. Upon determining that the completion criteria have not been met, the device stays (536) at least part of the speech output for later time, and upon determining that the completion criteria have been met, the device forgoes output of the remainder of the speech output altogether. In some embodiments, the completion criteria are met when the device determines that the remainder of the message is moot (e.g., after requesting Chinese food, and during a recitation by the device of a list of local Chinese restaurants, the user declares, "Never mind, I want That food.")

Upon determining that the device is receiving speech input from the user, the device determines (538) if provision of the speech output is urgent. In some embodiments, the speech output is urgent (540) when the speech output meets user-configurable criteria for immediate provision. For example, in some embodiments, the user-configurable criteria are met (542) when the device receives an electronic message from a person that the user has previously identified as a very important person (VIP). Alternatively or in addition, in some embodiments, the user-configurable criteria are met (544) when the device receives a stock price update and the user has previously configured the device to provide the stock price update immediately (for example, the user has configured the device to alert him or her when a particular stock price exceeds a particular value, so that the user can consider selling the stock as fast as possible). In some embodiments, a determination is made as to whether or not provision of the speech input is urgent based on context. For example, when the speech output includes directions to turn in the near future ("Turn left NOW!") the device recognizes that the message is urgent. Upon determining that provision of the speech output is urgent, the device provides (546) the speech output to the user (e.g., the device "barges-in" and provides the speech output despite receiving speech input from the user). In some embodiments, the device provides (548) the speech output to the user without delay (e.g., additional delay added on account of the fact that the user is speaking, on top of any required processing time needed to produce the output).

Upon determining that provision of the speech output is not urgent, the device stays (550) provision of the speech output to the user. As explained in greater detail below, in some circumstances staying provision of the speech output means delaying provision of the speech output until a later time, and then providing the speech output, while in other circumstances staying means forgoing provision of the speech output altogether and never providing that particular speech output. In some circumstances, whether staying means temporarily delaying provision of the speech output or permanently forgoing provision of the speech output depends on the particular embodiment, implementation and the context surrounding the speech output (cf. 562). In some embodiments, when the device is in a special mode of operation, the device provides (552) the speech output without delay (e.g., even if the device is currently receiving speech input from the user). For example, in some embodiments the device includes an "Interrupt Me" mode of operation whereby the user is to be interrupted by the digital assistant (e.g., the digital assistant is to barge-in) regardless of whether the device is receiving speech input. In some embodiments, the special mode of operation is (553) one or more of the group consisting of a hold mode of operation and a mute mode of operation.

Flow paths 553-1, 553-2, and 553-3 represent additional operation that are optionally performed upon determining that provision of the speech output is not urgent, in accordance with some embodiments of method 500. It should be understood that the various operations described with respect to flow paths 553 are not necessarily mutually exclusive and, in some circumstances, combined.

For example, according to some embodiments, upon determining that the device is no longer receiving speech input from the user, the device provides (554) the speech output to the user. In some embodiments, determining that the device is no longer receiving speech input from the user includes (556) determining that a predefined amount of time has elapsed between a time of a last speech input and a current time. In some embodiments, the predefined amount of time is a function of a measure of the urgency of the speech output. In some embodiments, the predetermined amount of time is (560) a monotonically decreasing function of the measure of the urgency of the speech output, thereby providing speech outputs with a greater measure of urgency in a lesser amount of time. For example, in these embodiments, the device waits a shorter amount of time before providing an urgent speech output after the user has finished speaking than if the speech output was less urgent.

In some embodiments, the device determines (562) if the output meets message skipping criteria. In some embodiments, the message skipping criteria are met (564) when the measure of the urgency is lower than a predefined threshold. For example, when the speech output is one of several warnings in a sequence of warnings, in some circumstances it is unnecessary to provide the user with each warning in the sequence of warnings. In some embodiments, the message skipping criteria are met (566) when the speech output is a navigational command in a set of turn-by-turn directions and the device is scheduled to give a corresponding navigational command at a later time. For example, the device is scheduled to provide navigation commands at 2 miles, 1 miles, ½ a mile and moments before a turn. In such circumstances, when the user is providing speech input when the 1 mile command would otherwise be recited, the device forgoes provision of the 1 mile command altogether. The driver will correspondingly still be notified of the turn by the ½ mile command as well as moments before the turn.

In some embodiments, when the device includes a display, upon determining that provision of the speech output is not urgent, the device provides (568) a displayed output corresponding to the speech output.

Figure 6:
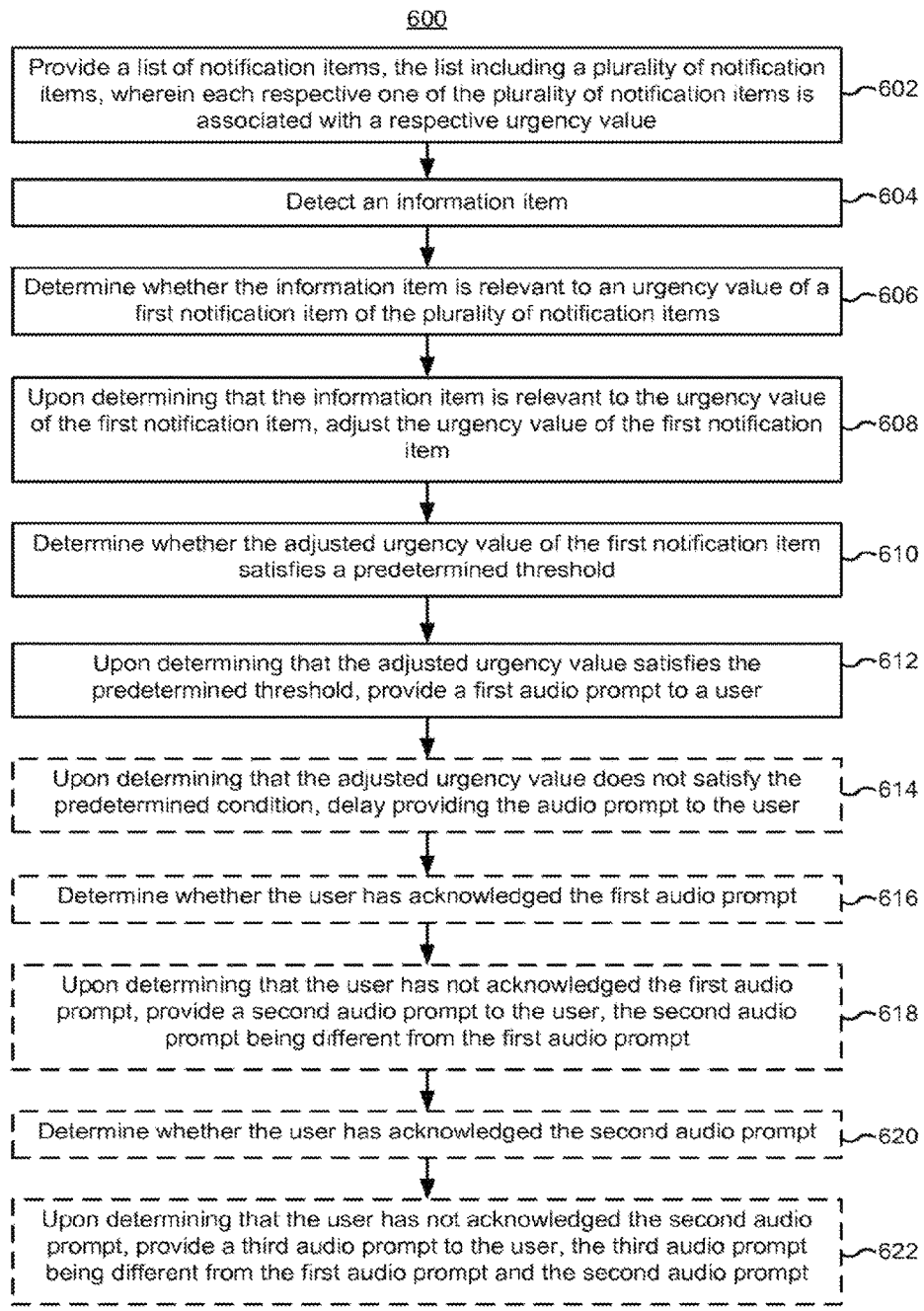
FIG. 6 is a flow diagram of an exemplary method implemented by a digital assistant for managing a notification list, in accordance with some embodiments.

FIG. 6 is a flow diagram of an exemplary method 600 implemented by a digital assistant for managing a list of notification items and providing audio prompts for notification items. In some embodiments, the method is performed at one or more devices having one or more processors and memory (e.g., the device 104 and/or components of the digital assistant system 300, including, for example, server system 108). In some embodiments, the determination of whether or not to provide an audio prompt for a notification item is performed dynamically by an interruption handler (e.g., the interruption handler 340 in FIG. 3A) based on the present context of the device and/or the user. While the following steps may be understood as being performed by a device (e.g., one device), the method is not limited to this particular embodiment. For example, in some embodiments, the steps may be performed by different devices, including several devices working together to perform a single step, several devices each individually performing one or more steps, etc.

A list of notification items is provided (602). Notification items are items that are configured to cause a notification to be provided to a user. For example, notification items may be associated with and/or triggered by communications (e.g., received emails, text messages, voicemail messages, etc.), calendar alerts (e.g., reminders associated with appointments or other entries in a calendar application or service), reminder alerts (e.g., reminders or task items associated with a task list or reminder list), application alerts, and the like. Application alerts are alerts that are issued by an application installed on the electronic device, and may contain any information. For example, an application alert may include a notification of an action taken by the application (e.g., notifying the user that an online banking session will be terminated for security purposes), or a notification from a service associated with the application (e.g., notifying the user of activity in a social network to which the application provides access). For example, notification items correspond to items that are displayed in the "Notification Center" in APPLE, INC.'s IOS.

The list of notification items includes a plurality of notification items, wherein each respective one of the plurality of notification items is associated with a respective urgency value. Urgency values are assigned to notification items by the digital assistant. In some embodiments, urgency values are not assigned by a user. In some embodiments, urgency values are not determined based on user-defined notification rules. For example, in some embodiments, urgency values are not based on a user's request to allow or deny notifications from certain people, domains, applications, etc. In some embodiments, however, urgency values take user-defined notification rules into account when assigning urgency values, though the rules can be overridden or ignored by the digital assistant as appropriate.

Urgency values may be based on various different factors, as discussed below. Urgency values may be any metric, such as a numerical range between 0 and 10, where a higher value corresponds to a more urgent notification. Urgency values may also be "high urgency," "medium urgency," and "low urgency." Any other appropriate value or metric may be used as well.

In some embodiments, urgency values are based on one or more of: a time associated with the respective notification item; a location associated with the respective notification item; and content of the respective notification item. In some implementations, the urgency values are based on a combination of these components, such as a weighted average of the urgency impact of each component. In some implementations, the urgency values are based on one or a subset of these components.

In some embodiments, the urgency values for notification items associated with a certain time, such as calendar entries and time-based reminders, account for the temporal proximity of the notification. Thus, the time component of the urgency value is higher if the notification relates to an event or reminder that is close in time (e.g., relative to other events or reminders), and lower if the notification relates to an event or reminder that is further away in time (e.g., relative to other events or reminders).

In some embodiments, the urgency values for notification items associated with locations, such as calendar entries that specify a location, account for how far away the user currently is from that location. Thus, in some embodiments, the location component of the urgency value is higher if the notification relates to an appointment requiring a longer travel time (e.g., relative to other appointments), and lower if the notification relates to an event or reminder that requires a shorter travel time (e.g., relative to other appointments).

In some embodiments, urgency values are automatically determined based on the semantic content of the notification. For example, the digital assistant determines the meaning of each notification (e.g., with the natural language processing module 322) and assigns an urgency value based on the determined meaning. For example, the digital assistant can determine whether the content of a notification item (e.g., the body of an email or text message, or the textual content of an application notification) relates to one of a known set of meanings. For example, in some embodiments, the digital assistant can determine whether a notification item likely relates to a medical emergency, a work emergency, a family emergency, a routine application notification, a calendar item, a reminder or task list item, and the like. In some embodiments, known meanings and/or classes of meanings are associated with urgency values and/or ranges of urgency values, and the digital assistant assigns an urgency value to a notification item in accordance with its determined meaning and/or class of meaning.

In some embodiments, determining urgency values includes determining a topic of importance to a user of the device, and assigning at least one of the respective urgency values to a respective notification item based on a determination that the respective notification item corresponds to the topic of importance. For example, in some embodiments, the digital assistant determines a topic of importance to the user based on any of the following: historical data associated with the user (e.g., by determining that the user typically responds to communications about a certain topic quickly), an amount of notification items in the list of notification items that relate to that topic (e.g., by determining that the number of notification items relating to that topic satisfies a predetermined threshold, such as 2, 3, 5, or more notification items), a user-specified topic (e.g., the user requests to be alerted to any notifications relating to a particular topic), and the like. In some embodiments, the topic of importance is determined by the device automatically without human intervention, such as by determining a topic of importance based on historical data associated with the user, as described noted above.

In some embodiments, urgency values are further based on urgency values that were previously assigned by the digital assistant to similar notifications, embedded flags or importance indicators associated with a notification (e.g., an email sent with "high importance"), keywords in the notification (e.g., "boss," "urgent," "emergency," "hospital," "died," "birth," "now," "where are you," etc.), the application or type of application that issued the notification (e.g., applications that are less likely to provide important notifications, such as games, are typically less important than those from applications that allow human-to-human communications), senders and recipients of communications, user history relating to similar notifications (e.g., whether the user has a history of quickly looking at and/or acting on similar notifications, or whether they are frequently ignored and/or dismissed, or how quickly the user tends to respond to communications from a certain person), and the like.

Returning to FIG. 6, an information item is detected (604). In some embodiments, the information item is a communication (e.g., an email, a voicemail, a text message, etc.). In some embodiments, the information item is an application notification. In some embodiments, the information item corresponds to a change in context of the device, such as an indication that the device is in a vehicle. For example, the digital assistant can determine that it is in a vehicle by detecting certain motions, speeds, and/or locations of the device with a GPS receiver or accelerometer, or by detecting that the device has been communicatively coupled to a vehicle, for example, via BLUETOOTH or a docking station. Another example of an information item corresponding to change in context is an indication that the device has changed location (e.g., an indication that the user has arrived at a workplace, or at home, etc.). In some embodiments, two information items are detected, including at least a communication (e.g., an email, voicemail, or text message) and a change in context of the device (e.g., detecting that the device has changed location).

The digital assistant determines whether the information item is relevant to an urgency value of a first notification item of the plurality of notification items (606). In some embodiments, where two information items are received, the digital assistant determines whether the combination of the two information items are relevant to a first notification item of the plurality of notification items.

For example, in some embodiments, the digital assistant determines whether an incoming communication (e.g., the information item) relates to any of the notification items in the list of notification items. For example, an incoming communication relates to a notification in the list of notification items if they have the same or similar subject matter, are from the same sender, have the same or similar semantic classification (as determined by a natural language processing module, as described above), have one or more common words and/or keywords, etc. As a specific example, a transcribed voicemail from a particular sender may refer to a recent email that is included in the notification list (e.g., "I just forwarded you an email from Josh—please call me as soon as you get it."). The digital assistant then determines from information associated with the transcribed voicemail that the voicemail relates to a particular email (e.g., based on the fact that they were both sent by the same person, they both refer to a forwarded email from "Josh," etc.)

In some embodiments, the digital assistant determines whether a change in context of the device relates to any of the notification items in the list of notification items. For example, the digital assistant determines whether a change in the location of the device affects the travel time necessary to get to an upcoming appointment. In some embodiments, the digital assistant determines whether an application notification relates to any of the notification items in the list of notification items. For example, the digital assistant can determine that a notification from a reminder or task list application has the same or similar content as an existing notification relating to a calendar entry. Specifically, the digital assistant can determine that a reminder to "pick up a birthday present for Judy" relates to a notification of a calendar entry of "Judy's Birthday."

In some embodiments, once the digital assistant determines that the information item relates to a first notification item of the plurality of notification items, the digital assistant determines whether the information item is relevant to the urgency of that notification item (cf. 606). For example, the digital assistant determines whether the information item affects any of the following: a time associated with the notification item (e.g., the information item changes an appointment to an earlier or later time, the information item indicates a flight or other travel delay), a location associated with the notification item (e.g., changes the location of an appointment), a travel time to an appointment (e.g., because the user is now further away from a location of an upcoming appointment, or because traffic conditions have changed), an importance of the notification item (e.g., because multiple communications relating to a particular topic have been detected, or because the semantic content of the information item indicates an escalation of importance of the notification item), and the like.

Upon determining that the information item is relevant to the urgency value of the first notification item, the digital assistant adjusts the urgency value of the first notification item (608). In some embodiments, urgency values are adjusted to be more urgent or less urgent depending on how the detected information item affects the first notification item. In some implementations, the digital assistant incorporates the information item in the first notification item, such as by changing a due date, appointment time, location, etc., of the first notification item. For example, in some implementations, if a notification item relates to a calendar entry associated with a particular time, and the information item is an email indicating that the calendar entry has been rescheduled, the digital assistant will update the notification item to show that the time has been changed. In some implementations, the digital assistant generates a new notification item including information from both the first notification item and the information item and assigns to it an urgency value based on both of them. For example, in some implementations, the digital assistant will create a notification item that relates to multiple communications, such as an original email (e.g., the first notification item) and a follow up voicemail (e.g., the information item). In some implementations, the new notification item has a different urgency value than its constituent notification items and/or information items.

The digital assistant determines whether the adjusted urgency value of the first notification item satisfies a predetermined threshold (610). In some embodiments, the threshold establishes the urgency level that a notification item must possess in order to warrant an interruption of the user at that time. In some embodiments, the threshold may be determined by the user or the digital assistant. For example, in some embodiments, the digital assistant continuously determines and applies a particular urgency threshold, and the user can override and/or adjust the automatically determined threshold at any time.

In some embodiments, there are a predetermined number of threshold values. For example, the digital assistant and/or the user can select from a low, medium, or high urgency threshold. In some embodiments, a low urgency threshold indicates that any and all notifications can be provided without restriction; a medium urgency threshold indicates that only notifications with a medium or high urgency value will be provided; and a high urgency threshold indicates that only notifications with a high urgency value will be provided. As noted above, urgency values may be correspond to a numerical range rather than (or in addition to) a low/medium/high classification. Thus, in some embodiments, urgency values within a first sub range of values correspond to a low urgency (e.g., 1-5, where urgency values range from 1-10), urgency values within a second sub range of values correspond to a medium urgency (e.g., 6-8, where urgency values range from 1-10), and urgency values within a third sub range of values correspond to a high urgency (e.g., 9-10, where urgency values range from 1-10). Any other appropriate overall range and sub ranges may also be used. In the present description, thresholds are referred to as low, medium, or high, though it is understood that this does not limit urgency values to specific "low/medium/high" scheme, and that other thresholds and urgency values may be used instead of or in addition to those described. In some embodiments, the user can set a threshold value by manipulating a slider control (e.g., displayed on a touchscreen of the device) to a desired point. For example, a higher value (e.g., to the right) on the slider control may correspond to a higher urgency threshold.

As noted above, in some embodiments, the digital assistant establishes the predetermined threshold automatically without user intervention. In some embodiments, the digital assistant establishes the predetermined threshold in accordance with a location of the device. In some embodiments, certain locations may be associated with certain thresholds by default (changeable by the user either temporarily or permanently). For example, a home may be associated with a low threshold, a bedroom associated with a medium threshold, a workplace with a medium threshold, a movie theater with a high threshold, etc. In some embodiments, the threshold to be used in various locations is first established by the user, e.g., as part of an initialization or training of the digital assistant. Thus, one user can specify that a low threshold should be used when he or she is at work, and another user can specify a high threshold while at work. In some cases, however, the digital assistant assigns a default threshold to certain locations for all users. For example, the digital assistant can select a high threshold by default whenever the device is in a theater, park, church, museum, store, etc., even without the user associating the location with the threshold. In some embodiments, the digital assistant notifies the user when it is applying anything other than a low threshold without the user's having previously trained it to do so. Accordingly, the user can easily opt out (or opt in) to the elevated threshold. In some implementations, the user must specifically enable a mode where the device will automatically select any threshold higher than a low threshold. This way, the user can be confident that the device will only raise the urgency threshold under conditions that are specifically requested by the user.

In some embodiments, the digital assistant establishes the predetermined threshold in accordance with a context of the device. For example, when the device is in a car (e.g., as detected by motion/location/speed profiles, ambient noise profiles, or by detecting a communication link with the vehicle), the digital assistant establishes a low urgency threshold.

In some embodiments, the digital assistant establishes the predetermined threshold in accordance with a time of day.

For example, daylight hours may be associated with a low urgency threshold, and night time hours with a high urgency threshold.

In some embodiments, the digital assistant establishes the predetermined threshold in accordance with a calendar item associated with a current time. In particular, in some embodiments, the digital assistant can infer where a user is and what the user is doing based on the user's calendar entries. If the user is scheduled to be in a meeting during a certain time, for example, the device can infer that the user is likely to be in that meeting during that time. (In some embodiments, the digital assistant can confirm whether the user is attending a scheduled event by comparing a location of the event with the user's actual location.) Thus, if the calendar entry includes information suggesting that a certain threshold is appropriate, the device will establish the threshold accordingly. The digital assistant determines that a calendar event suggests a certain threshold, for example, based on attendees of the meeting (e.g., the number and/or names of the attendees), the location of the meeting, the topic of the meeting, or any text associated with the calendar entry (e.g., "lunch" may correspond to a low threshold, while "job interview" may correspond to a high threshold).

In some embodiments, the digital assistant establishes the predetermined threshold in accordance with a user setting of the device. For example, a high urgency threshold can be used if the user has activated a "do-not-disturb" mode.

Returning to FIG. 6, upon determining that the adjusted urgency value satisfies the predetermined threshold (cf. 610), the digital assistant provides a first audio prompt to a user (612).

In some embodiments, upon determining that the adjusted urgency value does not satisfy the predetermined threshold, the digital assistant delays providing the audio prompt to the user (614). In some embodiments, the delayed audio prompt is provided once the urgency threshold changes, or once the urgency value of the notification item changes. In some embodiments, upon determining that the adjusted urgency value does not satisfy the predetermined threshold, the digital assistant simply does not provide an audio prompt for that notification item (unless the urgency value changes in response to a later detected information item). In some embodiments, upon determining that the adjusted urgency value does not satisfy the predetermined threshold, the digital assistant provides a visual prompt to the user (e.g., a banner or popup notification on a screen of the device 104). In some embodiments, the a textual component of the notification item remains in a notification user interface such that the user can view, acknowledge, and/or act on the notification item at a later time, and the notification item is not lost.

In some embodiments, the digital assistant determines whether the user has acknowledged the first audio prompt (616); and upon determining that the user has not acknowledged the first audio prompt (e.g., within a certain predetermined duration), provides a second audio prompt to the user, the second audio prompt being different from the first audio prompt (618). In some embodiments, the second prompt is more distinctive and/or intense than the first audio prompt. For example, in some embodiments, the second audio prompt is louder than the first audio prompt. In some embodiments, the second audio prompt is longer than the first audio prompt. For example, the second audio prompt may be a longer ringtone, or a tone or sound that repeats more times (and/or more quickly) than the first audio prompt. In some embodiments, the first audio prompt is a first sound (e.g., a first ringtone) and the second audio prompt is a second sound (e.g., a second ringtone) different from the first. Thus, the user can differentiate the first audio prompt from the second audio prompt. In some embodiments, the user can select the particular sounds and/or ringtones to be associated with first and second audio prompts. In some implementations, a vibration of the device is considered an audio prompt.

In some embodiments, one of the first, second, or third audio prompts corresponds to a telephone call or a voicemail. For example, the digital assistant may actually place a telephone call (or a virtual telephone call), causing the user's smartphone to ring, thus alerting the user to the urgency of the notification. In particular, notifications for incoming telephone calls may be handled differently than the notifications, such that incoming telephone calls bypass the managed notification list. Thus, by placing a telephone call to the user (e.g., such that the normal telephone ringtone and visual notification is provided to the user), the user can be alerted to the urgency of the notification. In some implementations, the digital assistant will actually vocalize the notification (e.g., using a text-to-speech engine) when the telephone call is answered by the user. In some implementations, if the telephone call is not answered by the user, the digital assistant leaves a verbal voicemail for the user.

In some embodiments, the digital assistant determines whether the user has acknowledged the second audio prompt (620); and upon determining that the user has not acknowledged the second audio prompt (e.g., within a certain predetermined duration), provides a third audio prompt to the user, the third audio prompt being different from the first audio prompt and the second audio prompt (622). In some embodiments, the third audio prompt is louder and/or longer than both the first and the second audio prompts. In some embodiments, the third audio prompt is a speech output.

In some embodiments, the first audio prompt is a ringtone, the second audio prompt is a first speech output of a first volume, and the third audio prompt is a speech output of a second volume louder than the first volume.

In some embodiments, the first audio prompt is a ringtone, the second audio prompt is a first speech output of a first length, and the third audio prompt is a second speech output of a second length longer than the first length.

In some embodiments, the process of escalating audio prompts (e.g., corresponding to using the first, second, and third audio prompts, above) is combined with the threshold determination to provide a comprehensive and minimally intrusive proactive notification scheme. In particular, in some embodiments, even the most urgent notifications start out with a minimally intrusive audio prompt (e.g., a single tone or beep, or even a non-audio prompt, such as a tactile or visual output such as a vibration or a popup notification). If the audio prompt is not acknowledged (e.g., because the user does not interact with the device by pressing a button, switch, or turning on the screen to view the notification), the second audio prompt will be provided. If the second audio prompt is not acknowledged, the third audio prompt is provided. If the notification is less urgent, however, it may not result in additional audio prompts. Thus, a lower urgency message may result in a first audio prompt being provided to the user, but will not result in subsequent audio prompts. In some embodiments, all notification items cause a first audio prompt to be provided, but only notifications satisfying a predetermined threshold will escalate to the second or the third audio prompt.

The operations described above with reference to FIGS. 5A-6 are, optionally, implemented by components depicted in FIG. 2 and/or FIG. 3. For example, receiving operation 504, providing operation 520, receiving operation 526 are, optionally, implemented by digital assistant 326, I/O processing module 328, interruption handling module 340, and/or natural language processing module 332, which are described in detail above. Similarly, it would be clear to a person having ordinary skill in the art how other processes can be implemented based on the components depicted in FIG. 2 and/or FIG. 3.

It should be understood that the particular order in which the operations have been described above is merely exemplary and is not intended to indicate that the described order is the only order in which the operations could be performed. One of ordinary skill in the art would recognize various ways to reorder the operations described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of operating a digital assistant, comprising:
at a device having one or more processors and memory:
providing a list of notification items, the list including a plurality of notification items, wherein each respective one of the plurality of notification items is associated with a respective urgency value;
prior to outputting a first notification item of the plurality of notification items:
detecting an information item received from an external device;
determining whether the information item is relevant to an urgency value of the first notification item of the plurality of notification items; and
upon determining that the information item is relevant to the urgency value of the first notification item, adjusting the urgency value of the first notification item and incorporating content from the information item into the first notification item;
determining whether the adjusted urgency value of the first notification item satisfies a predetermined threshold; and
upon determining that the adjusted urgency value satisfies the predetermined threshold, providing the first notification item to a user, the first notification item including the incorporated content from the information item.

2. The method of claim 1, further comprising establishing the predetermined threshold in accordance with a location of the device.

3. The method of claim 1, further comprising establishing the predetermined threshold in accordance with a time of day.

4. The method of claim 1, further comprising establishing the predetermined threshold in accordance with a calendar item associated with a current time.

5. The method of claim 1, further comprising establishing the predetermined threshold in accordance with a user setting of the device.

6. The method of claim 1, wherein the information item is one of the group consisting of: an email; a voicemail; and a text message.

7. The method of claim 1, wherein the information item corresponds to a change in a context of the device.

8. The method of claim 1, further comprising:
determining whether the user has acknowledged the first notification item; and
upon determining that the user has not acknowledged the first notification item, providing an audio prompt to the user.

9. The method of claim 1, wherein the information item is separate from the first notification item and the information item is received from a remote device.

10. The method of claim 9, wherein determining whether the information item is relevant to the urgency value of the first notification item comprises determining whether information in the information item affects a task to be performed by the user in association with the first notification item.

11. The method of claim 1, further comprising:
determining whether the information item is relevant to the first notification item, wherein determining whether the information item is relevant to the urgency value of the first notification item is performed upon determining that the information item is relevant to the first notification item.

12. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
accessing a list of notification items, the list including a plurality of notification items, wherein each respective one of the plurality of notification items is associated with a respective urgency value;
prior to outputting a first notification item of the plurality of notification items:
detecting an information item received from an external device;
determining whether the information item is relevant to an urgency value of the first notification item of the plurality of notification items; and
upon determining that the information item is relevant to the urgency value of the first notification item, adjusting the urgency value of the first notification item and incorporating content from the information item into the first notification item;
determining whether the adjusted urgency value of the first notification item satisfies a predetermined threshold; and
upon determining that the adjusted urgency value satisfies the predetermined threshold, providing the first notification item to a user, the first notification item including the incorporated content from the information item.

13. The electronic device of claim 12, further comprising instructions operable to establish the predetermined threshold in accordance with a location of the device.

14. The electronic device of claim 12, further comprising establishing the predetermined threshold in accordance with a time of day.

15. The electronic device of claim 12, further comprising establishing the predetermined threshold in accordance with a calendar item associated with a current time.

16. The electronic device of claim 12, further comprising establishing the predetermined threshold in accordance with a user setting of the device.

17. The electronic device of claim 12, further comprising:
   determining whether the user has acknowledged the first notification item; and
   upon determining that the user has not acknowledged the first notification item, providing an audio prompt to the user.

18. A non-transitory computer readable storage medium storing one or more programs, the one or more programs comprising instructions, which when executed by an electronic device with a display, a touch-sensitive surface cause the device to:
   access a list of notification items, the list including a plurality of notification items, wherein each respective one of the plurality of notification items is associated with a respective urgency value;
   prior to outputting a first notification item of the plurality of notification items:
      detect an information item received from an external device;
      determine whether the information item is relevant to an urgency value of the first notification item of the plurality of notification items; and
      upon determining that the information item is relevant to the urgency value of the first notification item, adjusting the urgency value of the first notification item and incorporating content from the information item into the first notification item;
   determine whether the adjusted urgency value of the first notification item satisfies a predetermined threshold; and
   upon determining that the adjusted urgency value satisfies the predetermined threshold, providing the first notification item to a user, the first notification item including the incorporated content from the information item.

19. The non-transitory computer readable storage medium of claim 18, further comprising instructions operable to establish the predetermined threshold in accordance with a location of the device.

20. The non-transitory computer readable storage medium of claim 18, further comprising instructions operable to establish the predetermined threshold in accordance with a time of day.

21. The non-transitory computer readable storage medium of claim 18, further comprising instructions operable to establish the predetermined threshold in accordance with a calendar item associated with a current time.

22. The non-transitory computer readable storage medium of claim 18, further comprising instructions operable to establish the predetermined threshold in accordance with a user setting of the device.

23. The non-transitory computer readable storage medium of claim 18, further comprising instruction operable to:
   determine whether the user has acknowledged the first notification item; and
   upon determining that the user has not acknowledged the first notification item, provide an audio prompt to the user.

\* \* \* \* \*